(12) United States Patent
Minamino et al.

(10) Patent No.: US 6,577,590 B2
(45) Date of Patent: Jun. 10, 2003

(54) OPTICAL DISK HAVING WOBBLE PATTERNS

(75) Inventors: Junichi Minamino, Nara (JP); Atsushi Nakamura, Kadoma (JP); Shigeru Furumiya, Himeji (JP); Hiromichi Ishibashi, Ibaraki (JP); Takashi Ishida, Yawata (JP); Toyoji Gushima, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/108,917

(22) Filed: Mar. 28, 2002

(65) Prior Publication Data

US 2003/0043718 A1 Mar. 6, 2003

Related U.S. Application Data

(63) Continuation of application No. PCT/JP01/07502, filed on Aug. 30, 2001.

(30) Foreign Application Priority Data

| Sep. 1, 2000 | (JP) | 2000-264978 |
|---|---|---|
| Sep. 12, 2000 | (JP) | 2000-275988 |
| Dec. 27, 2000 | (JP) | 2000-397621 |
| Mar. 19, 2001 | (JP) | 2001-077897 |
| Jun. 20, 2001 | (JP) | 2001-185729 |
| Jun. 28, 2001 | (JP) | 2001-196258 |
| Jul. 12, 2001 | (JP) | 2001-212071 |
| Jul. 19, 2001 | (JP) | 2001-219292 |

(51) Int. Cl.[7] ............................................... G11B 7/00
(52) U.S. Cl. .......................... 369/275.3; 369/275.1; 369/59.1
(58) Field of Search ........................... 369/275.1, 275.3, 369/275.4, 47.1, 47.46, 53.1, 53.25, 53.31, 53.41, 59.1, 59.2, 59.25

(56) References Cited

U.S. PATENT DOCUMENTS

| 5,754,505 A | 5/1998 | Saeki |
| 5,878,024 A | 3/1999 | Kobayashi et al. |
| 6,075,761 A | 6/2000 | Akiyama et al. |
| 6,208,614 B1 * | 3/2001 | Kim ........................ 369/275.4 |
| 6,493,306 B2 * | 12/2002 | Nakane et al. ........... 369/59.18 |

FOREIGN PATENT DOCUMENTS

| EP | 0 248 536 | 12/1987 |
| EP | 0 813 198 | 12/1997 |
| JP | 05-189934 | 7/1993 |
| JP | 05-325193 | 12/1993 |
| JP | 07-105639 | 4/1995 |
| JP | 07-244925 | 9/1995 |
| JP | 11-283280 | 10/1999 |
| WO | WO 01/52250 | 7/2001 |

* cited by examiner

Primary Examiner—Muhammad Edun
(74) Attorney, Agent, or Firm—Akin Gump Strauss Hauer & Feld, L.L.P.

(57) ABSTRACT

On an optical disk medium according to the present invention, address information is recorded along a wobbling track groove 2. The track groove 2 is made up of a plurality of unit sections 22, 23. Each of these unit sections 22, 23 has side faces that are displaced periodically in a disk radial direction. This displacement oscillates at a single period in a tracking direction. However, the displacement pattern differs depending on "each bit of address information (subdivided information)" allocated to each of the unit sections 22, 23.

12 Claims, 31 Drawing Sheets

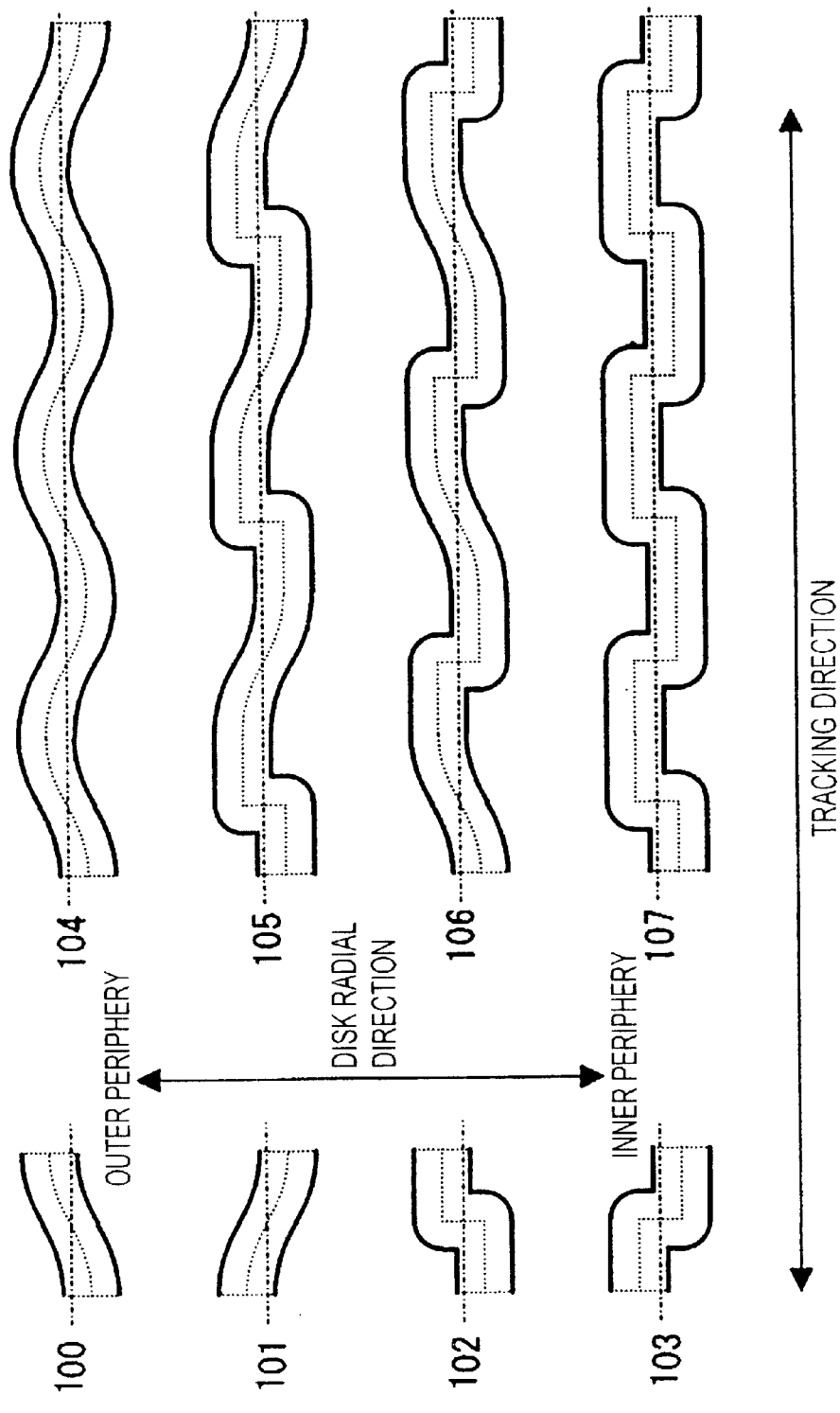

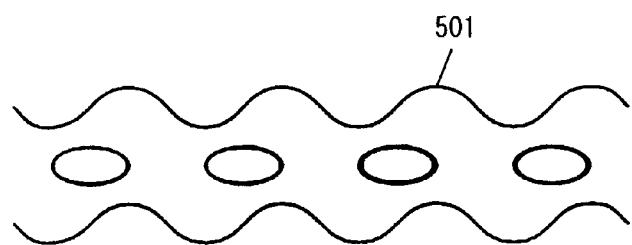
FIG.26A
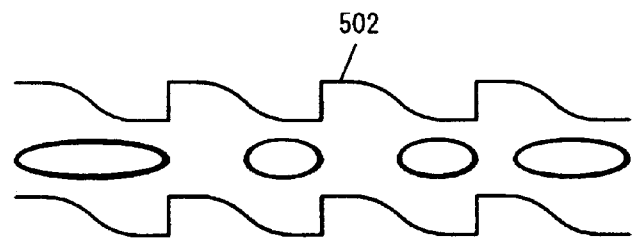
FIG.26B
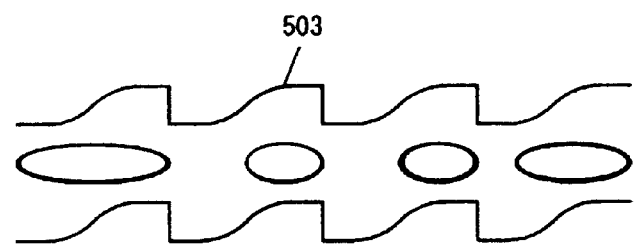
FIG.26C
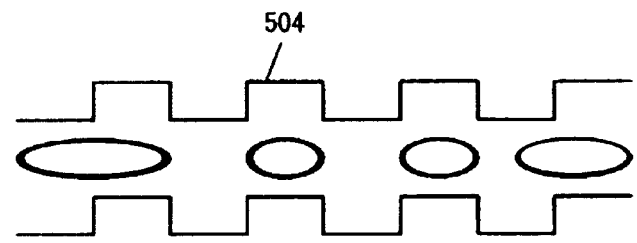
FIG.26D
FIG.27
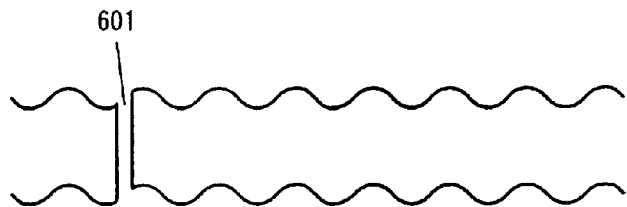

FIG. 31A

| RECORDING BLOCK | | | | | | | | | | | | | | | |
|---|---|---|---|---|---|---|---|---|---|---|---|---|---|---|---|
| VF01 | PS | Data field1 | PA | VF02 | PS | Data field2 | PA | VF02 | PS | Data field3 | PA | VF02 | PS | Data field4 | PA | VF03 |
| 45+k | 4 | 19344 | 3 | 86 | 4 | 19344 | 3 | 86 | 4 | 19344 | 3 | 86 | 4 | 19344 | 3 | 41 |

FIG. 31B

| RECORDING BLOCK | | | | | | | | | | | | | | | |
|---|---|---|---|---|---|---|---|---|---|---|---|---|---|---|---|
| VF01 | PS | Data field1 | PA | VF02 | PS | Data field2 | PA | VF02 | PS | Data field3 | PA | VF02 | PS | Data field4 | PA | VF03 |
| 45 | 4 | 19344 | 3 | 86 | 4 | 19344 | 3 | 86 | 4 | 19344 | 3 | 86 | 4 | 19344 | 3 | 41 |

FIG. 31C

| RECORDING BLOCK | | | | | | | | | | | | | | | |
|---|---|---|---|---|---|---|---|---|---|---|---|---|---|---|---|
| VF01 | PS | Data field1 | PA | VF02 | PS | Data field2 | PA | VF02 | PS | Data field3 | PA | VF02 | PS | Data field4 | PA | VF03 |
| 45 | 4 | 19344 | 3 | 86 | 4 | 19344 | 3 | 86 | 4 | 19344 | 3 | 86 | 4 | 19344 | 3 | 50−k |

OPTICAL DISK HAVING WOBBLE PATTERNS

This is a continuation of International Application PCT/JP01/07502, with an international filing date of Aug. 30, 2001.

BACKGROUND OF THE INVENTION

1. Field of the Invention

The present invention relates to an optical disk on which information (e.g., digital video information) can be stored at a high density.

2. Description of the Related Art

In recent years, the recording density of optical disk media goes on increasing. On an optical disk medium, a track groove has normally been formed in advance and a recording film has been formed so as to cover the track groove. Data or information is written by the user on the recording film along the track groove, i.e., either on the track groove or on an area (land) interposed between adjacent parts of the track groove.

The track groove is formed so as to wobble just like a sine wave and a clock signal is generated in accordance with a wobble period. Synchronously with this clock signal, user data is written on, or read out from, the recording film.

To write data at a predetermined position on an optical disk, address information (positional information), indicating physical locations on the optical disk, needs to be allocated to, and recorded at, respective sites on the optical disk while the disk is being manufactured. Normally, an address is allocated to a series of areas that are arranged along a track groove and have a predetermined length. There are various methods for recording such address information on an optical disk. Hereinafter, a conventional method for recording an address on an optical disk will be described.

Japanese Laid-Open Publication No. 6-309672 discloses a disk storage medium on which a wobbling track groove is discontinued locally so that an address-dedicated area is provided for the discontinued part. Pre-pits, representing address information recorded, are formed on the address-dedicated area on the track groove. This optical disk has a structure in which the address-dedicated area and a data-dedicated area (for writing information thereon) coexist on the same track groove.

Japanese Laid-Open Publication No. 5-189934 discloses an optical disk on which address information is recorded by changing the wobble frequency of a track groove. In an optical disk like this, an area on which the address information is recorded and an area on which data will be written are not separated from each other along the track.

Japanese Laid-Open Publication No. 9-326138 discloses an optical disk on which pre-pits are formed between adjacent parts of a track groove. These pre-pits represent the address information recorded.

These various types of optical disks have the following problems to be solved for the purpose of further increasing the recording density.

First, as for the optical disk on which address information is recorded as pre-bits within the address-dedicated area on the track, a so-called "overhead" occurs to secure the address-dedicated area and the data area should be reduced disadvantageously. As a result, the storage capacity available for the user has to be reduced.

Next, as for the optical disk for recording an address thereon by modulating the wobble frequency of the track, a write clock signal cannot be generated precisely enough. Originally, the wobble of the track groove is created mainly to generate a clock signal for establishing synchronization required for read and write operations. Where the wobble frequency is single, a clock signal can be generated highly precisely by getting a read signal, having amplitude changing with the wobble, synchronized and multiplied by a PLL, for example. However, if the wobble frequency is not single but has multiple frequency components, then the frequency band that the PLL can follow up should be lowered (as compared to the situation where the wobble has a single frequency) to avoid pseudo locking of the PLL. In that case, the PLL cannot sufficiently follow up the jitter of a disk motor or a jitter resulting from the eccentricity of a disk. Thus, some jitter might remain in the resultant recording signal.

On the other hand, where the recording film formed on the optical disk is a phase-change film, for example, such a recording film may result in a decreased SNR as the data stored on the film is altered repeatedly. If the wobble frequency is single, the noise components are removable using a band-pass filter having a narrow band. However, if the wobble frequency has been modulated, the filter should have its bandwidth broadened. As a result, the noise components are much more likely contained and the jitter might be further worsened. It is expected that the recording density will be further increased from now on. However, the higher the recording density, the narrower the allowable jitter margin will get. Accordingly, it will be more and more necessary to minimize the increase in jitter by avoiding the modulation of the wobble frequency.

In the structure in which the pre-pits representing the address information recorded are formed between adjacent parts of the groove, it is difficult to form long enough pre-pits in sufficiently large numbers. Accordingly, as the recording density is increased, detection errors might increase its number. This is because if large pre-pits are formed between adjacent parts of the groove, then those pits will affect adjacent parts of the track.

In order to solve the problems described above, a main object of the present invention is to provide an optical disk medium that contributes to minimizing the overhead and generating a clock signal precisely enough in accordance with the wobble of the track groove.

Another object of this invention is to provide a method and apparatus for reading an address that has been recorded on the optical disk medium.

SUMMARY OF THE INVENTION

An optical disk medium according to the present invention includes a track groove. On the optical disk medium, information is recorded along the track groove. The track groove includes a plurality of unit sections that are arranged along the track groove and that have side faces displaced periodically along the track groove. The side faces of the unit sections are displaced in a single fundamental period. Subdivided information allocated to each said unit section is represented by a shape given to the unit section.

In a preferred embodiment, the side faces of the track groove are displaced either toward inner or outer periphery of the disk with respect to a centerline of the track groove.

In another preferred embodiment, the information is recorded on a block-by-block basis. Each said block has a predetermined length and includes a number N of unit sections that are arranged along the track groove.

In another preferred embodiment, part of the side faces that is shared by at least two of the unit sections has a constant displacement period within at least one of the blocks.

In another preferred embodiment, one-bit subdivided information is allocated to each said unit section, and a group of subdivided information representing N bits is recorded on the N unit sections that are included in each said block.

In another preferred embodiment, each said N-bit subdivided information group includes address information of its associated block to which the unit sections, where the subdivided information group is recorded, belong.

In another preferred embodiment, each said N-bit subdivided information group includes an error correction code and/or an error detection code.

In another preferred embodiment, the error correction code or the error detection code has its ability to correct an error of the address information weighted in such a manner that low-order bits of the error correction or detection code have a relatively large weight.

In another preferred embodiment, each said unit section has a first side displacement pattern that has been so defined as to make a signal waveform rise relatively steeply and fall relatively gently or a second side displacement pattern that has been so defined as to make a signal waveform rise relatively gently and fall relatively steeply.

An inventive address reading method is a method for reading subdivided information from an optical disk medium, which includes a track groove and on which information is recorded along the track groove. The track groove includes a plurality of unit sections that are arranged along the track groove and that have side faces displaced periodically along the track groove. The side faces of the unit sections are displaced in a single fundamental period. The subdivided information allocated to each said unit section is represented by a shape given to the unit section. The side faces of each said unit section are displaced according to a pattern to be selected from first and second wobble patterns that have the same fundamental frequency but mutually different shapes. In this method, the subdivided information allocated to each said unit section is identified by comparing a number of times the first wobble pattern has been detected from the unit section with a number of times the second wobble pattern has been detected from the unit section.

In a preferred embodiment, if a difference between the number of times the first wobble pattern has been detected from each said unit section and the number of times the second wobble pattern has been detected from the unit section falls within a predetermined range, then the subdivided information allocated to the unit section is error-corrected.

In another preferred embodiment, a type of a given wobble pattern is identified by a gradient of a leading or trailing edge of a signal corresponding to the wobble pattern.

In another preferred embodiment, the type of the given wobble pattern is identified by comparing an absolute gradient value of the leading edge of the signal to an absolute gradient value of the trailing edge thereof.

An optical disk reproducing apparatus according to the present invention is an apparatus for reading subdivided information from an optical disk medium, which includes a track groove and on which information is recorded along the track groove. The track groove includes a plurality of unit sections that are arranged along the track groove and that have side faces displaced periodically along the track groove. The side faces of the unit sections are displaced in a single fundamental period. The subdivided information allocated to each said unit section is represented by a shape given to the unit section. The side faces of each said unit section are displaced according to a pattern to be selected from first and second wobble patterns that have the same fundamental frequency but mutually different shapes. The apparatus includes: an optical head, which irradiates the optical disk medium with light and generates an electric signal responsive to part of the light that been reflected from the optical disk medium; read signal processing means for generating a wobble signal, which has amplitude changing with the wobble pattern, from the electric signal; rise value acquiring means for sampling and holding an absolute gradient value of the wobble signal when the signal rises; fall value acquiring means for sampling and holding an absolute gradient value of the wobble signal when the signal falls; and subdivided information detecting means for determining the subdivided information by majority by comparing the values held by the rise and fall value acquiring means with each other.

Another optical disk reproducing apparatus according to the present invention is an apparatus for reading subdivided information from an optical disk medium, which includes a track groove and on which information is recorded along the track groove. The track groove includes a plurality of unit sections that are arranged along the track groove and that have side faces displaced periodically along the track groove. The side faces of the unit sections are displaced in a single fundamental period. The subdivided information allocated to each said unit section is represented by a shape given to the unit section. The side faces of each said unit section are displaced according to a pattern to be selected from first and second wobble patterns that have the same fundamental frequency but mutually different shapes. The apparatus includes: an optical head, which irradiates the optical disk medium with light and generates an electric signal responsive to part of the light that been reflected from the optical disk medium; read signal processing means for generating a wobble signal, which has amplitude changing with the wobble pattern, from the electric signal; timing generating means for generating a timing signal that defines a timing at which the wobble signal rises, a timing at which the wobble signal falls and a timing at which the subdivided information is sectioned; first shape counting means for detecting the first wobble pattern responsive to the timing signal and counting the number of times the first wobble pattern has been detected; second shape counting means for detecting the second wobble pattern responsive to the timing signal and counting the number of times the second wobble pattern has been detected; and subdivided information detecting means for determining the subdivided information by majority by comparing counts of the first and second shape counting means with each other.

Another optical disk reproducing apparatus according to the present invention is an apparatus for reading subdivided information from an optical disk medium, which includes a track groove and on which information is recorded along the track groove. The track groove includes a plurality of unit sections that are arranged along the track groove and that have side faces displaced periodically along the track groove. The side faces of the unit sections are displaced in a single fundamental period. The subdivided information allocated to each said unit section is represented by a shape given to the unit section. The side faces of each said unit section are displaced according to a pattern to be selected from first and second wobble patterns that have the same fundamental frequency but mutually different shapes. The apparatus includes: an optical head, which irradiates the optical disk medium with light and generates an electric signal responsive to part of the light that been reflected from the optical disk medium; read signal processing means for generating a wobble signal, which has amplitude changing with the wobble pattern, from the electric signal; timing generating means for generating a timing signal that defines a timing at which the wobble signal rises, a timing at which the wobble signal falls and a timing at which the subdivided information is sectioned; first shape counting means for detecting the first wobble pattern responsive to the timing signal and counting the number of times the first wobble pattern has been detected; second shape counting means for detecting the second wobble pattern responsive to the timing signal and counting the number of times the second wobble pattern has been detected; subdivided information detecting means for determining the subdivided information by majority by comparing counts of the first and second shape counting means with each other; erasure detecting means for outputting an erasure flag if a difference between the counts of the first and second shape counting means falls within a predetermined range; and error correcting means for conducting error correction in accordance with outputs of the subdivided information detecting means and the erasure detecting means and generating address information.

Another optical disk medium according to the present invention includes a track groove. On the optical disk medium, positional information indicating a physical location on the track groove is represented by a wobble shape of the track groove. The optical disk medium includes a plurality of positional information units that are arranged on the track groove. Each said positional information unit includes: a positional information section that represents the positional information by a combination of wobble patterns selected from multiple types of wobble patterns; and a sync mark section having a wobble pattern in a shape distinguishable from the wobble patterns of the positional information section.

In a preferred embodiment, the optical disk medium includes a precision positioning mark section ahead of each said positional information section.

In another preferred embodiment, the precision positioning mark section is disposed at the beginning of each said positional information unit.

In another preferred embodiment, the precision positioning mark section has a wobble pattern in a shape distinguishable from the wobble pattern of the sync mark section.

In another preferred embodiment, the precision positioning mark section has a wobble pattern in a shape distinguishable from the wobble patterns of the positional information section.

In another preferred embodiment, each said wobble pattern in the positional information section includes: a first part having a smooth sine wave shape; and a second part in which a disk-inner-periphery-oriented displacement and/or a disk-outer-periphery-oriented displacement have/has a shape steeper than the part having the sine wave shape.

In another preferred embodiment, the wobble pattern in the sync mark section includes the first part and/or the second part.

In another preferred embodiment, the precision positioning mark section includes an identification mark for use in precision positioning.

In another preferred embodiment, the identification mark is a mirror mark that has been formed by discontinuing a part of the track groove.

In another preferred embodiment, the mirror mark is disposed at the second through fourth period parts of the wobble pattern in the precision positioning mark section.

In another preferred embodiment, the wobble pattern in the precision positioning mark section has a sine wave shape.

In another preferred embodiment, in each said positional information unit, the precision positioning mark section, the positional information section and the sync mark section are arranged in this order.

In another preferred embodiment, a recording block, which is a smallest read/write unit, includes a number L of the positional information units (where L is a natural number).

In another preferred embodiment, the recording block corresponds to a data unit that constitutes an error correction code.

In another preferred embodiment, writing on the recording block is either started or ended behind a start point of the precision positioning mark section by a predetermined length.

In another preferred embodiment, writing on the recording block is either started or ended behind the mirror mark by a predetermined length.

In another preferred embodiment, the mirror mark has a length of 1 $\mu$m to 10 $\mu$m as measured along the track groove.

In another preferred embodiment, a single subdivided information unit is represented by a wobble for M periods (where M is a natural number equal to or greater than 2), and one bit of the positional information is allocated to each said subdivided information unit.

In another preferred embodiment, the sync mark section is a combination of first and second wobble patterns, the number of which is N (which is a natural number). In each said first wobble pattern, a wobble, having rectangular parts in which disk-inner-periphery-oriented and disk-outer-periphery-oriented displacements are both steep, is repeated for a number M of periods. In each said second wobble pattern, a smooth sine wave wobble is repeated for the M periods.

In another preferred embodiment, the sync mark section is made up of the first wobble patterns only.

In another preferred embodiment, the first and second wobble patterns are arranged alternately in the sync mark section.

In another preferred embodiment, the sync mark section is a combination including both a transition point from the first wobble pattern into the second wobble pattern and a transition point from the second wobble pattern into the first wobble pattern.

In another preferred embodiment, supposing the positional information is represented by A bits; the sync mark section has a length corresponding to B wobble periods; the precision positioning mark section, including the mirror mark, has a length corresponding to C wobble periods; one wobble period has a length corresponding to W channel bits of recording data; the number of channel bits of a recording block, which is a smallest read/write unit, is D; and the number of the positional information units allocated to each said recording block is E, where A, B, C, E, M and W are all natural numbers, an equation $D=(A \times M+B+C) \times W \times E$ is satisfied.

In another preferred embodiment, B is a multiple of M.

In another preferred embodiment, A=48, M=32, B=128, C=8, W=186 and E=4.

In another preferred embodiment, A=48, M=36, B=144, C=9, W=155 and E=4.

In another preferred embodiment, A=48, M=24, B=96, C=6, W=186 and E=4.

In another preferred embodiment, A=48, M=36, B=144, C=9, W=124 and E=4.

The optical disk medium may use a modulation code for converting 8 bits into F channel bits. Supposing the precision positioning mark section, including the mirror mark, has a length corresponding to C wobble periods; one wobble period has a length corresponding to W channel bits of recording data; the precision positioning mark section has a length corresponding to P frames of the recording data; one subdivided information unit has a length corresponding to Q frames of the recording data; and one frame of the recording data has a number R of bytes, where C, F, W and R are natural numbers and P and Q are rational numbers, equations P×R×F=C×W and Q×R×F=M×W are both satisfied.

In a preferred embodiment, F=16, M=32, C=8, W=186, P=1, Q=4 and R=93.

In another preferred embodiment, F=15, M=36, C=9, W=155, P=1, Q=4 and R=93.

In another preferred embodiment, F=12, M=24, C=6, W=186, P=1, Q=4 and R=93.

In another preferred embodiment, F=12, M=36, C=9, W=124, P=1, Q=4 and R=93.

An inventive positional information reading method is a method for reading out positional information from the optical disk medium of the present invention. The method includes the steps of: detecting the sync mark section that has been formed on the optical disk medium; detecting the precision positioning mark; establishing a bit synchronization for the positional information using the sync mark detected and/or the precision positioning mark detected; and reading out the positional information in accordance with the bit synchronization established in the step of establishing the bit synchronization for the positional information.

An inventive data writing method is a method for writing data on the optical disk medium of the present invention. The method includes the steps of: detecting the sync mark section that has been formed on the optical disk medium; detecting the precision positioning mark based on the sync mark section detected; performing positioning using the precision positioning mark detected; and starting to write the data based on a positioning result obtained in the positioning step.

An optical disk reproducing apparatus according to the present invention is an apparatus for reading out positional information from the optical disk medium of the present invention. The drive includes: means for detecting the sync mark section that has been formed on the optical disk medium; means for generating a first detection window with a predetermined time width after a predetermined time has passed since a timing at which the sync mark was detected by the sync mark detecting means; means for detecting the identification mark, which has been formed on the optical disk medium, by using the first detection window; means for establishing a bit synchronization for the positional information, which is recorded on the optical disk medium, by using the timing at which the sync mark has been detected and/or a timing at which the identification mark has been detected; and means for reading out the positional information at a timing at which the bit synchronization has been established by the means for establishing the bit synchronization for the positional information.

An optical disk recording apparatus according to the present invention is an apparatus for writing data on the optical disk medium of the present invention. The drive includes: means for detecting the sync mark section that has been formed on the optical disk medium; means for generating a first detection window with a predetermined time width after a predetermined time has passed since a timing at which the sync mark was detected by the sync mark detecting means; means for detecting the identification mark, which has been formed on the optical disk medium, by using the first detection window; and data writing means for setting a data writing start point or end point by reference to a timing at which the identification mark has been detected.

Another optical disk medium according to the present invention includes a track groove. On the optical disk medium, information is recorded along the track groove. The track groove includes a plurality of unit sections that are arranged along the track groove and that have side faces displaced periodically along the track groove. The side faces of the unit sections are displaced in a common period. Subdivided information allocated to each said unit section is represented by a shape given to the unit section. On this optical disk medium, control information is represented by a combination of the subdivided information.

In a preferred embodiment, the control information is recorded on a non-user area.

Another optical disk medium according to the present invention includes a track groove. On the optical disk medium, information is recorded along the track groove. Management information of the optical disk medium is represented by wobbling of the track groove.

In a preferred embodiment, the control information is represented by a combination of mutually different wobble waveforms that oscillate at the same frequency.

In another preferred embodiment, the control information is represented by a combination of wobble shapes including: a smooth sine wave part; and a rectangular part in which a disk-inner-periphery-oriented displacement and/or a disk-outer-periphery-oriented displacement are/is steep.

Another optical disk medium according to the present invention includes a track groove on a recording surface thereof. On the optical disk medium, information is recorded along the track groove on the basis of a block unit having a predetermined length. An identification mark, indicating the beginning of each said block unit, has been formed on the track groove. A signal having a particular pattern is overwritten on the identification mark.

In a preferred embodiment, the identification mark is located substantially at the center of an area on which the signal is written.

In another preferred embodiment, the identification mark is located closer to a previous block with respect to the center of an area on which the signal is written.

In another preferred embodiment, the identification mark includes a flat portion that has been formed by discontinuing the track groove for a short interval.

In another preferred embodiment, the identification mark includes a plurality of sub-marks.

In another preferred embodiment, the track groove wobbles periodically. The identification mark is formed by connecting together a plurality of areas of the track groove that have mutually different wobble phases.

In another preferred embodiment, the track groove is provided with a periodic wobble. The identification mark has a frequency different from a frequency of the wobble.

In another preferred embodiment, each said block unit having the predetermined length includes a plurality of sub-blocks that are arranged along the groove. A sub-block identification mark is provided within each said sub-block.

In another preferred embodiment, the track groove is provided with a periodic wobble. A wobble having a frequency different from that of the other parts is allocated to each said sub-block identification mark.

In another preferred embodiment, each said sub-block identification mark is located at the beginning of its associated sub-block.

In another preferred embodiment, the identification mark for one of the sub-blocks included in each said block unit having the predetermined length represents subdivided information indicating an address of the block unit.

In another preferred embodiment, the wobble of the track groove has a shape corresponding to the information indicating the address of each said block unit.

An inventive signal writing method is a method for writing a signal on an optical disk medium including a track groove on a recording surface thereof. On the optical disk medium, information is recorded along the track groove on the basis of a block unit having a predetermined length, and an identification mark, indicating the beginning of each said block unit, has been formed on the track groove. Writing is started before the identification mark, located at the beginning of at least one block unit on which the signal should be written, is reached. The writing is ended after the identification mark, located at the end of the at least one block unit on which the signal should be written, has been passed.

Another inventive signal writing method is a method for writing a signal on an optical disk medium including a track groove on a recording surface thereof. On the optical disk medium, information is recorded along the track groove on the basis of a block unit having a predetermined length. An identification mark, indicating the beginning of each said block unit and including a plurality of sub-marks, has been formed on the track groove. Writing is started after the first one of the sub-marks, included in the identification mark located at the beginning of at least one block unit on which the signal should be written, has been detected. The writing is ended after the last one of the sub-marks, included in the identification mark located at the end of the at least one block unit on which the signal should be written, has been detected.

In a preferred embodiment, a signal having a particular pattern is overwritten on each said identification mark.

In another preferred embodiment, the signal having the particular pattern is a VFO signal.

BRIEF DESCRIPTION OF THE DRAWINGS

FIG. 2(a) illustrates plan views showing wobble pattern elements, while FIG. 2(b) illustrates plan views showing four types of wobble patterns formed by combining those elements.

FIGS. 26A through 26D schematically illustrate a track groove of the optical disk medium according to the sixteenth embodiment.

FIG. 27 illustrates a precision positioning mark section of the optical disk medium according to the sixteenth embodiment.

FIGS. 31A through 31C illustrate exemplary recording data formats according to the eighteenth embodiment.

DETAILED DESCRIPTION OF PREFERRED EMBODIMENTS

Figure 1A:
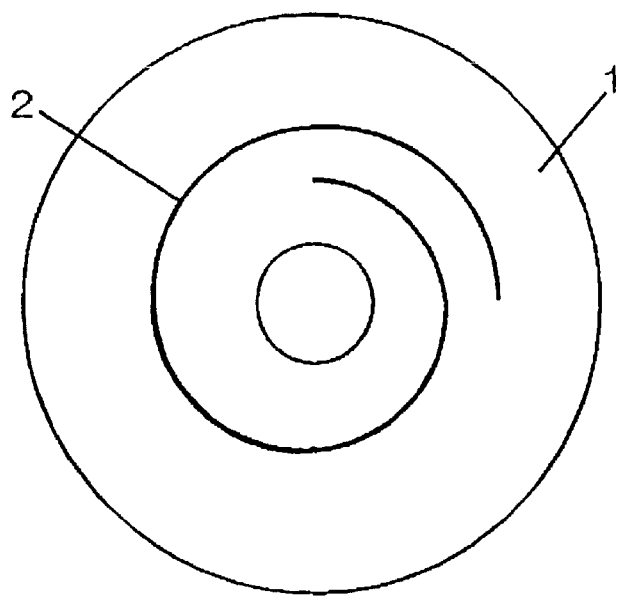
FIG. 1A is a plan view of an optical disk medium according to the present invention.
Figure 1B:
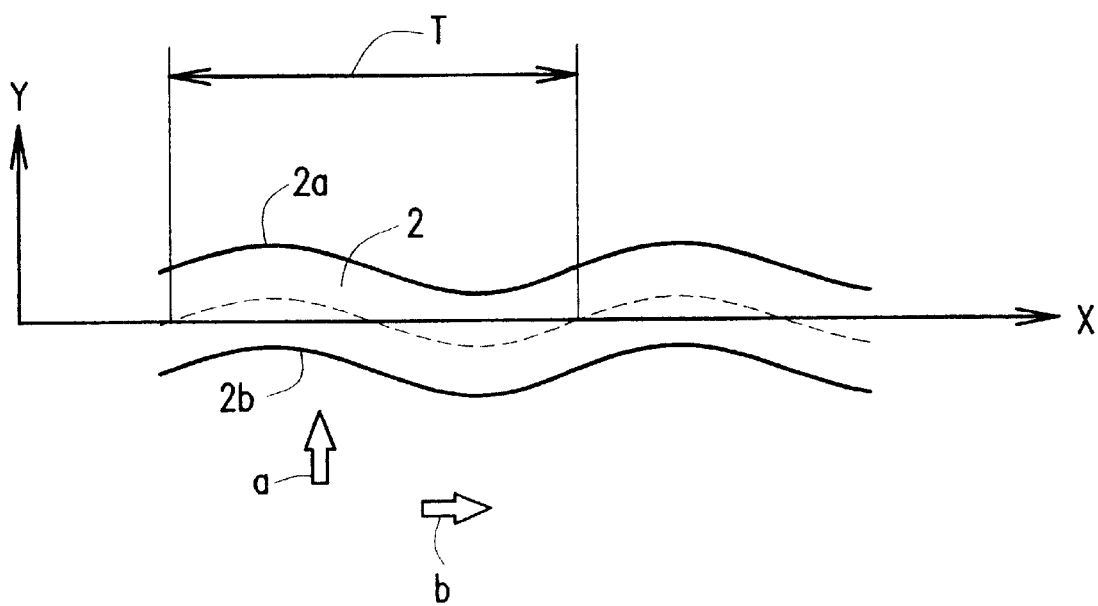
FIG. 1B is a plan view illustrating a planar shape of a track groove on the optical disk medium of the present invention.

As shown in FIG. 1A, a spiral track groove 2 has been formed on the recording surface 1 of an optical disk medium according to the present invention. FIG. 1B illustrates a part of the track groove 2 to a larger scale. In FIG. 1B, a disk center (not shown) exists below the track groove 2 and a disk radial direction is indicated by the arrow a. The arrow b points a direction in which a read/write light beam spot, being formed on the disk, moves as the disk is rotated. In the following description, a direction parallel to the arrow a will be herein referred to as a "disk radial direction" (or "radial direction" simply), while a direction parallel to the arrow b will be herein referred to as a "tracking direction".

In a coordinate system in which the light beam spot is supposed to be formed at a fixed position on the disk, a part of the disk irradiated with the light beam (which will be herein referred to as a "disk irradiated part") moves in the direction opposite to the arrow b.

Hereinafter, the X-Y coordinate system illustrated in FIG. 1B will be considered. In an optical disk according to the present invention, the Y coordinate of a position on a side face 2a or 2b of the track groove changes periodically as the X coordinate thereof increases. Such a periodic positional displacement on the groove side face 2a or 2b will be herein referred to as the "wobble" or "wobbling" of the track groove 2. A displacement in the direction pointed by the arrow a will be herein referred to as a "disk-outer-periphery-oriented displacement", while a displacement in the direction opposite to the arrow a will be herein referred to as a "disk-inner-periphery-oriented displacement". Also, in FIG. 1B, one wobble period is identified by "T". The wobble frequency is inversely proportional to one wobble period T and is proportional to the linear velocity of the light beam spot on the disk.

In the illustrated example, the width of the track groove 2 is constant in the tracking direction (as indicated by the arrow b). Accordingly, the amount to which a position on the side face 2a or 2b of the track groove 2 is displaced in the disk radial direction (as indicated by the arrow a) is equal to the amount to which a corresponding position on the centerline of the track groove 2 (as indicated by the dashed line) is displaced in the disk radial direction. For this reason, the displacement of a position on the side face of the track groove in the disk radial direction will be herein simply referred to as the "displacement of the track groove" or the "wobble of the track groove". It should be noted, however, that the present invention is not limited to this particular situation where the centerline and the side faces 2a and 2b of the track groove 2 wobble to the same amount in the disk radial direction. Alternatively, the width of the track groove 2 may change in the tracking direction. Or the centerline of the track groove 2 may not wobble but only the side faces of the track groove may wobble.

In the present invention, the wobbling structure of the track groove 2 is defined as a combination of multiple types of displacement patterns. That is to say, the planar shape of the track groove 2 does not consist of just the sine waveform shown in FIG. 1B but at least part of it has a shape different from the sine waveform. A basic configuration for such a wobbled groove is disclosed in the descriptions of Japanese Patent Application Nos. 2000-6593, 2000-187259 and 2000-319009 that were filed by the present applicant.

As for the track groove 2 shown in FIG. 1B, the Y coordinate of a position on the centerline of the groove may be represented by a function $f_0(x)$ of the X coordinate thereof. In that case, $f_0(x)$ may be given by "constant·sin $(2\pi x/T)$", for example.

Hereinafter, the configurations of wobble patterns adopted in the present invention will be described in detail with reference to FIGS. 2(a) and 2(b).

FIG. 2(a) illustrates the four types of basic elements that make up a wobble pattern of the track groove 2. In FIG. 2(a), smooth sine waveform portions 100 and 101, a rectangular portion 102 with a steep disk-outer-periphery-oriented displacement and a rectangular portion 103 with a steep disk-inner-periphery-oriented displacement are shown. By combining these elements or portions with each other, the four types of wobble patterns 104 through 107 shown in FIG. 2(b) are formed.

The wobble pattern 104 is a sine wave with no rectangular portions. This pattern will be herein referred to as a "fundamental waveform". It should be noted that the "sine wave" is not herein limited to a perfect sine curve, but may broadly refer to any smooth wobble.

The wobble pattern 105 includes portions that are displaced toward the disk outer periphery more steeply than the sine waveform displacement. Such portions will be herein referred to as "outer-periphery-oriented displaced rectangular portions".

In an actual optical disk, it is difficult to realize the displacement of a track groove in the disk radial direction vertically to the tracking direction. Accordingly, an edge actually formed is not perfectly rectangular. Thus, in an actual optical disk, an edge of a rectangular portion may be displaced relatively steeply compared to a sine waveform portion and does not have to be perfectly rectangular. As can also be seen from FIG. 2(b), at a sine waveform portion, a displacement from the innermost periphery toward the outermost periphery is completed in a half wobble period. As for a rectangular portion, a similar displacement may be finished in a quarter or less of one wobble period, for example. Then, the difference between these shapes is easily distinguishable.

It should be noted that the wobble pattern 106 is characterized by inner-periphery-oriented displaced rectangles while the wobble pattern 107 is characterized by both "inner-periphery-oriented displaced rectangles" and "outer-periphery-oriented displaced rectangles".

The wobble pattern 104 consists of the fundamental waveform alone. Accordingly, the frequency components thereof are defined by a "fundamental frequency" that is proportional to the inverse number of the wobble period T. In contrast, the frequency components of the other wobble patterns 105 through 107 include not only the fundamental frequency components but also high-frequency components. Those high-frequency components are generated by the steep displacements at the rectangular portions of the wobble patterns.

If the coordinate system shown in FIG. 1B is adopted for each of these wobble patterns 105 through 107 to represent the Y coordinate of a position on the track centerline by a function of the X coordinate thereof, then the function may be expanded into Fourier series. The expanded Fourier series will include a term of a sin function having an oscillation period shorter than that of sin (2πx/T), i.e., a harmonic component. However, each of these wobble patterns includes a fundamental wave component. The frequency of the fundamental waveform will be herein referred to as a "wobble frequency". The four types of wobble patterns described above have a common wobble frequency.

In the present invention, instead of writing address information on the track groove 2 by modulating the wobble frequency, the multiple types of wobble patterns are combined with each other, thereby recording various types of information, including the address information, on the track groove. More specifically, by allocating one of the four types of wobble patterns 104 through 107 to each predetermined section of the track groove, four types of codes (e.g., "B", "S", "0" and "1", where "B" denotes block information, "S" denotes synchronization information and a combination of zeros and ones represents an address number or an error detection code thereof) may be recorded.

Next, the fundamentals of an inventive method for reading information, which has been recorded by the wobble of the track groove, from the optical disk will be described with reference to FIGS. 3A and 3B.

Figure 3A:
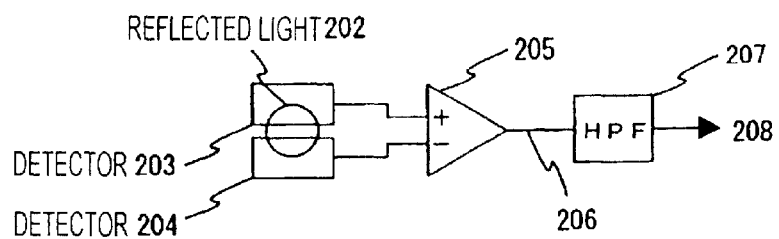
FIG. 3A illustrates a basic configuration for an apparatus that can identify the type of a given wobble pattern by a wobble signal having amplitude changing with the wobble of a track groove.
Figure 3B:
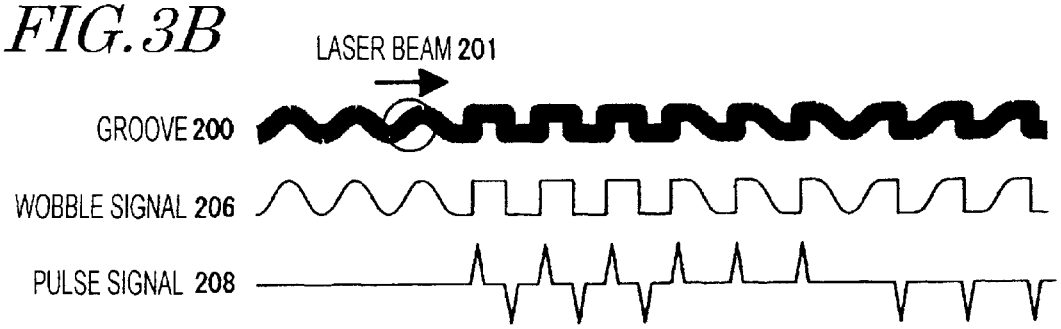
FIG. 3B illustrates waveform diagrams showing a wobble pattern of the track groove, the wobble signal and a pulse signal.

First, FIGS. 3A and 3B will be referred to.

FIG. 3A illustrates a main portion of a reproducing apparatus, while FIG. 3B illustrates a relationship between the track groove and a read signal.

The track groove 200 schematically illustrated in FIG. 3B is scanned by a read laser beam 201 so that the spot thereof moves in the arrowed direction. The laser beam 201 is reflected from the optical disk to form reflected light 202, which is received at detectors 203 and 204 of the reproducing apparatus shown in FIG. 3A. The detectors 203 and 204 are spaced apart from each other in a direction corresponding to the disk radial direction and each output a voltage corresponding to the intensity of the light received. If the position at which the detectors 203 and 204 are irradiated with the reflected light 202 (i.e., the position at which the light is received) shifts toward one of the detectors 203 and 204 with respect to the centerline that separates the detectors 203 and 204 from each other, then a difference is created between the outputs of the detectors 203 and 204 (which is "differential push-pull detection"). The outputs of the detectors 203 and 204 are input to a differential circuit 205, where a subtraction is carried out on them. As a result, a signal corresponding to the wobble shape of the groove 200 (i.e., a wobble signal 206) is obtained. The wobble signal 206 is input to, and differentiated by, a high-pass filter (HPF) 207. As a result, the smooth fundamental components that have been included in the wobble signal 206 are attenuated and instead a pulse signal 208, including pulse components corresponding to rectangular portions with steeps gradients, is obtained. As can be seen from FIG. 3B, the polarity of each pulse in the pulse signal 208 depends on the direction of its associated steep displacement of the groove 200. Accordingly, the wobble pattern of the groove 200 is identifiable by the pulse signal 208.

Figure 3C:
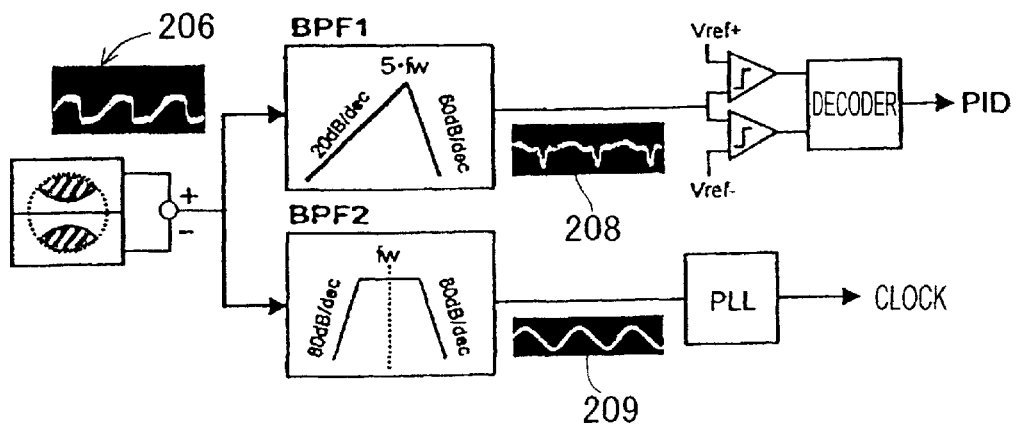
FIG. 3C illustrates a circuit configuration for extracting the pulse signal and a clock signal from the wobble signal.

Next, referring to FIG. 3C, illustrated is an exemplary circuit configuration for generating the pulse signal 208 and a clock signal 209 from the wobble signal 206 shown in FIG. 3B.

In the exemplary configuration illustrated in FIG. 3C, the wobble signal 206 is input to first and second band-pass filters BPF1 and BPF2, which generate the pulse and clock signals 208 and 209, respectively.

Supposing the wobble frequency of the track is fw (Hz), the first band-pass filter BPF1 may be a filter having such a characteristic that the gain (i.e., transmittance) thereof reaches its peak at a frequency of 4 fw to 6 fw (e.g., 5 fw). In a filter like this, the gain thereof preferably increases at a rate of 20 dB/dec, for example, in a range from low frequencies to the peak frequency, and then decreases steeply (e.g., at a rate of 60 dB/dec) in a frequency band exceeding the peak frequency. In this manner, the first band-pass filter BPF1 can appropriately generate the pulse signal 208, representing the rectangularly changing portions of the track wobble, from the wobble signal 206.

On the other hand, the second band-pass filter BPF2 has such a filtering characteristic that the gain thereof is high in a predetermined frequency band (e.g., in a band ranging from 0.5 fw to 1.5 fw and including the wobble frequency fw at the center) but is small at the other frequencies. The second band-pass filter BPF2 like this can generate a sine wave signal, having a frequency corresponding to the wobble frequency of the track, as the clock signal 209.

Hereinafter, embodiments of the optical disk medium of the present invention will be described in detail.

Embodiment 1

A spiral track groove 2 such as that shown in FIG. 1A is also formed on the recording surface 1 of an optical disk according to this embodiment.

Figure 4:
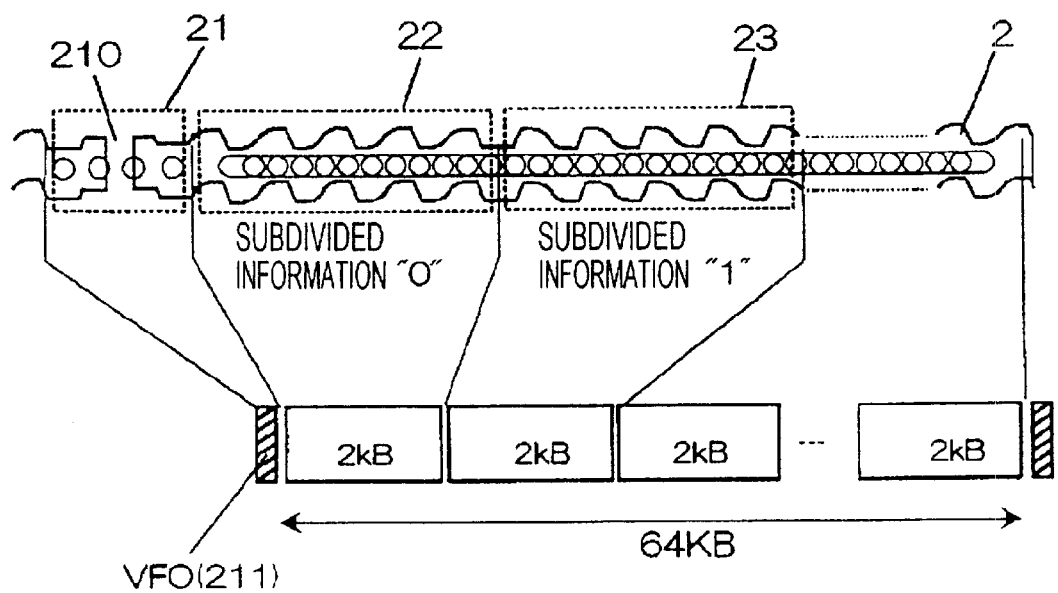
FIG. 4 illustrates a main portion of an optical disk medium according to a first embodiment.

FIG. 4 illustrates the shape of the track groove 2 of this embodiment. The track groove 2 is divided into a plurality of blocks, and a block mark (identification mark) 210 for use as a positioning mark is provided between two adjacent blocks. The block mark 210 of this embodiment is formed by discontinuing the track groove 2 for just a short length.

The track groove 2 includes a plurality of unit sections 22, 23, and each block is made up of a predetermined number of unit sections 22, 23. An arbitrary wobble pattern, selected from a plurality of wobble patterns, may be allocated to each unit section. In the example illustrated in FIG. 4, the wobble patterns 106 and 105 shown in FIG. 2(b) are allocated to the unit sections 22 and 23, respectively.

Each of these wobble patterns 105 and 106 carries a one-bit information element (i.e., "0" or "1"), which will be herein referred to as "subdivided information". By identifying the type of the wobble pattern allocated to each unit section of the track groove, the contents of the subdivided information allocated to the unit section can be read. Accordingly, various types of information can be read based on multi-bit subdivided information.

As described above, the difference in waveform between the wobble patterns is represented as a difference in gradient between the leading edges or the trailing edges of the read signals as obtained by the differential push-pull detection. Accordingly, the wobble pattern of the unit section 22, for example, is easily identifiable as one of the wobble patterns 105 and 106 shown in FIG. 2A. However, when this detection is performed by differentiating the read signal in the above-described manner, noise components increase. For that reason, if this technique is applied to a high-density optical disk medium that results in a low SN ratio, then detection errors may occur. To avoid the occurrence of such detection errors, the following technique is adopted in this embodiment.

The information to be written by the user on the disk (which will be herein referred to as "recording information") is written over several blocks along the track groove on the recording layer. The recording information is written on a block-by-block basis. Each block extends from the block mark 210 along the track groove 2 and has a predetermined length of e.g., 64 kilobytes. A block like this is a unit of information processing and may mean an ECC block, for example. Each block is made up of a number N (which is a natural number) of sub-blocks. When each block has a length of 62 kilobytes and each sub-block has a length of 2 kilobytes, the number N of sub-blocks included in one block is 32.

In this embodiment, the areas on the track groove where the information for respective sub-blocks should be written correspond to the unit sections 22, 23 of the track groove.

Since one-bit subdivided information "0" or "1" is recorded on each of the unit sections 22 and 23, a group of subdivided information of N=32 bits is allocated to each block. In this embodiment, the address of the block is indicated by this group of subdivided information of 32 bits.

For example, where each unit section has a length of 2,418 bytes (=2,048 bytes plus parity) and one wobble period has a length corresponding to 11.625 bytes, a wobble pattern for 208 periods is included in each unit section. Accordingly, the wobble signal 206 shown in FIGS. 3B and 3C may be detected over 208 wobble periods (i.e., a wave number of 208) to identify the type of the given wobble pattern. For that reason, even if some detection errors have been caused by noise during signal reading, the subdivided information is identifiable accurately enough.

More specifically, the differentiated waveform of the differential push-pull signal (i.e., the pulse signal 208) may be sampled and held every time the signal rises or falls. And if the accumulated value of the number of rises is compared to that of the number of falls, then the noise components are canceled. As a result, the subdivided information components can be extracted highly accurately.

The block mark 210 shown in FIG. 4 is formed by discontinuing the track groove 2 for just a short length. Accordingly, if information is overwritten on that part of the recording layer over the block mark 210, then some problems may arise. Specifically, since the quantity of light reflected greatly changes depending on whether or not the groove is present at the spot, the existence of the block mark 210 causes a disturbance in the read signal. Thus, in this embodiment, a VFO (variable frequency oscillator) recording area 21 is allocated to an area 21 of a predetermined length including the block mark 210. The VFO recording area 21 is an area where a single frequency signal VFO is written. VFO is a signal for locking a PLL required for reading the recorded information. Even when there is any disturbance or variation, the VFO signal would cause a jitter just locally but no errors. Also, the VFO signal has a single repetitive frequency. Accordingly, it is possible to separate the disturbance caused by the block mark. However, the signal to be written on the VFO recording area 21 does not have to have a single frequency, but may have a particular pattern and a spectral bandwidth narrow enough to separate the frequency thereof from that of a signal corresponding to the block mark 210.

Embodiment 2

Hereinafter, an optical disk apparatus (disk drive) having the function of reading an address on the optical disk medium of the first embodiment will be described with reference to FIG. 5.

A laser beam, emitted from the optical head 331 of this apparatus, impinges onto an optical disk 1, thereby forming a light spot on the track groove of the optical disk 1. A drive mechanism is controlled in such a manner that the light spot moves on the track groove as the optical disk 1 is rotated.

The optical head 331 then receives the laser beam that has been reflected by the optical disk 1, thereby generating an electric signal. The electric signal is output from the optical head 331 and then input to a read signal processor 332 where the electric signal is subjected to operation processing. In response to the signal supplied from the optical head 331, the read signal processor 332 generates and outputs a fully added signal and a wobble signal (i.e., push-pull signal).

The wobble signal is input to a wobble PLL circuit 333. The wobble PLL circuit 333 generates a clock signal from the wobble signal and then delivers the clock signal to a timing generator 335. The clock signal has a frequency obtained by multiplying the wobble frequency. It should be noted that before the wobble PLL section 333 is phase-locked, a timing signal may also be generated by using a reference clock signal although the precision is inferior.

The fully added signal, output from the read signal processor 332, is input to a block mark detector 334. In accordance with the fully added signal, the block mark detector 334 locates the block mark 210. In the optical disk of the first embodiment, the laser beam, reflected from a part where the block mark 210 is present, has a higher intensity than the other parts. Accordingly, when the level of the fully added signal exceeds a predetermined level, the read signal processor 332 generates a block mark detection signal and sends it out to the timing generator 335.

In response to the block mark detection signal and the clock signal, the timing generator 335 counts the number of clock pulses from the beginning of a block. By performing this counting, it is possible to determine the timing at which the wobble signal should rise or fall, the timing at which the information is subdivided and the timing at which each block is sectioned.

A first shape counter 336 counts the number of times the gradient of the wobble signal rising is equal to or greater than a predetermined value $U_{TH}$ for each unit section. More specifically, if the gradient of the push-pull signal is equal to or greater than the predetermined value $U_{TH}$ when the wobble signal rises, the counter 336 increments its count C1 by one. On the other hand, if the gradient is less than $U_{TH}$, then the counter 336 does not change its count C1 but holds it. The timing at which the wobble signal rises is defined by the output signal of the timing generator 335.

A second shape counter 337 counts the number of times the gradient of the wobble signal falling is equal to or smaller than a predetermined value $D_{th}$ for each unit section. More specifically, if the gradient of the push-pull signal is equal to or smaller than the predetermined value $D_{TH}$ when the wobble signal falls, the counter 337 increments its count C2 by one. On the other hand, if the gradient is greater than $D_{TH}$, then the counter 337 does not change its count C2 but holds it. The timing at which the wobble signal falls is also defined by the output signal of the timing generator 335.

A subdivided information detector 338 compares the count C1 of the first shape counter 336 with the count C2 of the second shape counter 337 in response to the timing signal that has been generated by the timing generator 335 to indicate the timing at which the information should be subdivided. If C1≧C2 is satisfied for a certain unit section, then the detector 338 outputs "1" as the subdivided information of the unit section. On the other hand, if C1<C2 is satisfied for a unit section, then the detector 338 outputs "0" as the subdivided information of the unit section. In other words, the detector 338 decides the type of the wobble signal by majority on a unit section basis.

An error corrector 339 makes an error correction on the group of subdivided information allocated to a plurality of unit sections included in one block, thereby obtaining address information.

These circuits do not have to be separately implemented as mutually independent circuits. Alternatively, a single circuit component may be shared by a plurality of circuits. Also, the functions of these circuits may be executed by a digital signal processor whose operation is controlled in accordance with a program pre-stored on a memory. The same statement will also be true of each of the following various embodiments of the present invention.

Embodiment 3

Figure 6:
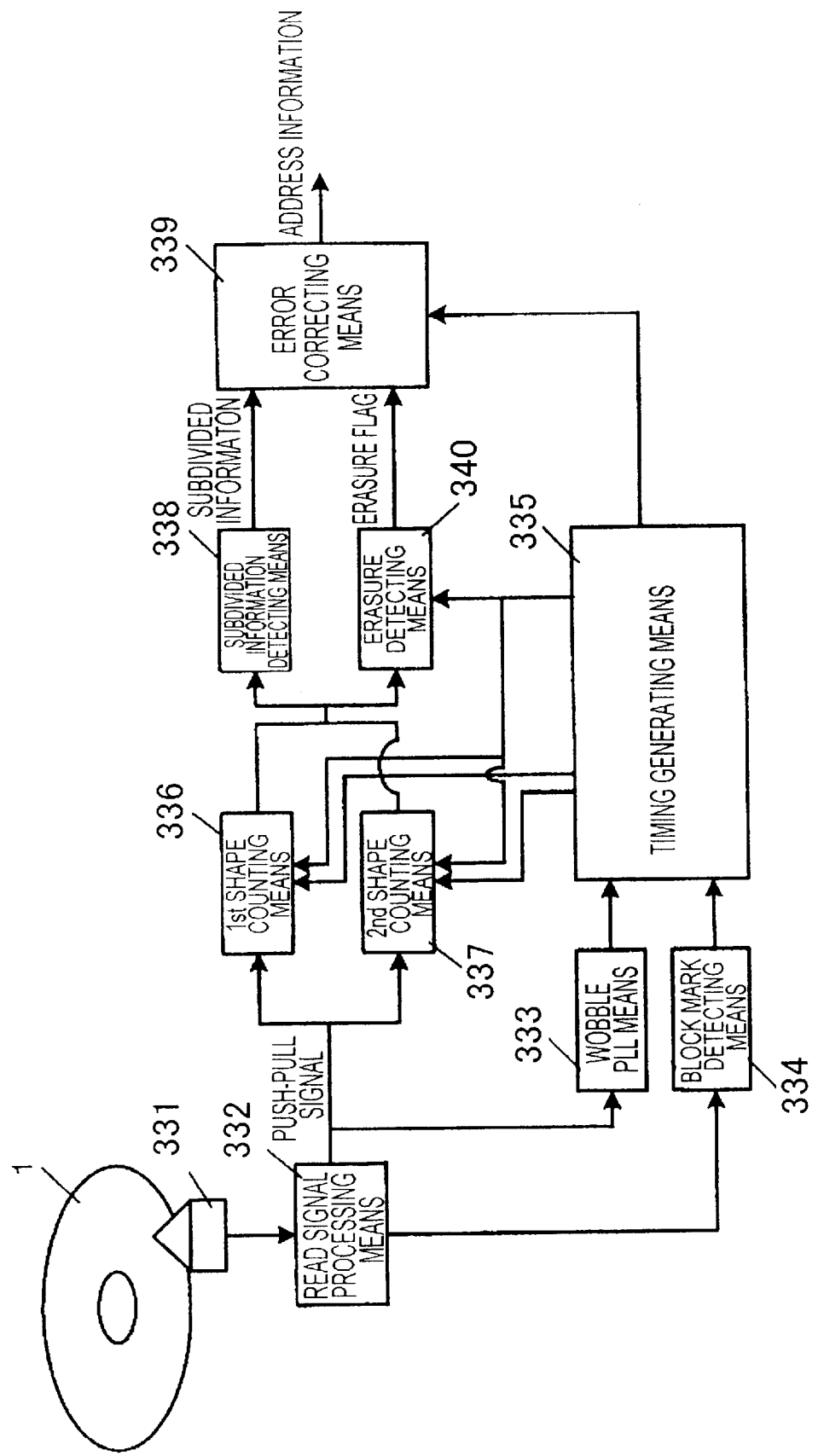
FIG. 6 illustrates a configuration for an optical disk reproducing apparatus according to a third embodiment.

Another embodiment of the optical disk apparatus of the present invention will be described with reference to FIG. 6. The optical disk apparatus of this embodiment is different from the apparatus according to the fourth embodiment in that the apparatus further includes an erasure detector 340. The error corrector 339 also has a different function. In the other respects, the apparatus of this embodiment is the same as the counterpart of the second embodiment. Thus, the description of the components commonly used for these two embodiments will be omitted herein.

The erasure detector 340 compares the count C1 output from the first shape counter 336 with the count C2 output from the second shape counter 337 for each unit section. And when an inequality −E<C1−C2<+E is satisfied with respect to a predetermined value E, the detector 340 outputs an erasure flag of "1" indicating that the subdivided information is not definitely identifiable. On the other hand, if the inequality −E<C1−C2<+E is not satisfied, the detector 340 outputs an erasure flag of "0".

If the erasure flag is "1", the error corrector 339 erases the subdivided information, thereby making an error correction compulsorily.

In this embodiment, error bits are erased using the erasure flags in this manner. Thus, the number of error-correctible bits of an error correction code is doubled.

It should be noted that as the erasure flag, "0" may be output when C1−C2≦−E, "X" may be output when −E<C1−C2<+E and "1" may be output when +E≦C1−C2. In that case, if the erasure flag is "X", the error correction may be made compulsorily.

As described above, in the optical disk reproducing apparatus of this embodiment, if subdivided information is not definitely identifiable due to a small difference between the first and second shape counts, then bits in question are erased during an error correction process. In this manner, the error correction ability is improved and an address can be read more reliably.

Embodiment 4

An inventive method for reading an address on an optical disk medium will be described with reference to FIG. 7.

Figure 7:
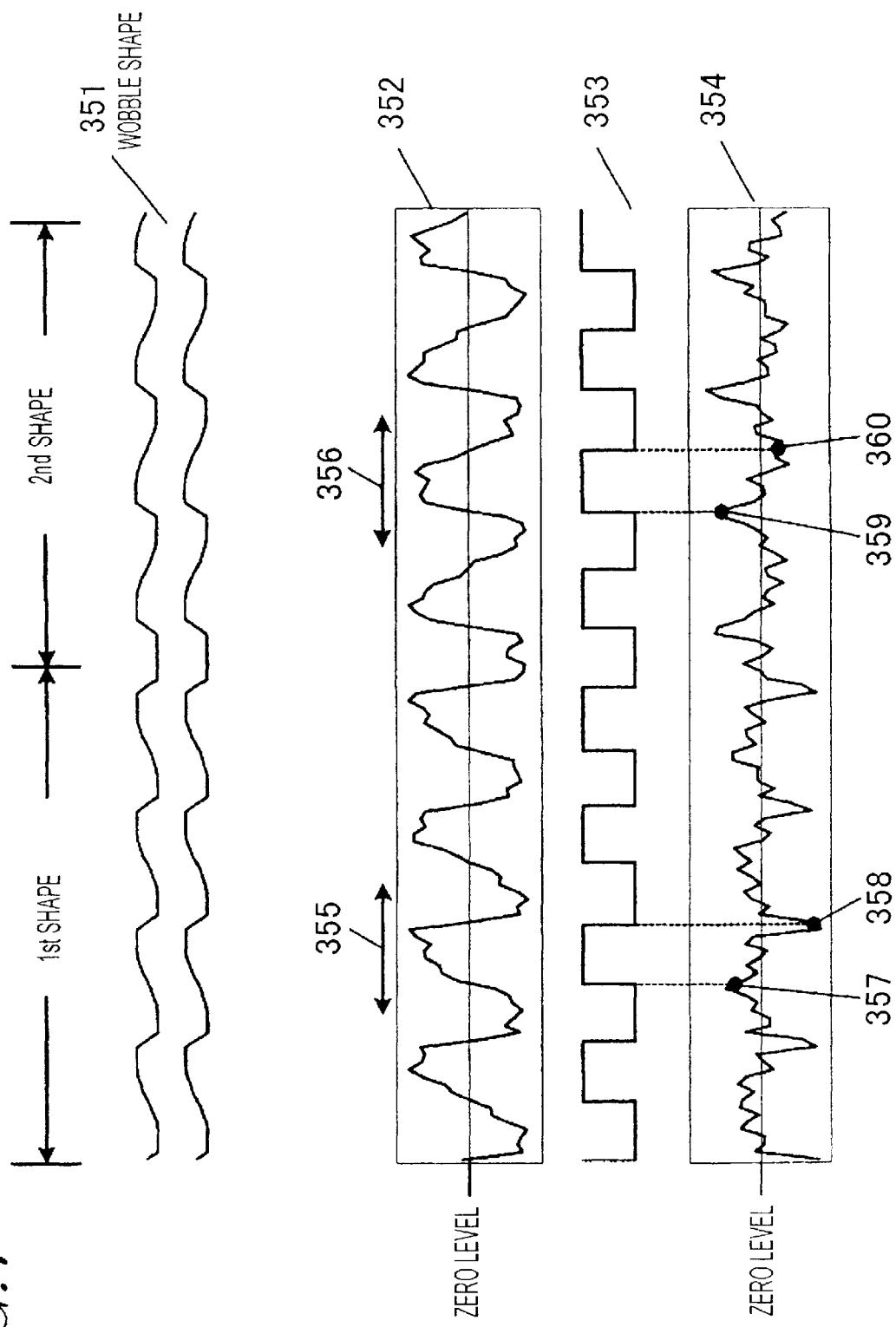
FIG. 7 illustrates an address reading method according to a fourth embodiment.

A wobble shape 351 is schematically illustrated on the upper part of FIG. 7. In the left half of the wobble shape 351, falling displacements are steep. In the right half thereof on the other hand, rising displacements are steep.

The wobble signal 352 as represented by a push-pull signal has had its quality deteriorated by noise or waveform distortion.

A digitized signal 353 is obtained by slicing the wobble signal 352 at zero level. A differentiated signal 354 is obtained by differentiating the wobble signal 352. The differentiated signal 354 contains information about the gradients of the wobble shape. A number of peaks reflecting noise or waveform distortion are observed here and there in addition to those peaks representing the gradients detected for displacement points.

For the sake of simplicity, only first and second parts 355 and 356 that are arbitrarily selected from the wobble signal will be described.

In the first part 355 of the wobble signal, when the values 357 and 358 of the differentiated signal 354 that are sampled with respect to leading and trailing edges of the digitized signal 803, respectively, have their absolute values compared with each other, the sampled value 358 has the greater absolute value. Accordingly, it may be decided that the wobble signal including the first part 355 has a wobble pattern in which a falling displacement is steeper than a rising displacement.

In the same way, as for the second part 356 of the wobble signal, when the values 359 and 360 of the differentiated signal 354 that are sampled with respect to leading and trailing edges of the digitized signal 803, respectively, have their absolute values compared with each other, the sampled value 359 has the greater absolute value. Accordingly, it may be decided that the wobble signal including the second part 356 has a wobble pattern in which a rising displacement is steeper than a falling displacement.

By making such a decision on a wobble period basis and by accumulating the decisions, the type of each subdivided information unit is identifiable by majority.

In this manner, according to the address reading method of the present invention, the differentiated signal is sampled only at the timings corresponding to the edges of the signal obtained by digitizing the wobble signal, and the sampled values are compared with each other. As a result, the gradients of the wobble shape at the displacement points are detectable highly reliably even under some disturbance such as noise or waveform distortion.

Embodiment 5

Figure 8:
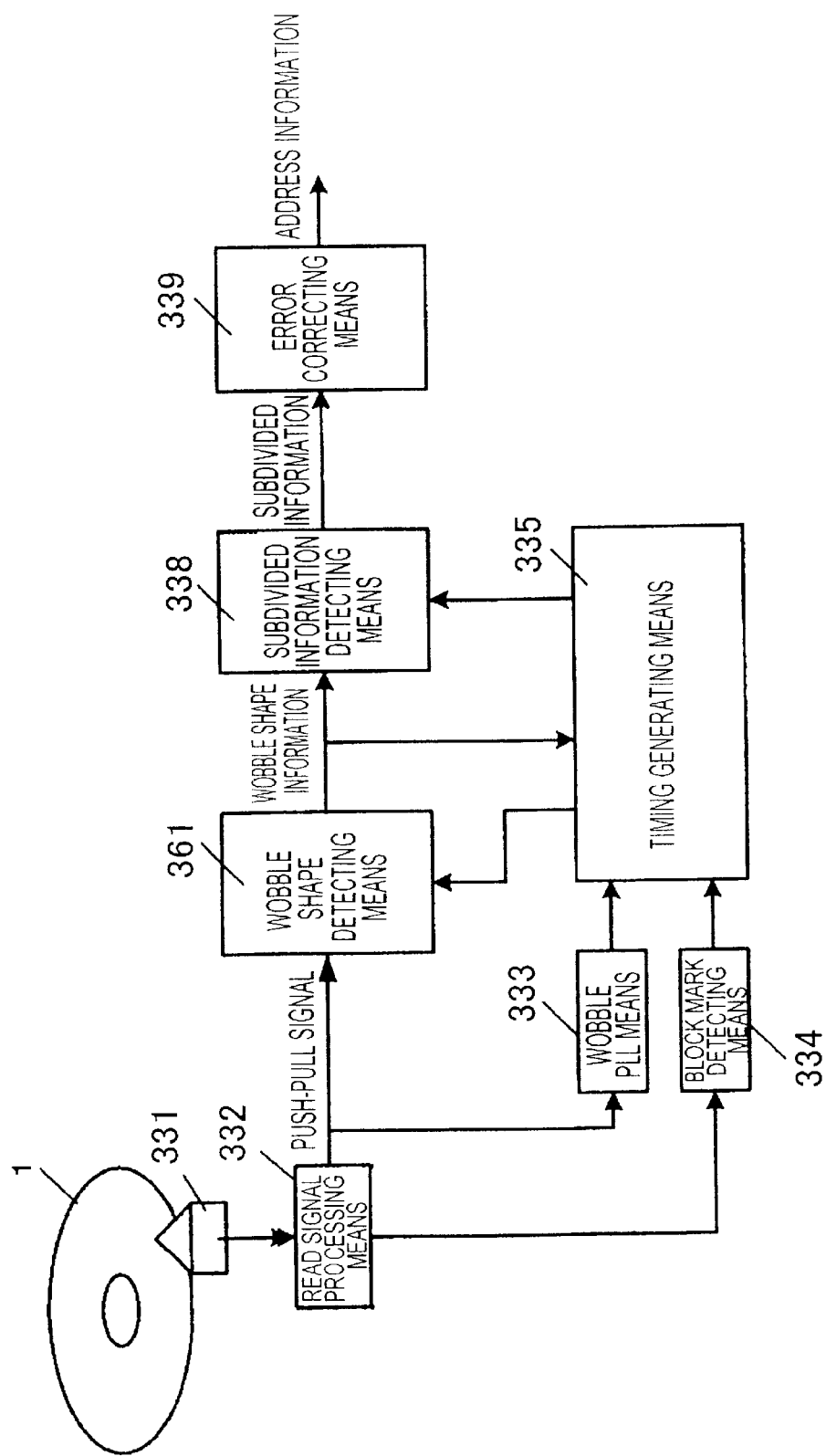
FIG. 8 illustrates a configuration for an optical disk reproducing apparatus according to a fifth embodiment.

Another optical disk reproducing apparatus for reading an address on an optical disk according to the present invention will be described with reference to FIG. 8.

Figure 5:
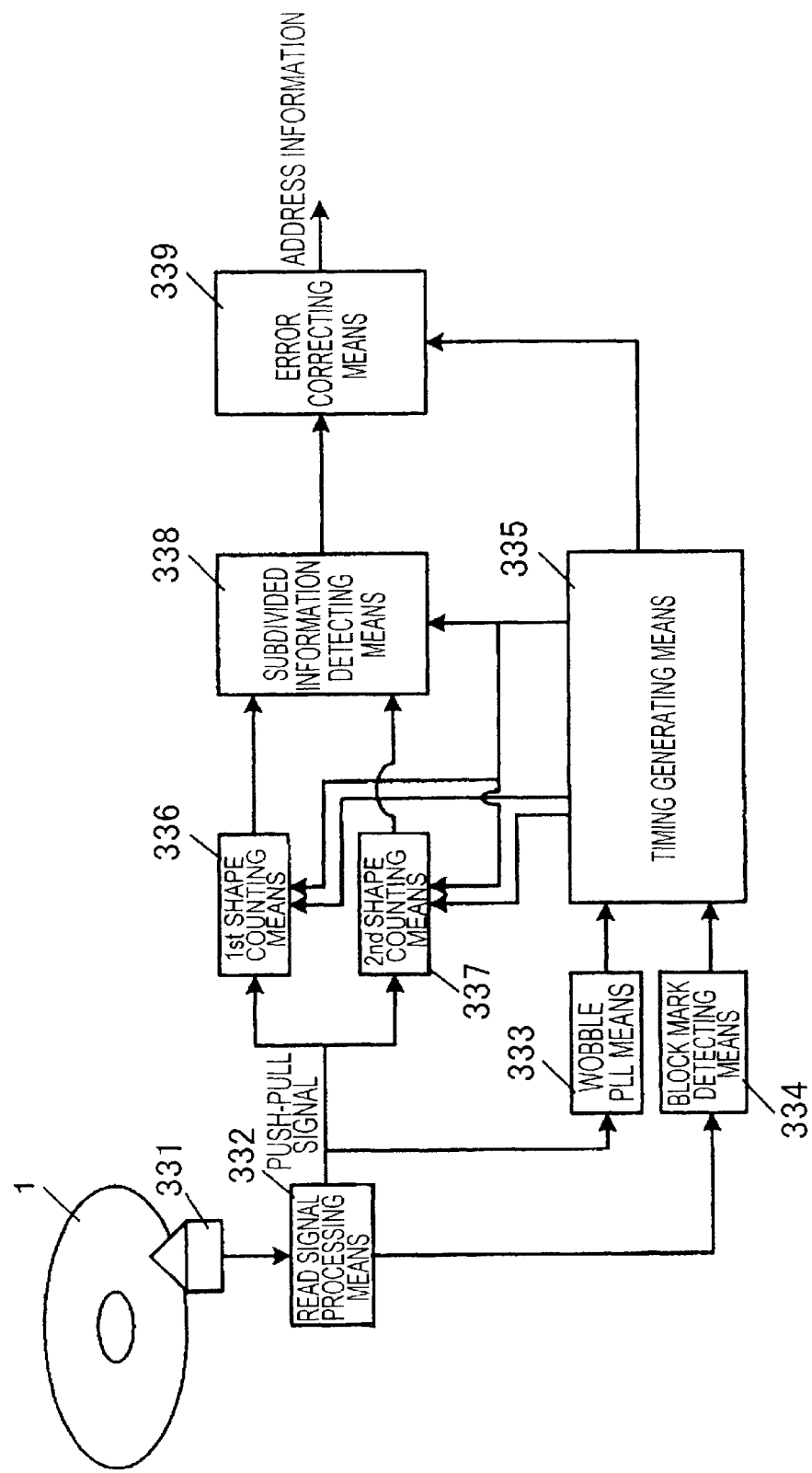
FIG. 5 illustrates a configuration for an optical disk reproducing apparatus according to a second embodiment.

The reproducing apparatus of this embodiment is different from the counterpart shown in FIG. 5 in that the drive of this embodiment includes a wobble shape detector 361. The wobble shape detector 361 identifies a given wobble shape as a first shape with a steep rising displacement or as a second shape with a steep falling displacement on a wobble period basis, thereby outputting wobble shape information to the subdivided information detector 338. In accordance with the wobble shape information obtained from the wobble shape detector 361, the subdivided information detector 338 determines which shape has been detected the greater number of times, the first shape or the second shape. Then, the detector 338 identifies and outputs the subdivided information allocated to a given subdivided information unit.

The subdivided information detector 338 may include: a counter for obtaining the number of times that a signal indicating the detection of the first shape has been received in accordance with the wobble shape information received; and another counter for obtaining the number of times that a signal indicating the detection of the second shape has been received in accordance with that information. By comparing the counts of these two shapes with each other, a decision by majority may be made. Alternatively, an up/down counter may also be used to increment the count by one when the first shape is detected and to decrement the count by one when the second shape is detected. In that case, the subdivided information may be represented by the sign of the count of the up/down counter, i.e., seeing whether the count of the up/down counter is positive or negative, at the end of a given unit section.

Figure 9:
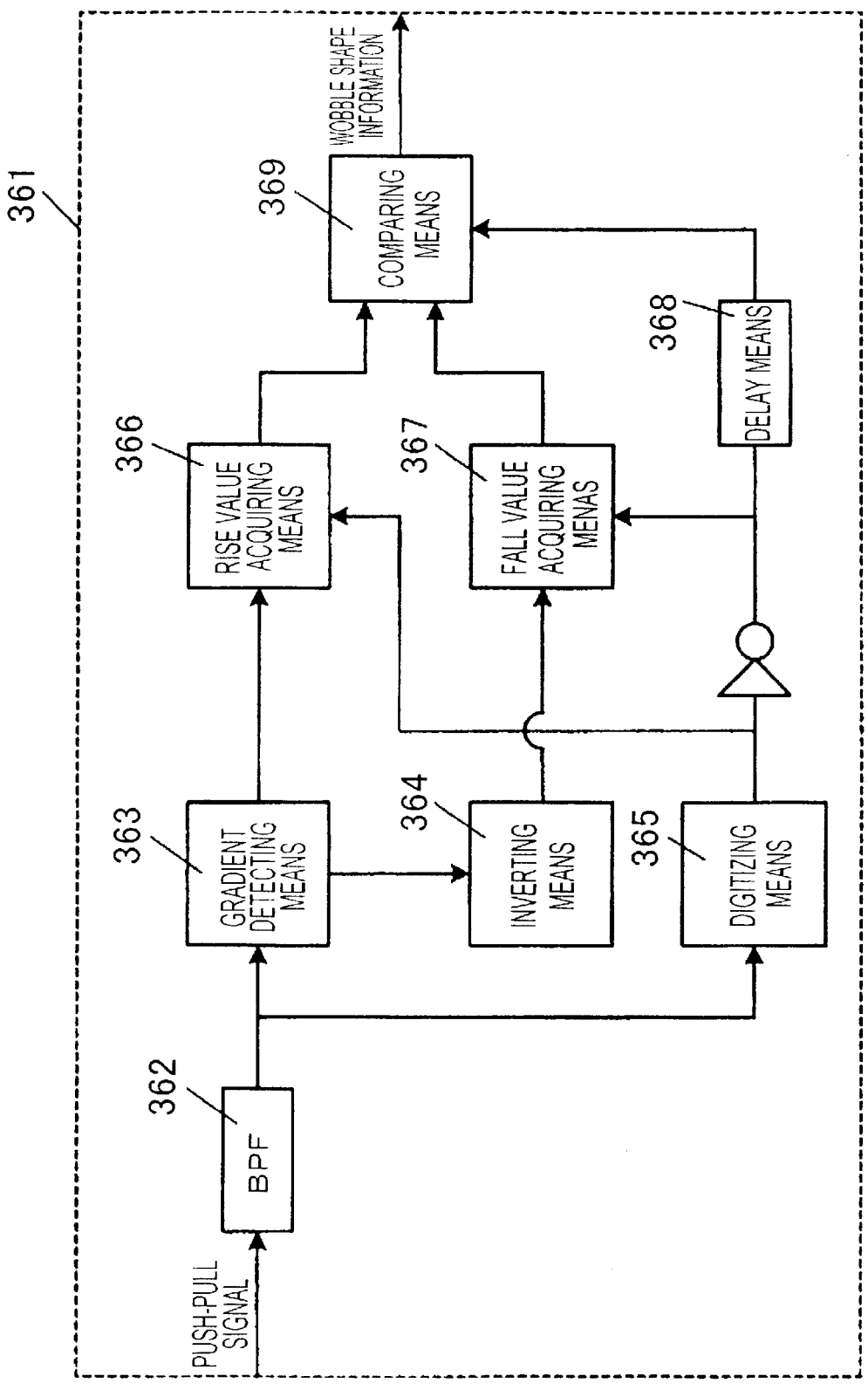
FIG. 9 illustrates a detailed configuration for a wobble shape detecting means according to the fifth embodiment.

Next, it will be described in detail with reference to FIG. 9 how the wobble shape detector 361 operates.

The wobble shape detector 361 includes a band-pass filter (BPF) 362, which receives the push-pull signal (i.e., the wobble signal) and reduces unwanted noise components thereof. This BPF 362 may pass the fundamental frequency components of the wobble signal and harmonic frequency components including wobble gradient information. Supposing the wobble signal has a fundamental frequency of fw, a band-pass filter having a band ranging from ½ fw to 5 fw is preferably used to allow a good margin for possible variation in linear velocity.

The output of the BPF 362 is input to a gradient detector 363 and a digitizer 365.

The gradient detector 363 detects the gradient of the wobble signal. This "gradient" detection may be carried out by differentiating the wobble signal. Instead of the differentiator, a high-pass filter (HPF) for extracting only harmonic components including gradient information may also be used. The output of the gradient detector 363 is delivered to a rise detector 366 and an inverter 364.

The inverter 904 inverts the output of the gradient detector 363 with respect to the zero level and then outputs the inverted value to a fall value acquirer 367.

The digitizer 905 detects rising and falling zero-cross timings of the wobble signal. The "rising zero-cross timing" herein means a time at which the wobble signal changes from "L" level into "H" level. On the other hand, the "falling zero-cross timing" herein means a time at which the wobble signal changes from "H" level into "L" level.

The rise value acquirer 366 samples and holds the gradient of the wobble signal, i.e., the output of the gradient detector 363, at the rising zero-cross timing that has been detected by the digitizer 365. In the same way, the fall value acquirer 367 samples and holds the inverted gradient of the wobble signal, i.e., the output of the inverter 364, at the falling zero-cross timing that has been detected by the digitizer 366.

In this case, the value sampled by the rise value acquirer 366 is a positive value because this value represents the gradient of a rising edge. The value sampled by the fall value acquirer 367 is also a positive value because this value represents the inverted gradient of a falling edge. That is to say, the values sampled by the rise and fall value acquirers 366 and 367 correspond to the absolute values of the respective gradients.

A comparator 369 compares the absolute value of the rising edge gradient as sampled and held by the rise value acquirer 366 to the absolute value of the falling edge gradient as sampled and held by the fall value acquirer 377 after a predetermined time has passed since the falling zero-cross timing of the wobble signal. This predetermined amount of time delay is caused by a delay circuit 368. If the value of the rise value detector 366 is found the greater, the comparator 369 outputs wobble shape information indicating the first shape. Otherwise, the comparator 369 outputs wobble shape information indicating the second shape. That is to say, by comparing only the gradients at the rising and falling zero-cross timings, at which the wobble signal gradient information is most reliable (i.e., the differentiated values thereof will be the maximum and minimum, respectively), to each other, the wobble shape is detectable accurately enough.

In this embodiment, the same signal is input to both the digitizer 365 and the gradient detector 363. However, the present invention is not limited to this particular embodiment. To detect the zero-cross timings of the wobble signal even more accurately, the output of the BPF 362 may be input to the digitizer 365 by way of a low-pass filter (LPF). Also, the BPF 362 may be replaced with two types of BPFs with mutually different characteristics that are provided for the gradient detector 363 and the digitizer 365, respectively. In that case, to match the phases of the wobble signal that has been passed through these BPFs, a delay corrector is preferably further provided separately.

As described above, in the optical disk reproducing apparatus of this embodiment, the gradients of a wobble signal including subdivided information are sampled and held at zero-cross timings of the wobble signal and then the values held are compared to each other. In this manner, the wobble shape is identifiable accurately enough and detection errors of subdivided information as caused by noise, for example, are reducible.

Embodiment 6

Figure 10:
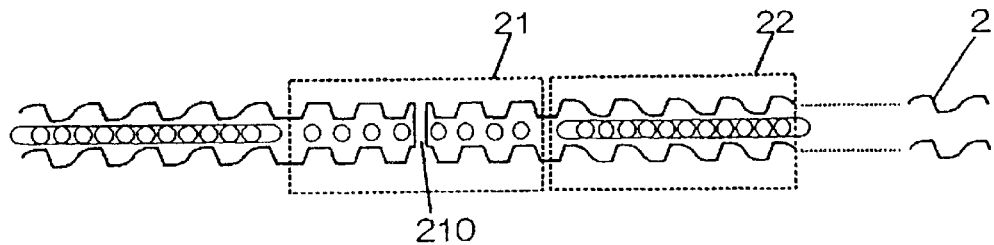
FIG. 10 illustrates a main portion of an optical disk medium according to a sixth embodiment.

FIG. 10 illustrates a configuration in which a block mark 210 is placed approximately at the center of a VFO recording area 21. In the example illustrated in FIG. 10, a wobble having a rectangular waveform has been formed in the VFO recording area 21. However, the present invention is not limited to this particular embodiment.

Figure 11A:
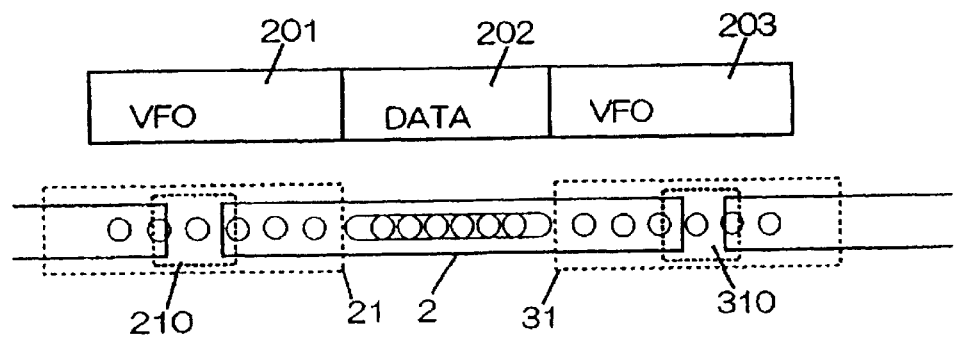
FIGS. 11A and 11B illustrate a method for writing a signal on a VFO recording area 21.
Figure 11B:
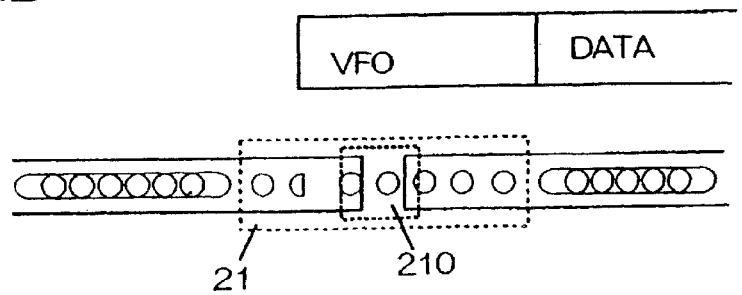

Hereinafter, it will be described with reference to FIGS. 11A and 11B how to write a signal on the VFO recording area 21. In FIGS. 11A and 11B, the wobble formed on the track groove 2 is omitted for the sake of simplicity.

FIG. 11A illustrates a situation where a signal corresponding to one block is written on the track groove 2. A recording signal for one block includes data (DATA) 202 and VFOs 201 and 203.

Writing on each block begins with the VFO 201. In this embodiment, the VFO 202 is written within the VFO area 21 and the writing start point of the VFO 202 is ahead of the block mark 210. After the VFO 202 has been written, the DATA 202 for one block is written and then the VFO 203 is written finally. The VFO 203 is written within the VFO area 31 and the writing end point of the VFO 203 is behind the block mark 210. That is to say, in this embodiment, information starts to be recorded before the block mark located at the beginning of an intended recording area is reached, and then finishes being recorded after the block mark located at the end of the intended recording area has been passed.

If data starts to be written at the center of the block mark 210, then the recording film deteriorates considerably at its part where the block mark 210 is present. The block mark 210 of this embodiment is formed by discontinuing the track groove 2 for just a short length. Accordingly, steps have been formed on the track groove where the block mark 210 is present. In recording information on those stepped parts, the information needs to be recorded on the recording film by irradiating parts of the recording film with a high-energy laser beam so that the irradiated parts will be given a high thermal energy. In this case, steep temperature gradients are formed before and after those parts irradiated with the laser beam. These temperature gradients produce a stress in the recording film. If any of the steps exists in the stressed part, then a small crack might be formed in the recording film. Once that small crack has been formed in the recording film, the crack will expand every time the write operation is repeatedly carried out. Then, the film might be broken in the end.

In this embodiment, to prevent such film breakage, the writing start and end points are placed in the areas where no block marks 211 are present.

The VFO is a dummy signal for preparing for data reading. While the VFO signal is being read, the slice level of the data is feedback-controlled at the center of the read signal and the PLL is locked to extract a clock signal. To read data with high fidelity, the read data signal needs to be digitized and clocked accurately enough. If a VFO signal interval is too short, then the data starts to be read before the PLL has been locked sufficiently, thus possibly causing errors in the data read out from the beginning of a block. Accordingly, the VFO preferably starts to be written ahead of the block mark and is preferably provided with a sufficiently long area.

It should be noted that if data has already been written on the previous block, then a VFO for the current block to be written might be overwritten on a VFO for the previous block as shown in FIG. 11B. In that case, part of the VFO signal already written is erased. Also, the preexistent VFO may not be in phase with the overwritten VFO. Accordingly, it is not preferable to get the PLL for the current block locked by using the VFO of the previous block.

The foregoing description of this embodiment relates to the VFO writing start point. Similar recording film deterioration is also observed around the data writing end point. However, the writing end point is preferably behind the block mark 310, not before. If the writing end point was located ahead of the block mark 310, then a gap might be formed between the current block and the following block. This gap is an area that is not irradiated with the high-power light and in which no marks are formed. Just like the steps, such a gap might contribute to the film deterioration. Accordingly, the VFO at the end of the previously written block preferably overlaps with the VFO at the beginning of the current block to be written. This VFO overlap is achieved by setting the VFO writing start point ahead of the block mark 210 and the VFO writing end point behind the block mark 310, respectively, as shown in FIG. 11A.

The distance between the block mark and the VFO writing start or end point is preferably about 10 or more times as long as the beam spot size of the laser light for writing. A beam spot size is obtained by dividing the wavelength of laser light by an NA value. Accordingly, when an optical head, which emits laser light having a wavelength of 650 nm and has an NA of 0.65, is used, the size of a beam spot formed on a disk is 1 $\mu$m (=wavelength/NA). In that case, the writing start or end point is preferably 10 $\mu$m or more distant from the block mark. However, that reference distance obtained by multiplying the beam spot size by ten may be correctible depending on the properties (e.g., thermal conductivity, in particular) of the recording film.

It should be noted, however, that when the write operation is started ahead of the block mark 210, the block mark has not been detected yet. Accordingly, to start writing exactly before the block mark, the location of the block mark should be predicted or estimated in some way or other. For example, after the block mark of the previous block has been detected, the number of clock pulses of the clock signal may be counted. And when the count reaches a predetermined number, the VFO may start to be written on the next block.

Embodiment 7

Figure 12:
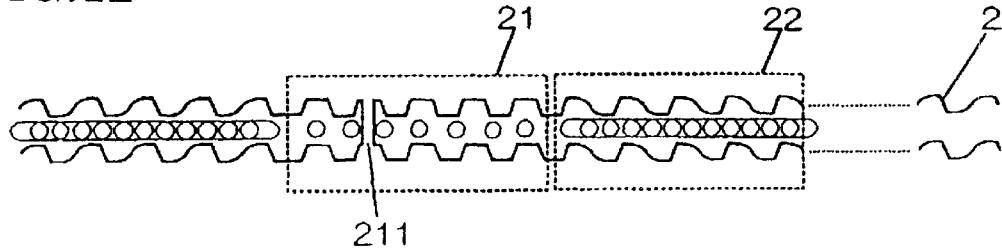
FIG. 12 illustrates a main portion of an optical disk medium according to a seventh embodiment.

An optical disk medium according to a seventh embodiment will be described with reference to FIG. 12. In the embodiment described above, the block mark 210 is placed approximately at the center of the VFO recording area 21. In contrast, according to this embodiment, a block mark 211 is formed closer to the previous block with respect to the center of the VFO recording area 21 as shown in FIG. 12. In such a configuration, the VFO may be longer at the beginning.

Embodiment 8

Figure 13:
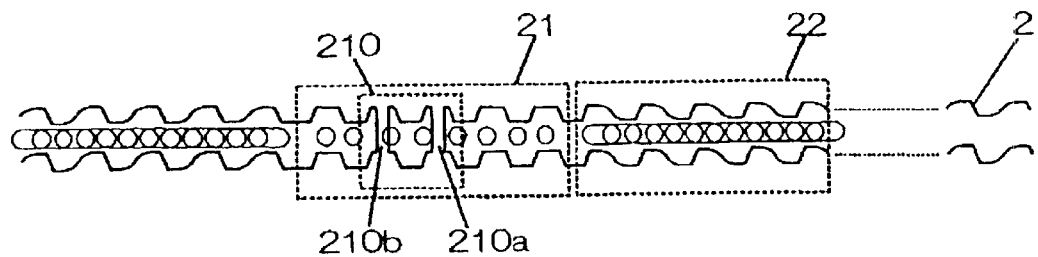
FIG. 13 illustrates a main portion of an optical disk medium according to an eighth embodiment.
Figure 14A:
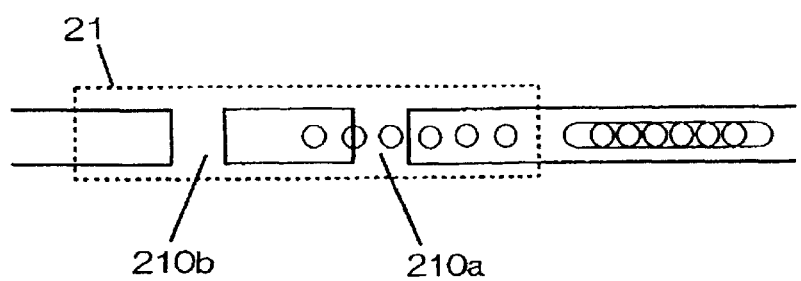
FIGS. 14A and 14B illustrate a signal writing method according to the eighth embodiment.
Figure 14B:
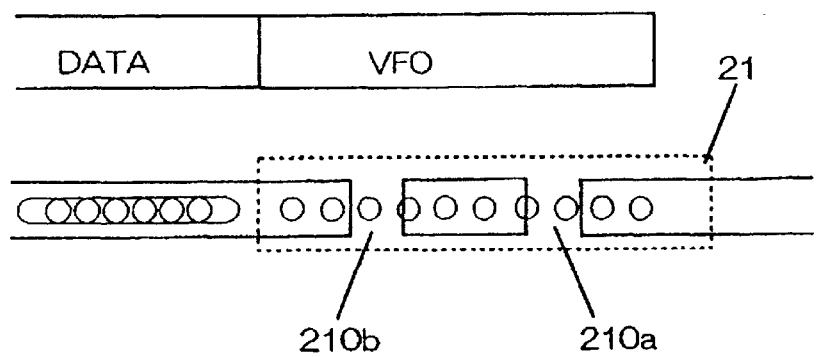

An optical disk medium according to an eighth embodiment will be described with reference to FIGS. 13, 14A and 14B.

The block mark 210 of this embodiment is made up of sub-marks 210a and 210b. According to this configuration, the write operation can be timed more easily. That is to say, since two marks have been formed, the write operation may be started after the mark 210b at the beginning of a block has been detected and before the mark 210a is detected. Also, the write operation may be ended after the second mark 210a located at the beginning of the next block has been detected.

In this manner, the writing start point can be set accurately enough without counting the number of clock pulses after the block mark of the previous block has been detected.

It should be noted that to avoid the film deterioration, the space between these marks 210a and 210b should be sufficiently wide. Specifically, to set the distance between the writing start point and the mark 210a or 210b about 10 or more times as long as the beam spot size, the space between the marks 210a and 210b should preferably be about 20 or more times as long as the beam spot size. For example, where the size of a beam spot formed on an optical disk is 1 $\mu$m, this space is preferably set to 20 $\mu$m or more.

Embodiment 9

An optical disk according to a ninth embodiment will be described with reference to FIG. 15. In each of the embodiments described above, the block mark 210 is formed by discontinuing the track groove 2 for just a short length. In such a part where the track groove is discontinued, no groove exists. Accordingly, that part is flat and is called a "mirror mark". A mirror mark reflects read light at a high reflectance and is easily detectable. In this embodiment, however, the block mark is not formed as a mirror mark but a block mark 218 in a different shape is adopted. Hereinafter, this block mark 218 will be described in detail.

Figure 15:
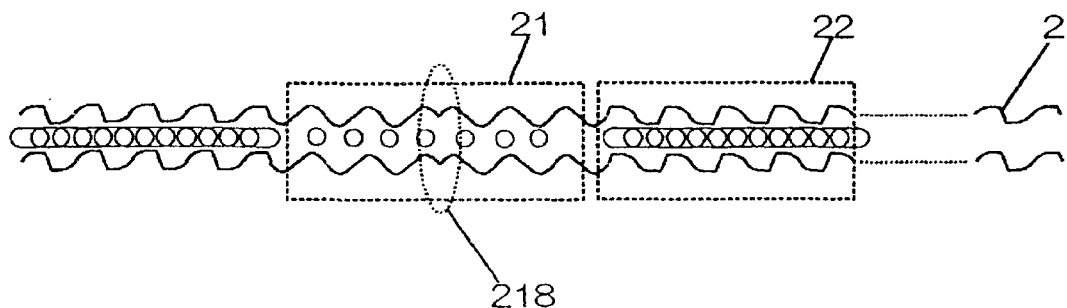
FIG. 15 illustrates a main portion of an optical disk medium according to a ninth embodiment.

In this embodiment, the wobble phase of the track groove is inverted inside the VFO recording area 21 and this part with the inverted phase is used as the block mark 218 as shown in FIG. 15.

As described above, the block mark 210 as a mirror mark advantageously ensures high positioning accuracy and is easily detectable. However, if the SN ratio is low, then detection errors increase considerably. In contrast, if the track groove is formed in such a manner that the wobble phase before the block mark 218 is the inverse of the wobble phase after the block mark 218, the passage of the block mark 218 may be sensed at any time by observing the wobble phase after the block mark 218 has been passed. This passage is sensible even if the wobble phase change point (i.e., the block mark 218) could not be located due to noise, for example.

Embodiment 10

Figure 16:
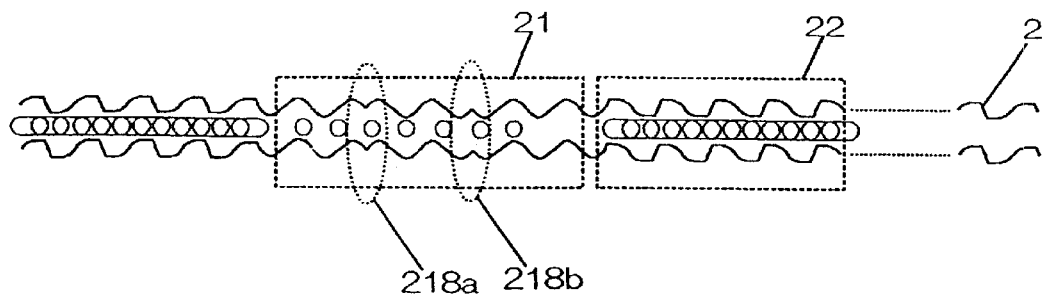
FIG. 16 illustrates a main portion of an optical disk medium according to a tenth embodiment.

Another embodiment of the inventive optical disk will be described with reference to FIG. 16. In this embodiment, two block marks 218a and 218b are provided inside each VFO recording area 21. Each of these block marks 218a and 218b is formed by inverting the wobble phase of the track groove.

The main difference between this embodiment and the embodiment illustrated in FIG. 15 is whether the number of times the wobble phase is inverted between a pair of blocks is an odd number or an even number. As shown in FIG. 15, where the wobble phase is inverted just once (i.e., an odd number of times) within each VFO recording area 21, the wobble phase will be kept inverted to that of the previous block since the phase has been inverted and until the next block mark is passed. As a result, if a clock signal is extracted as it is from the wobble of the track groove by a PLL synchronization technique, then the output of the phase comparator of the PLL will have its polarity inverted and the PLL will slip disadvantageously. For that reason, if the wobble phase is inverted an odd number of times as in the example illustrated in FIG. 15, the polarity of the PLL needs to be inverted after the block mark has been passed.

In contrast, according to this embodiment, the phase that has been once inverted (at the block mark 218a) is inverted again (at the block mark 218b). Thus, the wobble phase becomes the same as that of the previous block. Accordingly, there is no need to invert the polarity of the PLL.

In each VFO recording area 21, the interval between the block marks 218a and 218b needs to be longer than expected defect noise. However, if this interval is longer than the response time of the PLL, the probability of occurrence of the slip increases. In view of these considerations, the interval between the block marks 218a and 218b within each VFO recording area 21 is preferably about three to about ten times as long as the wobble frequency.

It should be noted that the number of the block marks 218a, 218b inside each VFO recording area 21 is not limited to two but may be another even number to achieve effects similar to those of this embodiment. However, more than four block marks 218a, 218b should not be formed within a limited length in view of the density of integration.

In the fourth and fifth embodiments described above, the block marks are formed by inverting the wobble phase. However, so long as the phase change is detectable, the phases before and after the block mark do not have to be shifted from each other by 90 degrees precise. The shift in wobble phase at the block mark is preferably from 45 degrees to 135 degrees, for example.

Embodiment 11

Figure 17:
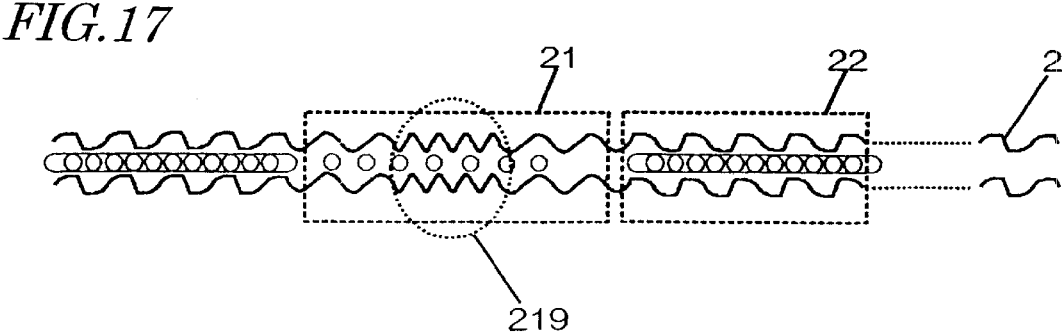
FIG. 17 illustrates a main portion of an optical disk medium according to an eleventh embodiment.

Next, a sixth embodiment of the present invention will be described with reference to FIG. 17.

This embodiment is different from the foregoing embodiments in the configuration of the block mark 219. Specifically, the block mark 219 of this embodiment is defined by a wobble having a frequency different from the wobble frequency of the groove located inside the block. In the illustrated example, the wobble frequency of the block mark 219 is higher than that inside the block. Accordingly, if part of a read signal, which has a locally different wobble frequency, is separated or identified by processing the read signal using a band pass filter, for example, then the block mark 219 can be located highly accurately.

In the optical disk medium of this embodiment, the block mark 219 is also formed inside the VFO recording area 21, and VFO data is also written on the area where the block mark 219 is present.

The wobble frequency of the block mark 219 is preferably set 1.2 to 3.0 times as high as, more preferably 1.5 to 2.0 times as high as, the wobble frequency inside the block. If the wobble frequency of the block mark 219 is too close to that inside the block, then it is hard to detect the block mark 219. On the other hand, if the wobble frequency of the block mark 219 is too much higher than that inside the block, then the former wobble frequency will get closer to the signal frequency of the information to be written on the recording film. As a result, these signals will interfere with other disadvantageously.

It should be noted that in the space between a pair of blocks, a wobble having the same frequency as the wobble frequency inside the blocks is preferably formed except the area of the block mark 219. In the block-to-block space, the wobble shape is preferably different from the wobble shape inside the blocks. In the example illustrated in FIG. 17, the block-to-block groove wobbles in a sine wave curve.

Embodiment 12

Figure 18:
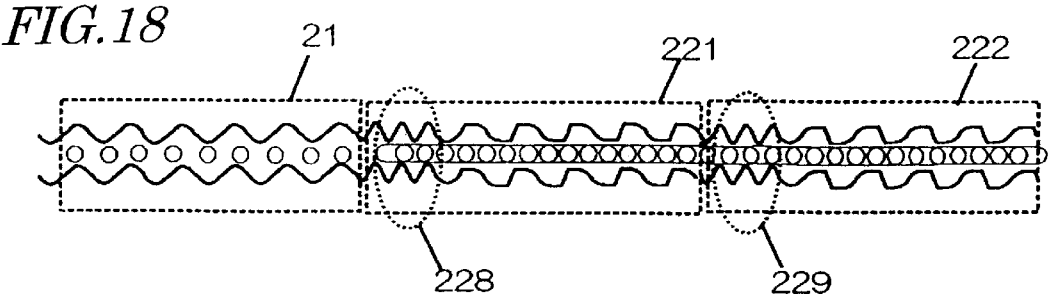
FIG. 18 illustrates a main portion of an optical disk medium according to a twelfth embodiment.

Next, a seventh embodiment of the present invention will be described with reference to FIG. 18.

In this embodiment, no shape that has its amplitude, frequency or phase changed locally is used as the block mark, but a groove itself wobbling in a sine waveform curve is used as the block mark. Also, the beginning of each sub-block 221 or 222 includes a wobble 228 or 229 with a locally changed frequency.

By placing such an area having a wobble frequency different from the fundamental wobble frequency at the beginning of each sub-block in this manner, the boundary between the sub-blocks is detectable correctly. In the foregoing embodiments, a sub-block is located by counting the number of wobbles from the block mark. On the other hand, in this embodiment, a sub-block can be located by counting the number of sub-block marks 228, 2229 provided for the respective sub-blocks.

It should be noted that a block mark similar to the counterpart of any of the foregoing embodiments may be formed at an appropriate position inside the VFO area 21. Also, in this embodiment, the sub-block identification mark 228, 229 having a locally different wobble frequency is formed at the beginning of each sub-block 221, 222. Alternatively, the sub-block mark 228, 229 may be placed at the end of each sub-block. Also, the identification marks 228, 229 do not have to be provided for all sub-blocks but may be provided for only odd-numbered or even-numbered sub-blocks.

Because of the same reasons as those described above, the wobble frequency of the sub-block marks 228, 229 is preferably 1.2 to 3.0 times as high as, more preferably 1.5 to 2.0 times as high as, that of the other parts.

The sub-block marks 228, 229 are preferably used for indicating the beginning thereof but may represent any other type of information. For example, the address of a block or any other associated block may be recorded by using a plurality of sub-block marks included in the former block. Or any other type of information may be recorded by using the sub-block marks. When the address of a block is recorded by using a plurality of sub-block marks, the address is also recorded by the wobbles inside the block. Thus, the address obtained is much more reliable.

In recording multi-bit information as a combination of these sub-block marks, the sub-block marks should have mutually different and identifiable shapes corresponding to two or more values. For this purpose, the wobbles of those sub-block marks may be given mutually different frequencies or may be subjected to mutually different types of phase modulation.

Figure 19:
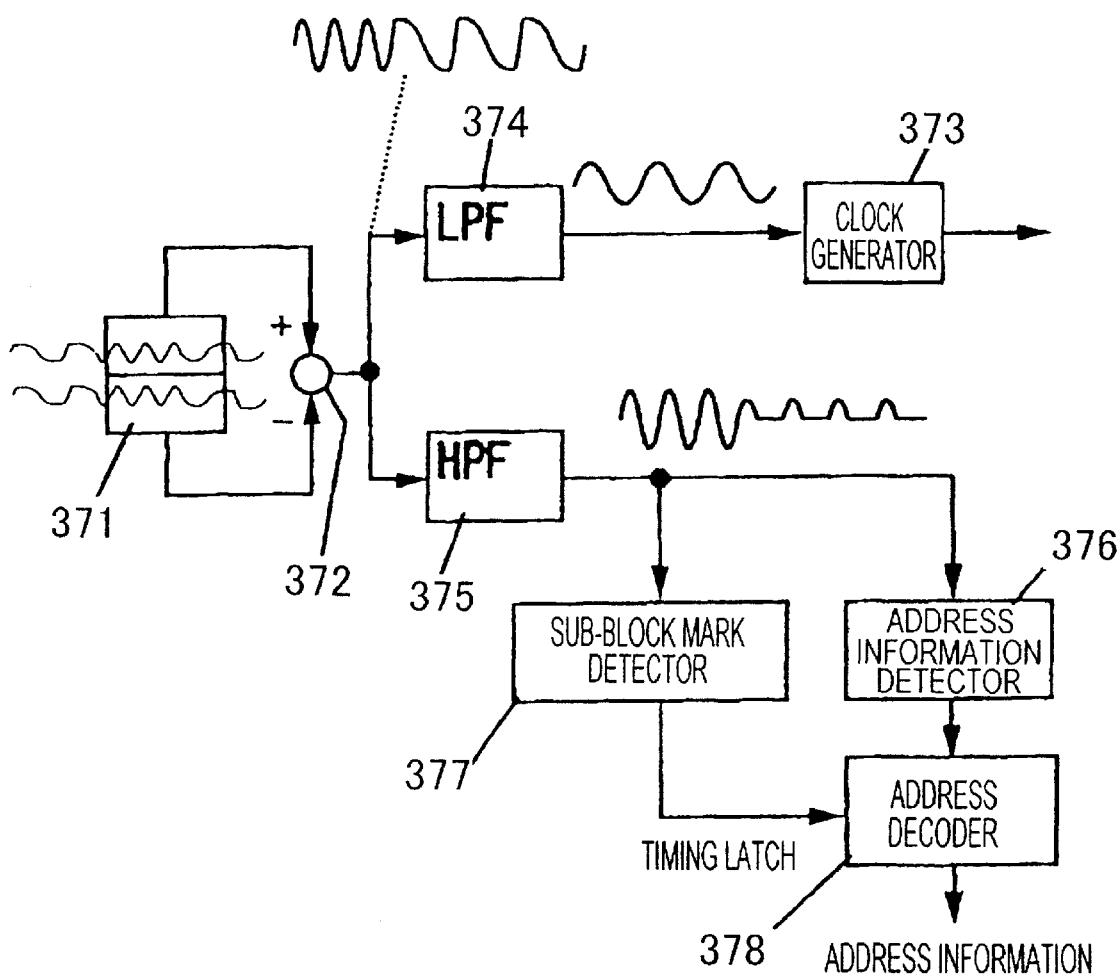
FIG. 19 illustrates a configuration for an apparatus for generating a clock signal and reading an address signal from the optical disk medium of the twelfth embodiment.

Next, a circuit configuration for generating a clock signal and reading address information from an optical disk medium according to this embodiment will be described with reference to FIG. 19.

First, a photodetector 901 that has been divided in a direction vertical to the tracking direction (i.e., in the disk radial direction) and a differential amplifier 371 are used to generate an electric signal including signal components corresponding to the wobble of the groove. Next, a low-pass filter (LPF) 374 extracts only the fundamental period components of a wobble signal from this read signal. The signal having only the fundamental period components is supplied to a clock generator 373. The clock generator 373 may be implemented as a PLL circuit, for example, and multiplies the fundamental period signal received by a predetermined number, thereby generating a clock signal for use in read/write signal synchronization processing.

On the other hand, a high-pass filter (HPF) 375 selectively passes the harmonic components included in the read wobble signal. The output of the high-pass filter 375 includes: high frequency components corresponding to the sub-block marks 228 and 229 shown in FIG. 18; and steep edge components of a saw-tooth signal generated by a saw-tooth wobble.

A sub-block mark detector 377 detects the wobble components having a predetermined frequency and corresponding to the sub-block marks 228 and 229. On detecting these marks, the detector 377 generates a timing signal. The timing signal output from the sub-block mark detector 377 is sent to an address decoder 378.

As described above, a steep edge of a saw-tooth wobble has its polarity inverted depending on whether it represents "1" or "0" of address information. In accordance with the output of the high-pass filter 375, an address information detector 376 detects this polarity inversion and sends out a bit stream to the address decoder 378. On receiving this bit stream, the address decoder 378 decodes the address information in response to the timing signal that has been output from the sub-block mark detector 377.

In this embodiment, an identification mark, on which a VFO signal can be overwritten, is formed for each block and an address is represented by the wobble of the groove. As a result, an optical disk medium, on which information is stored on a block-by-block basis and which is suitably applicable to high-density recording, is provided. Also, by starting or ending the write operation at a position sufficiently distant from this identification mark, the deterioration of the recording film is reducible.

Embodiment 13

Figure 20:
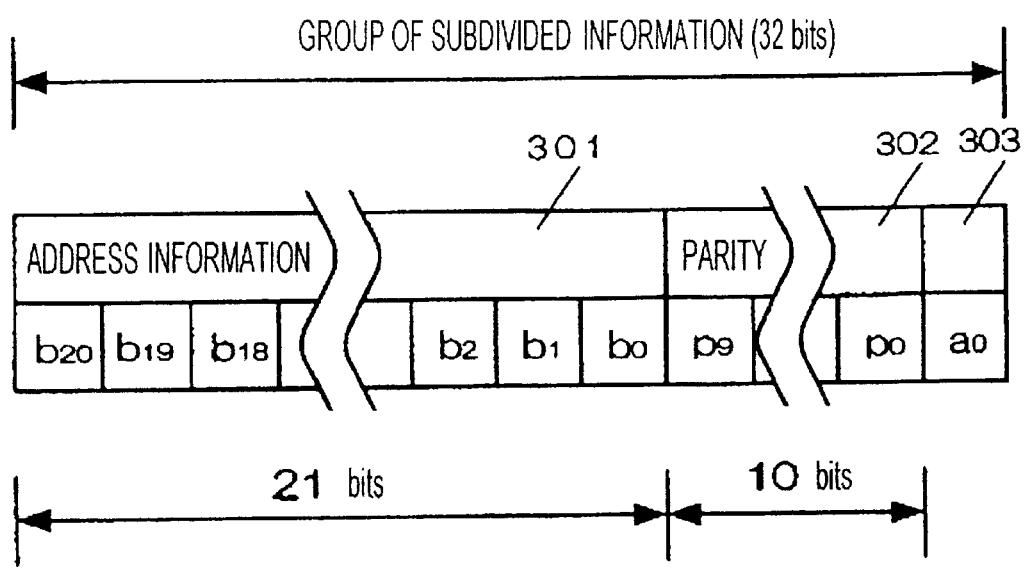
FIG. 20 illustrates a format for a group of subdivided information on an optical disk medium according to a thirteenth embodiment.

Next, FIG. 20 will be referred to.

On an optical disk according to this embodiment, address information 301 is recorded as the high-order 21 bits of a group of subdivided information of 32 bits. Parity bits 302 used as an error correction code are recorded as the intermediate 10 bits of the 32-bit subdivided information group. And additional information 303 is recorded as the least significant bit. If this optical disk has two recording layers, then "0" may be recorded as the additional information 303 for the first recording layer and "1" may be recorded as the additional information 303 for the second recording layer. However, the contents of the additional information 303 are not limited to such layer information. Alternatively, the amount of information represented by the additional information 303 may be increased by combining multiple pieces of additional information of a series of blocks. Then, information even more complicated than the layer information, e.g., copyright information or manufacturer information, is can be stored. A simple parity bit as an exclusive logical sum of the 21-bit address information or the 31-bit error correction code may also be used. In that case, the ability of error detection or error correction is improvable. Also, every additional information may be "1". Furthermore, if only a block mark that follows a unit section with subdivided information of "1" is identified as the block mark, then the block mark detection accuracy is improvable.

In this embodiment, the 31-bit error correction code is a BCH code, which is well known as a code for correcting 2 or more error bits. Supposing the 31-bit address information is represented by b0, b1, . . . , b20 and the 10 parity bits are represented by p0, p1, . . . , p9 as shown in FIG. 20, an information polynomial I(x) is given by Equation (1) and a parity polynomial P(x) is given by Equation (2), P(x) is generated by Equation (3). In that case, the generator polynomial G(x) is given by Equation (4). This is well known as a (31, 21) BCH code, in which arbitrary 2 bits included in a 31-bit codeword may be error-corrected.

$$I(x) = \sum_{i=0}^{20} b_i \cdot x^i \qquad \text{(Equation 1)}$$

$$P(x) = \sum_{i=0}^{9} p_i \cdot x^i \qquad \text{(Equation 2)}$$

$$P(x) = x^{10} \cdot I(x) \bmod G(x) \qquad \text{(Equation 3)}$$

$$G(x) = x^{10} + x^9 + x^8 + x^6 + x^5 + x^3 + 1 \qquad \text{(Equation 4)}$$

On the optical disk of this embodiment, the address information, parity bits and additional information are arranged in this order. However, the present invention is not limited thereto. So long as the arrangement is fixed in advance, no matter where the group of subdivided information, including the 21-bit address information, 10 parity bits and 1-bit additional information, is placed, these bits may be processed by rearranging them to their original positions. On the optical disk of this embodiment, each block has 32-bit subdivided information. Alternatively, even when each block has subdivided information of 26 bits, 52 bits, 64 bits, etc., similar effects are achievable by selecting an appropriate error correction code.

As described above, in the optical disk medium of this embodiment, one information block is subdivided into a number N (=32) of sub-blocks. And by pre-forming a wobble in such a shape as representing each piece of subdivided information for each section corresponding to each sub-block, an address can be formed without any overhead or without providing any pre-pits between adjacent parts of the groove. Furthermore, the wobbles formed in this embodiment have a constant wobble frequency even though the rising or falling edges thereof may have different shapes among respective pieces of subdivided information. Accordingly, in extracting a write clock signal from the wobble signal, after noise components have been removed therefrom using a band-pass filter that has a bandwidth broad enough to pass its frequency, the signal may be simply multiplied and synchronized using a PLL. Then, a clock signal with a reduced jitter can be obtained. Furthermore, by classifying the subdivided information group into the address information part and the parity part and by using this subdivided information group as an error correction code, address information is readable highly reliably.

Embodiment 14

Figure 21:
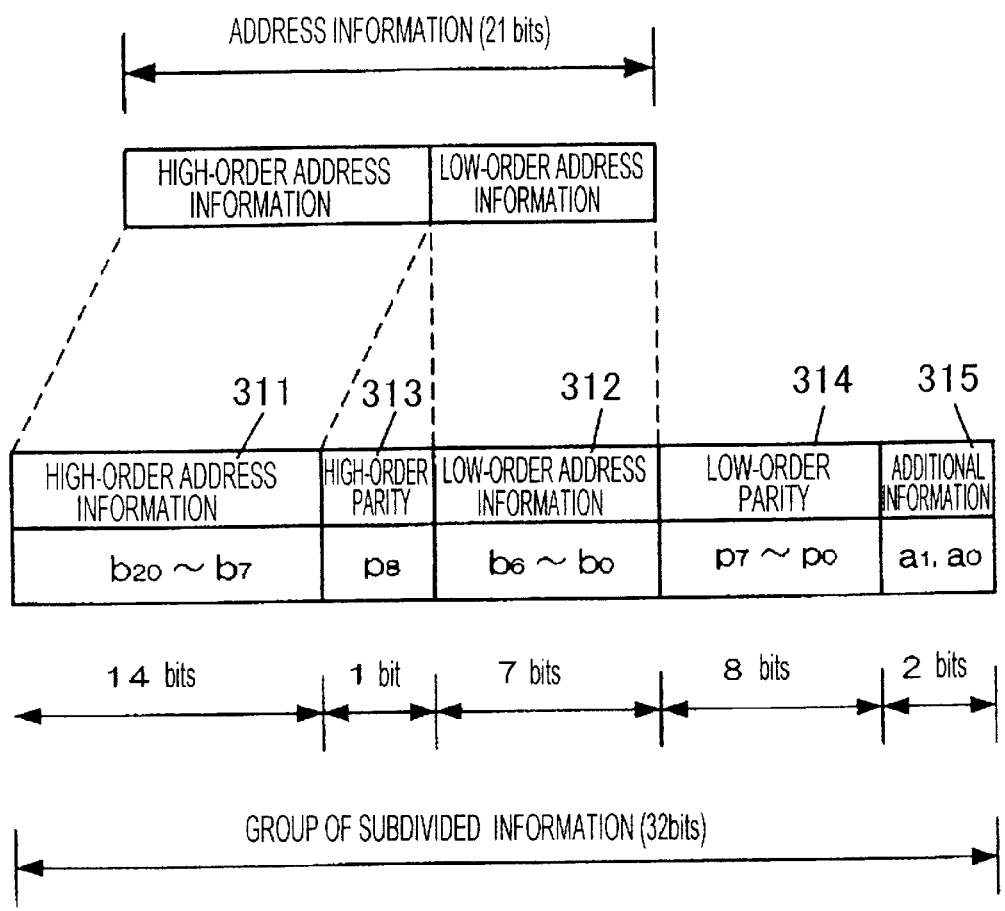
FIG. 21 illustrates a format for a group of subdivided information on an optical disk medium according to a fourteenth embodiment.

FIG. 21 illustrates a bit allocation for a subdivided information group on an optical disk medium according to a fourteenth embodiment. It should be noted that although the subdivided information group of the optical disk of this embodiment has a format different from that of the optical disk of the thirteenth embodiment, the optical disk of this embodiment has the same subdivided information arrangement or shapes as the optical disk of the thirteenth embodiment.

Address information is normally arranged sequentially. Accordingly, if the address of the preceding block is known, then the address of the block succeeding the former block is predictable. However, when an erroneous track jump happens, for example, continuity cannot be kept anymore. Nevertheless, the address discontinuity caused by the erroneous track jump or the like is often observed only in low-order bits. Also, the high-order bits are estimable from the radial position of the optical head, for example. Thus, the low-order bits of address information may be regarded as the more variable and the more important.

In view of these considerations, on the optical disk of this embodiment, the 21-bit address information is divided into high-order address information 311 of 14 bits and low-order address information 312 of 7 bits. One high-order parity bit 313 is added to the high-order address information 311 to make an error correction code (or error detection code) of 15 bits. Furthermore, eight low-order parity bits 314 are added to the low-order address information 312 to make another error correction code of 15 bits. And 2-bit additional information 315 is further added, thereby forming a subdivided information group of 32 bits. It should be noted that the additional information 315 is almost the same as the additional information 303 of the thirteenth embodiment.

In this embodiment, the 15-bit error correction code, made up of the low-order address information 312 and the low-order parity bits 314, is a BCH code, which is well known as a code for correcting 2 or more error bits. Supposing the 7-bit low-order address information 312 is represented by b0, b1, . . . , b6 and the eight low-order parity bits 314 are represented by p0, p1, . . . , p7, an information polynomial I(x) is given by Equation (5) and a parity polynomial P(x) is given by Equation (6), P(x) is generated by Equation (7). In that case, the generator polynomial G(x) is given by Equation (8). This is well known as a (15, 7) BCH code, in which arbitrary 2 bits included in a 15-bit codeword may be error-corrected.

$$I(x) = \sum_{i=0}^{6} b_i \cdot x^i \qquad \text{(Equation 5)}$$

$$P(x) = \sum_{i=0}^{7} p_i \cdot x^i \qquad \text{(Equation 6)}$$

$$P(x) = x^8 \cdot I(x) \bmod G(x) \qquad \text{(Equation 7)}$$

$$G(x) = x^8 + x^7 + x^6 + x^4 + 1 \qquad \text{(Equation 8)}$$

Also, supposing the 14-bit high-order address information 311 is represented by b8, b9, . . . , b20, the high-order parity bit 313 (which is herein represented by p10) is an even parity bit given by p10=b8+b9+ . . . b20 (where "+" is an exclusive-OR operator). In this case, arbitrary one error bit included in a codeword may be detected. In this manner, by using a parity bit with a small redundancy for the high-order address information and parity bits with a large redundancy for the low-order address information, respectively, the low-order bits of the address information can have "more heavily weighted" error correction ability so to speak.

For the optical disk of this embodiment, two error correction codes are obtained by adding one parity bit to the high-order 14 bits of the address information and eight parity bits to the low-order 7 bits of the address information, respectively. However, the numbers of the high- and low-order bits divided are not limited thereto. For example, one parity bit may be added to high-order 16 bits and 10 parity bits may be added to the low-order 5 bits (where the low-order bits are part of a (15, 5) BCH code). Also, no parity bits may be added to high-order 9 bits and 11 parity bits may be added to the low-order 12 bits (where the low-order bits are part of a (23, 12) BCH code).

As described above, the optical disk medium of this embodiment also achieves the effects of the optical disk medium of the thirteenth embodiment. In addition, in this embodiment, the address information is divided into high- and low-order bits and the low-order bits are provided with higher error correction ability, thereby reading the address information even more reliably.

However, the optical disk media of the thirteenth and fourteenth embodiments each use a BCH code, which is a complicated error correction code. Thus, these media have a problem in that a circuit required for reading addresses therefrom should have a large size.

Embodiment 15

Figure 22:
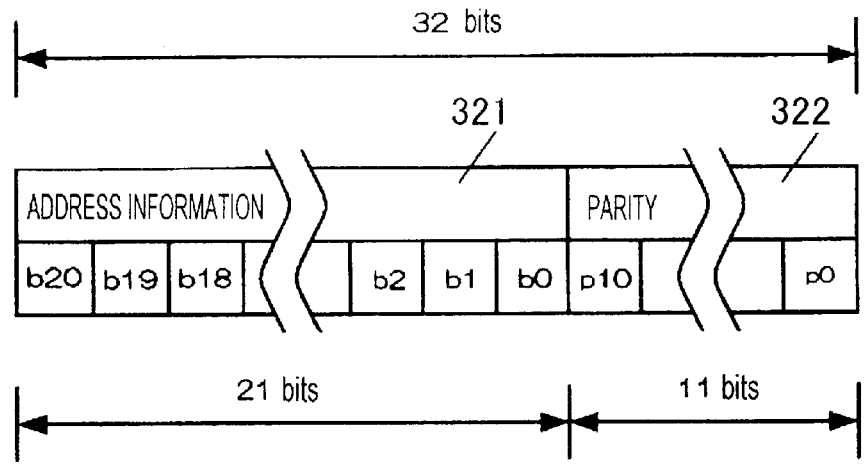
FIG. 22 illustrates a format for a group of subdivided information on an optical disk medium according to a fifteenth embodiment.

FIG. 22 illustrates a bit allocation for a subdivided information group on an optical disk medium according to a fifteenth embodiment. It should be noted that although the subdivided information group of the optical disk medium of this embodiment has a format different from that of the optical disk medium of the thirteenth embodiment, the optical disk medium of this embodiment has the same subdivided information arrangement or shapes as the optical disk of the thirteenth embodiment. As shown in FIG. 22, the subdivided information group on the optical disk medium of this embodiment is made up of 21-bit address information 321 and 11 parity bits 322, i.e., 32 bits in total.

Figure 23:
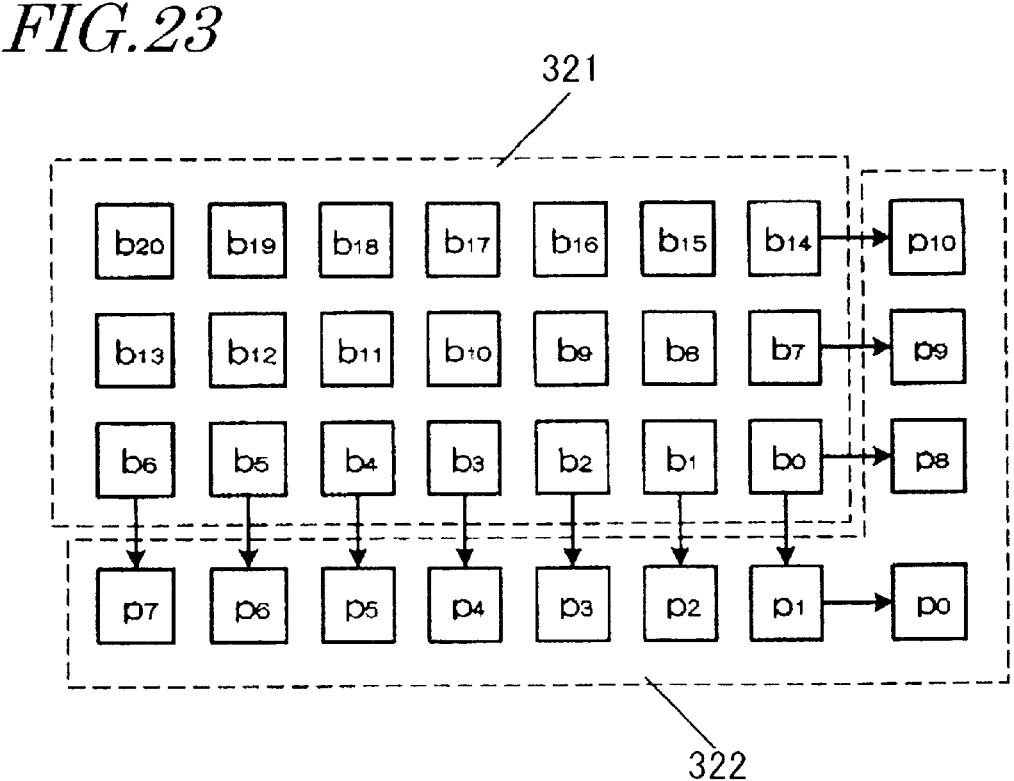
FIG. 23 illustrates respective bits for the group of subdivided information on the optical disk medium of the fifteenth embodiment.

Hereinafter, a more detailed arrangement will be described with reference to FIG. 23. The 21 bits b0 through b20 of the address information 321 are arranged in 7 rows and 3 columns so that the three rows include b20 through b14, b13 through b7 and b6 through b0, respectively. Each row made up of 7 bits is provided with one additional parity bit to make 8 bits in total, while each column made up of 3 bits is also provided with one additional parity bit to make 4 bits in total. In this manner, an error correction code of 32 bits (=(7+1)×(3+1)) is formed. "1" or "0" is selected for each of the additional parity bits p0 through p10 so that each of the four 8-bits rows including the parity bits is an even parity code and that each of the seven 4-bit columns including the parity bits is also an even parity code. Furthermore, "1" or "0" is selected for p0 so that p7 through p0 makes an even parity code. That is to say, p10 through p0 are respectively given by the following Equations (9) through (19):

$$p_{10}=b_{20}+b_{19}+b_{18}+b_{17}+b_{16}+b_{15}+b_{14} \qquad \text{(Equation 9)}$$

$$p_9=b_{13}+b_{12}+b_{11}+b_{10}+b_9+b_8+b_7 \qquad \text{(Equation 10)}$$

$$p_8=b_6+b_5+b_4+b_3+b_2+b_1+b_0 \qquad \text{(Equation 11)}$$

$$p_7=b_{20}+b_{13}+b_6 \qquad \text{(Equation 12)}$$

$$p_6=b_{19}+b_{12}+b_5 \qquad \text{(Equation 13)}$$

$$p_5=b_{18}+b_{11}+b_4 \qquad \text{(Equation 14)}$$

$$p_4=b_{17}+b_{10}+b_3 \qquad \text{(Equation 15)}$$

$$p_3=b_{16}+b_9+b_2 \qquad \text{(Equation 16)}$$

$$p_2 = b_{15} + b_8 + b_1 \quad \text{(Equation 17)}$$

$$p_1 = b_{14} + b_7 + b_0 \quad \text{(Equation 18)}$$

$$p_0 = p_7 + p_6 + p_5 + p_4 + p_3 + p_2 + p_1 \quad \text{(Equation 19)}$$

As is well known in the art, an "even parity code" is a code whose parity bits have been selected so that the number of ones included in the codeword is an even number, and allows for 1-bit error detection. Also, the error may be detected just by obtaining an exclusive logical sum of all information bits, thus simplifying the circuit configuration considerably. Suppose b18 has been inverted erroneously, for example. In that case, the error can be located by the parity bit p10 of the row to which this error bit b18 belongs and by the parity bit p4 of the column to which this error bit 18 belongs. Thus, by inverting b18 again after it has been located, the error can be corrected.

As described above, on the optical disk of this embodiment, the address information is arranged two-dimensionally and a simple parity code is used in each of these two directions, thereby increasing the error correction ability even though a circuit for reading addresses therefrom has a small size.

Embodiment 16

Another embodiment of the optical disk medium according to the present invention will be described with reference to FIGS. 24(a) through 24(d).

Figure 24:
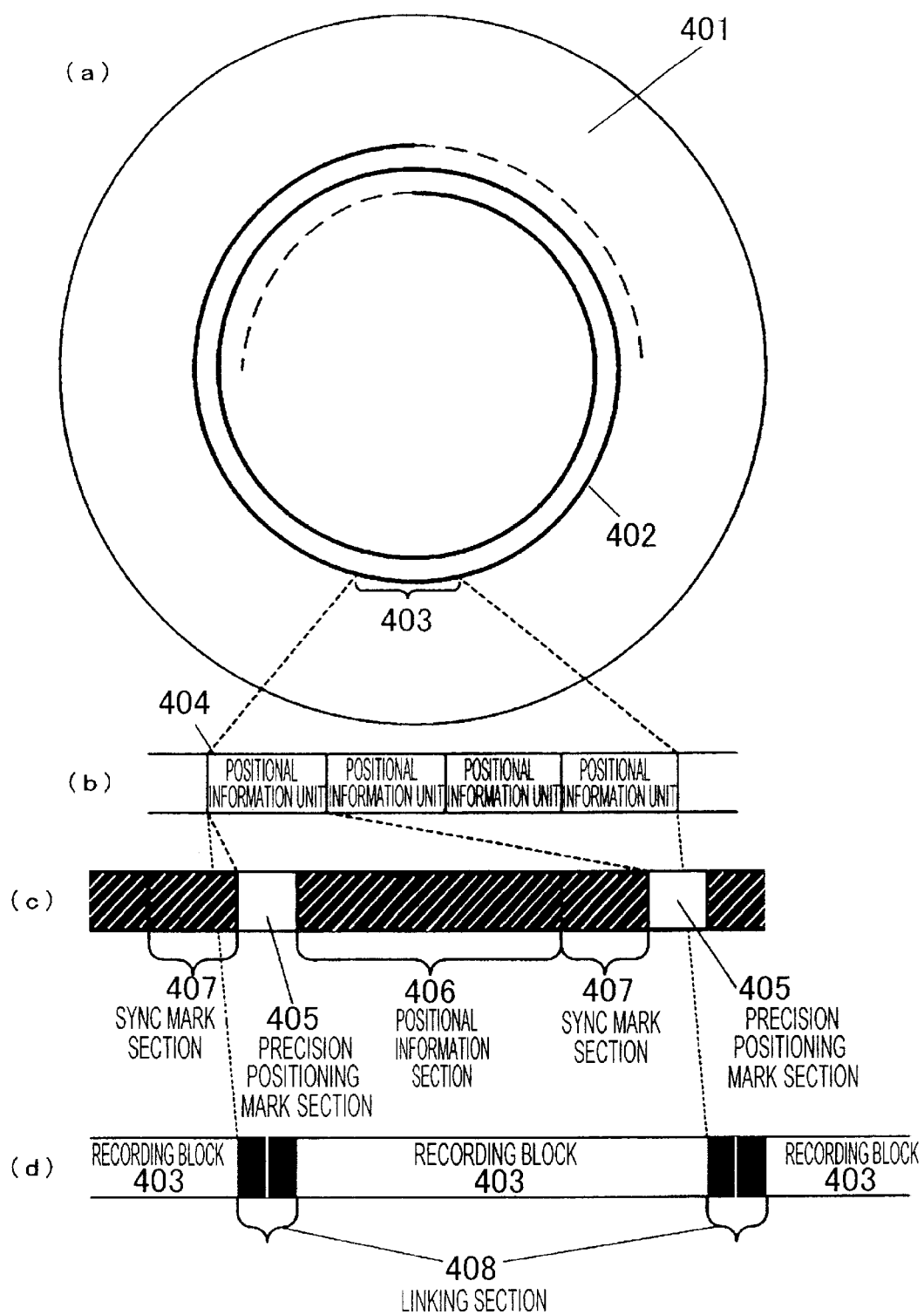
FIGS. 24(a) through 24(d) illustrate a format for an optical disk medium according to a sixteenth embodiment.

FIG. 24(a) illustrates the recording surface 401 of the optical disk medium, on which a spiral track groove 402 has been formed at a predetermined track pitch. Data is written thereon, or read therefrom, using a recording block 403 as the minimum unit.

Each recording block 403 is associated with positional information (i.e., address information) for use to locate the recording block. In this embodiment, each recording block 403 includes four positional information units 404 as shown in FIG. 24(b).

On each of these positional information units 404, information about its physical location on the optical disk medium and its detection indices have been recorded in advance. In this embodiment, each of these pieces of information is represented by a combination of wobble shapes of the track groove, for example. The wobbled groove is formed during the manufacturing process of the optical disk medium. The positional information that was once recorded as a combination of wobble patterns is non-rewritable.

In this manner, according to this embodiment, the positional information of one recording block 403 as the minimum unit for data read and write operations is recorded in multiple areas of the block 403. Accordingly, if at least one of these pieces of positional information can be detected, the recording block 403 can be located advantageously.

In this embodiment, each positional information unit 404 includes precision positioning mark section 405, positional information section 406 and sync mark section 407 as shown in FIG. 24(c). On the precision positioning mark section 405, a precision positioning mark (i.e., identification mark), which is used as an index to absolute positioning during a data write operation, has been formed. The precision positioning mark preferably has a structure similar to that of a block mark according to any of the embodiments described above.

In writing data on the recording film of the optical disk using a recording apparatus, the precision positioning mark plays an important role. To improve the absolute positioning precision, the mark preferably has a shape to be detected as a signal having a relatively high frequency.

On the positional information section 406 and the sync mark section 407, positional information and various other types of information have been written by changing the wobble shape of the track groove 402. The change in wobble shape of the track groove may be represented by the change in amplitude, frequency and/or phase of the groove's displacement in the disk radial direction. The wobble shapes to be adopted are determined so that a signal corresponding to the positional information, which does not affect the recording data so easily and may be represented by the wobble of the track groove, is easily separable from a signal corresponding to the data that has been written as a variation in quality of the recording film. More specifically, the frequency of the wobble signal preferably belongs to a frequency band that is sufficiently lower than a frequency at which the data is written on the recording film. Also, as described above, various measures to identify the wobble patterns highly accurately are preferably taken.

The sync mark section 407 is provided to establish bit synchronization more easily when the positional information recorded on the positional information section 406 is read out. The sync mark section 407 preferably has a groove shape that is not found anywhere in the positional information section 406. Then, the sync mark section 407 can be accurately detected at a higher probability, and erroneous detection of bit synchronization can be prevented.

In a series of two positional information units 404, the precision positioning mark section 405 included in the latter positional information unit 404 is placed just behind the sync mark section 407 included in the former positional information unit 404 as shown in FIG. 24(c).

According to this arrangement, the precision positioning mark in the succeeding precision positioning mark section 405 can be detected highly accurately in accordance with the detection result of the sync mark section 407, which is easily detectable even by itself. More specifically, after a predetermined amount of time has passed since the sync mark section 407 was detected, a predicted detection window for the precision positioning mark is opened. In this manner, only the precision positioning mark located inside the predicted detection window can be detected. Then, the precision positioning mark will not be detected erroneously.

To achieve these effects, the precision positioning mark section 405 is preferably placed just behind the sync mark section 407. For this reason, in each positional information unit 404, the precision positioning mark section 405, positional information section 406 and sync mark section 407 are preferably arranged in this order (i.e., from the beginning toward the end of the unit 404) as shown in FIG. 24(c).

FIG. 24(d) illustrates a format for data to be written on an optical disk medium having such a track groove structure. To control the recording data in association with the positional information that has been recorded on the disk, the data is read or written using the recording block 403 as a minimum unit.

Two contiguous recording blocks 403 are connected together by a linking section 408. The write operation is started or ended in the linking section 408. The location of each linking section 408 substantially corresponds to that of its associated precision positioning mark section 405. A pattern including no user data is preferably written on the linking section 408. Then, even if the signal written on the linking section 408 is affected due to an interference with the precision positioning mark, the read data will not be affected.

In the linking section 408 located at a writing start or end point, the data written thereon is discontinued. Accordingly, to read out data stably enough, a VFO, i.e., a signal having a single frequency, is preferably written on the linking section 408, for example.

Hereinafter, this embodiment will be described in further detail with reference to FIG. 25.

The recording surface 401 of the optical disk medium of this embodiment has been coated with a phase change material, and a spiral track groove 402 has been formed thereon at a track pitch of 0.32 μm. A dielectric film is further deposited to a thickness of 0.1 mm on the recording surface and is irradiated with a laser beam having a wavelength of 405 nm through an objective lens with an NA of 0.85 during a read or write operation. The track groove 402 wobbles toward the inner and outer peripheries at a period of approximately 11.47 82 m. The wobble of the track groove can be detected as a push-pull signal. By multiplying this signal by 186, a write clock signal for use in to perform a write operation at a substantially constant linear density (or at a channel bit length of 0.0617 μm (=11.47/186)) can be generated.

The track groove 402 is made up of a series of positional information segments 403. The user data is read or written by using an area corresponding to each positional information segment 403 as the minimum unit. The data unit written on that area corresponding to one positional information segment 403 is herein defined as the "recording block".

The error correction, interleaving, alternation and other types of processing are also executed using the recording block as the minimum unit. In this embodiment, one recording block includes 64 kilobytes of user data.

The recording data is provided with an additional error correction code and is modulated in such a manner as to be written on the optical disk medium appropriately. As the error correction code, a Reed-Solomon Product Code for use in a DVD, for example, may be adopted. The recording data may be modulated by an eight-to-sixteen modulation technique, for example. A SYNC (synchronization code) for establishing bit synchronization for a read signal and a VFO (variable frequency oscillator) for locking a PLL are further added to the recording data. In this embodiment, the recording data has a channel bit length of 1,243,968 bits.

Each positional information segment 403 is made up of four positional information units 404, each of which consists of precision positioning mark section 405, positional information mark section 406 and sync mark section 407.

As shown in FIG. 26A, the precision positioning mark section 405 of this embodiment is made of a series of eight sine wave wobbles 501 of the track groove. Also, in such a precision positioning mark section, a mirror mark 601 is formed by discontinuing the track groove for a predetermined length at the second wave of the wobble as shown in FIG. 27. The mirror mark 601 is detectable based on a fully added signal obtained by the reflection of a read laser beam from the disk.

The precision positioning mark may be used as an index for determining the absolute position for positional information detection or as an index of the absolute position of data being written.

In this embodiment, the mirror mark 601 has a length of 2 bytes (i.e., 32 channel bits). The length of the mirror mark 601 is preferably defined in such a manner as to minimize unwanted effects on adjacent parts of the track groove or on an interlayer part as for a dual-layer disk, and may be set to 10 bytes (=10 μm) or less. However, the mirror mark 601 should also be long enough to be detectable sufficiently accurately, e.g., 1 byte (=1 μm) or more.

The location of the mirror mark 601 is preferably no earlier than the second wave of the wobble within the precision positioning mark section 405 and no later than the fourth wave of the wobble to ensure high positional accuracy for the window to be generated by detecting the sync mark section 407.

In this embodiment, the data write operation is started and ended inside the precision positioning mark section 405. That is to say, the precision positioning mark section 405 is associated with the linking section 408 used as a link between two blocks of the recording data. Then, the precision positioning mark is effectively applicable to positioning the recording data.

However, if the write operation is started and ended at that part where the mirror mark 601 exists, then the recording signal might be affected by the mirror mark 601. In this embodiment, to prevent a substantive part of the recording data from being affected by the mirror mark 601, a VFO is written on the precision positioning mark section 405.

Next, the location of the mirror mark 601 and the writing start/end points preferably satisfy the following relationships:

The writing start point should be behind the mirror mark in the precision positioning mark section;

The writing end point should also be behind the mirror mark in the precision positioning mark section;

The length between the beginning of the precision positioning mark section and the writing start point should be shorter than the length between the beginning of the precision positioning mark section and the writing end point;

As for an optical disk medium to be subjected to repetitive write operations, the writing start and end points should be separated from the mirror mark to the extent that the mirror mark is not affected by any deterioration of the recording film due to the repetitive write operations; and In view of a processing time delay that it takes for a recording apparatus to actually start its write operation after having detected the mirror mark, the positional relationship between the mirror mark and the writing start point should be determined.

Hereinafter, each of these conditions (A) through (E) will be described in detail.

The condition (A) is laid down in view of the absolute positional accuracy of the writing start point. By setting the writing start point 901 behind the mirror mark 601 in the precision positioning mark section 405 as shown in FIG. 31A, the recording apparatus can start its write operation on detecting the mirror mark. Accordingly, the intended purpose of the mirror mark, i.e., indicating the beginning of a block, can be made full use of, thus improving the absolute positional accuracy of the writing start point.

The condition (B) is laid down in view of the absolute positional accuracy of the writing end point. By setting the writing end point 902 behind the mirror mark 601 in the precision positioning mark section 405 as shown in FIG. 31B, the recording apparatus can finish its write operation on detecting the mirror mark. Accordingly, the absolute positional accuracy of the writing end point is improvable from the same point of view as that of the condition (A) on the writing start point.

The condition (C) requires that where the writing end and start points are located in the same precision positioning mark section, the write operation should be performed so that the writing end point 902 of the previous recording block overlaps with the writing start point 901 of the next recording block as shown in FIG. 31C. By setting the writing start and end points in this manner, no gap (i.e., unrecorded area) will be left between the writing start and end points. If the write operation is carried out in such a manner as to leave an unrecorded area, then no signal will be output from that unrecorded area while the recorded information is being read by a reproducing apparatus. As a result, the digitization and clocking of the read signal temporarily lose its stability disadvantageously. In contrast, if the write operation is performed so that the writing start and end points always overlap with each other, then the no read signal period is eliminated and the data can be read out much more stably.

The condition (D) is laid down to prevent the mirror mark detection from being affected by so-called "writing start/end point deterioration". The writing start/end point deterioration is a well-known phenomenon that is often observed when the recording film of an optical disk medium is made of a so-called "phase change material", for example. Specifically, this term means that repetitive write operations on a recording film degrades or damages parts of the recording film around the writing start and end points due to the application of a thermal stress thereon. If a reproducing apparatus reads out data from those degraded or damaged parts of a recording film, then a variation in the quantity of totally reflected light is observed. Accordingly, if a mirror mark is located inside, or close to, the area where the writing start/end point deterioration has occurred, then the mirror mark detection might be affected adversely. This is because it is difficult to tell a variation in the quantity of totally reflected light, indicating the presence of a mirror mark, from the variation in the quantity of totally reflected light due to the start/end point deterioration. To eliminate these unwanted effects, the mirror mark 601 may be placed so as to be distant from an area 903 that would be affected by the start point deterioration around the writing start point 901 as shown in FIG. 31D. Also, as shown in FIG. 31E, the mirror mark 601 may be placed so as to be distant from an area 904 that would be affected by the end point deterioration around the writing end point 902.

The condition (E) is a more strict definition of the condition (A) and requires that the length between the mirror mark and the writing start point should be determined in view of a processing time delay necessary for the drive. Examples of the drive's processing time delays include: a processing time delay caused by a means for detecting the mirror mark; a processing time delay it takes to correct synchronization after having detected the mirror mark; and a time it takes to prepare for generating a write laser power at a required level. By setting the writing start point with these processing time delays into account, the intended purpose of the mirror mark as described for the condition (A), i.e., improvement in absolute positional accuracy of the writing start point, is accomplished effectively.

Furthermore, each of the positional information mark section 406 and the sync mark section 407 is a collection of subdivided information units 408, each being a series of 32 wobble waves of the same shape. The positional information mark section 406 includes a series of 48 subdivided information units, in each of which one-bit information of "1" or "0" is represented as a piece of subdivided information by a wobble having steep inner- or outer-periphery-oriented displacements as shown in FIGS. 26B and 26C, thereby making 48-bit positional information and its error detection code.

In this case, to detect the positional information from the positional information mark section, the beginning of the positional information mark section should be located. For that purpose, the mirror mark 601 in the precision positioning mark section 405 is used. However, the mirror mark 601 by itself might be detected erroneously or might be missed. On the optical disk medium of the present invention, the precision positioning mark section 405 of the succeeding positional information unit 404 is placed just behind the sync mark section 407. Accordingly, the location of the mirror mark 601 existing in the precision positioning mark section 405 can be narrowed accurately by detecting the sync mark. As a result, the mirror mark 601 required for specifying the absolute position is detectable highly accurately.

The sync mark section 407 is made up of a series of four subdivided information units 408, each of which is represented by a wobble having steep inner- and outer-periphery-oriented displacements or by a wobble showing a sine waveform for both the inner- and outer-periphery-oriented displacements. FIGS. 28A through 28E illustrate exemplary wobble shapes of the sync mark section 407. The sync mark section 407 is a combination of wobbles 504 having steep inner- and outer-periphery-oriented displacements as shown in FIG. 26D (which will be herein referred to as "bi-rectangular wobbles") and wobbles 501 in a sine waveform as shown in FIG. 26A (which will be herein referred to as "sine wave wobbles"). In FIGS. 28A through 28E, the bi-rectangular wobbles 504 are identified by "S" while the sine wave wobbles 501 are identified by "B".

Figure 28A:
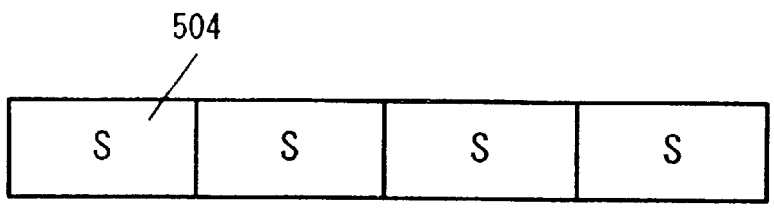
FIGS. 28A through 28E illustrate formats for the sync mark section of the optical disk medium according to the sixteenth embodiment.
Figure 28B:
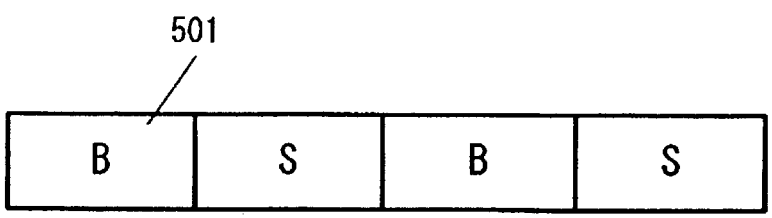
Figure 28C:
Figure 28D:
Figure 28E:

In FIG. 28A, the four subdivided information units are all represented by the bi-rectangular wobbles 504. That is to say, since the wobbles of the same shape realize high continuity, the sync mark section is detectable highly accurately. In FIGS. 28B and 28C, the bi-rectangular and sine wave wobbles 504 and 501 are alternated on a subdivided information unit basis. In these patterns, there are many wobble shape change points, thus ensuring high absolute positional accuracy. In FIGS. 28D and 28E, bi-rectangular wobble, sine wave wobble, sine wave wobble and bi-rectangular wobble are arranged in this order (or to form the opposite pattern). Each of these arrangements has one change point at which the bi-rectangular wobble 504 is replaced by the sine wave wobble 501 and one change point at which the sine wave wobble 501 is replaced by the bi-rectangular wobble 504. Accordingly, the arrangements with such a positional relationship ensure increased reliability against erroneous detection of the absolute position.

On the optical disk medium of this embodiment, each positional information segment, corresponding to one recording block unit, is made up of four positional information units. However, the present invention is not limited to this specific embodiment, but each positional information segment may be made up of a number L (which is a natural number) of positional information units.

Suppose the amount of information included in each positional information section 406 is A bits, each sync mark section 407 has a length corresponding to B wobble periods, each precision positioning mark section 405 has a length corresponding to C wobble periods, each subdivided information unit has a length corresponding to M wobble periods, one wobble period is W times as long as one channel bit of the recording data, the number of channel bits included in each recording block is D and the number of positional information units included in each positional information segment is E.

In this case, A, B, C, D, E, M and W are all natural numbers and are determined so as to satisfy the following Equation (20):

$$D = (A \times M + B + C) \times W \times E \qquad \text{(Equation 20)}$$

In this embodiment, in accordance with an eight-to-sixteen modulation technique, which is well known as a technique of generating a modulation code for a recording signal, one wobble period has a length corresponding to 186 channel bits (i.e., W=186). Also, each precision positioning mark section 405 has a length corresponding to 8 wobble periods and each subdivided information unit 408 has a length corresponding to 32 wobble periods (i.e., C=8 and M=32). However, the present invention is not limited to this specific embodiment. For example, when a modulation code for converting 8 bits into 15 bits is used, one wobble period may have a length corresponding to 155 channel bits. Also, each precision positioning mark section 405 may have a length corresponding to 9 wobble periods and each subdivided information unit 408 may have a length corresponding to 36 wobble periods.

Where a modulation code for converting 2 bits into 3 bits (i.e., converting 8 bits into 12 bits) is used as in the well-known (1, 7) modulation technique, one wobble period may have a length corresponding to 186 channel bits, each precision positioning mark section 405 may have a length corresponding to 6 wobble periods and each subdivided information unit 408 may have a length corresponding to 24 wobble periods. Alternatively, one wobble period, each precision positioning mark section 405 and each subdivided information unit 408 may correspond to 124 channel bits, 9 wobble periods and 36 wobble periods, respectively.

That is to say, where a modulation code for converting 8 bits into F channel bits is used, one wobble period is supposed to have a length corresponding to W channel bits;

each precision positioning mark section 405 is supposed to have a length corresponding to C wobble periods; and each subdivided information unit 408 is supposed to have a length corresponding to M wobble periods.

In this case, if the optical disk medium is formed so as to satisfy the following Equations (21) and (22):

$P \times R \times F = C \times W$ (Equation 21)

$Q \times R \times F = M \times W$ (Equation 22)

then each precision positioning mark section 405, each positional information section 406 and each sync mark section 407 may have respective lengths corresponding to the wobble wave numbers defined in this embodiment.

In Equations (21) and (22), P and Q are rational numbers and R is a natural number. P means that each precision positioning mark section has a length corresponding to P frames of the recording data. In this embodiment, P=1. Q means that each subdivided information unit has a length corresponding to Q frames of the recording data. In this embodiment, Q=4. R is the number of bytes of one frame of the recording data. In this embodiment, R=93. It should be noted that a relationship P:Q=C:M is derived from Equations (21) and (22).

In this configuration, a wobbling groove (including the positional information and mirror marks) that has been pre-cut on an optical disk medium can be easily associated with the recording data. As a result, a recording apparatus and a reproducing apparatus for an optical disk medium according to this embodiment may have a simplified configuration. Also, P and Q may be rational numbers but are more preferably integers.

On the optical disk medium of this embodiment, the mirror mark 601 is provided as a precision positioning mark for each and every precision positioning mark section 405 to detect the positional information more accurately. Alternatively, to reduce the unwanted effects of the mirror marks 601 on adjacent parts of the track or on interlayer parts of a dual-layer disk, only the precision positioning mark section 405 in the positional information unit 404 located at the beginning of each positional information segment may have the mirror mark 601.

The precision positioning mark is not limited to the mirror mark used in this embodiment, but may be any other mark so long as the mark contributes to obtaining a detection signal with high positioning accuracy and is easily distinguishable from a signal for obtaining positional information. For example, a wobble, having a period sufficiently shorter than that of a wobble that has been formed to represent positional information, may be provided as a precision positioning mark. Also, an isolated pit may be formed as an alternative precision positioning mark between adjacent parts of the wobbled groove (i.e., on a "land").

In this embodiment, the subdivided information "1" is represented by a wobble pattern having steep inner-periphery-oriented displacements, the subdivided information "0" is represented by a wobble pattern having steep outer-periphery-oriented displacements and the sync mark section is made of a combination of bi-rectangular wobbles S and sine wave wobbles B. Accordingly, the information bits "1" and "0" are distinguishable by a maximum Euclidean distance and the pieces of information "B" and "S" are also distinguishable by a maximum Euclidean distance. Thus, to achieve similar effects, the information bits "1" and "0" may be represented by bi-rectangular and sine wave wobbles, respectively, and "B" and "S" of the sync mark may be represented by a wobble pattern having steep outer-periphery-oriented displacements and a wobble pattern having steep inner-periphery-oriented displacements, respectively.

Also, in this embodiment, the sync marks and positional information are recorded using all of the four types of wobble patterns (i.e., sine wave wobble pattern, bi-rectangular wobble pattern, wobble pattern with steep inner-periphery-oriented displacements and wobble pattern with steep outer-periphery-oriented displacements). However, the present invention is not limited thereto. For example, only two out of these four (e.g., wobble pattern with steep inner-periphery-oriented displacements and wobble pattern with steep outer-periphery-oriented displacements) may be used or three wobble patterns may also be used. When just two types of wobble patterns are used, the sync marks and the positional information are preferably distinguishable from each other more easily. For that purpose, the positional information may be modulated in accordance with a predetermined modulation rule and unique patterns, not defined by the modulation rule, may be placed as the sync marks.

Furthermore, in this embodiment, the track groove is wobbled at a single period, and the positional information and sync marks are recorded by changing the shapes of the wobbling displacements (i.e., by making the displacements smooth or steep). However, the improvement in detection accuracy of the precision positioning mark as achieved by placing the sync mark ahead of the precision positioning mark is not limited by the types of wobble patterns of the track groove. Alternatively, the configuration of this embodiment is also applicable to an optical disk of the type recording addresses and other types of information thereon by changing the wobble period, phase or amplitude of the track groove or by changing the width or depth of the groove, for example.

As described above, if the precision positioning mark section, positional information section and sync mark section are arranged in this order in each positional information unit, then the precision positioning mark (e.g., mirror mark) included in the precision positioning mark section of one positional information unit is located just behind the sync mark section of the previous positional information unit. Accordingly, based on the detection result of the preceding sync mark section, the precision positioning mark (e.g., mirror mark) placed at the beginning of the succeeding positional information unit can be detected more accurately.

Next, exemplary recording data formats according to this embodiment will be described with reference to FIGS. 31A through 31C. FIG. 31A shows a data format for a recording block at a writing start point; FIG. 31B shows a data format for a recording block under a continuous write operation; and FIG. 31C shows a data format for a recording block at a writing end point.

In FIGS. 31A through 31C, each of the data fields Data field 1, Data field 2, Data field 3 and Data field 4 has a length of 19,344 bytes, in which 208 consecutive frame regions (not shown), each having a length of 93 bytes, are arranged. Each 93-byte frame region is made up of a 2-byte SYNC code placed at the beginning and 91-byte modulated recording data. Accordingly, the maximum amount of recording data is 91×208=18,928 bytes. However, the amount of user data actually writable is 16 kilobytes, to which parity bits for use in error correction or detection, redundant data (e.g., IDs for identifying the recording data positions) and so on are added.

Each of the VFO fields VFO1, VFO2 and VFO3 is a field for use to lock a PLL needed to operate the reproducing apparatus, and no user data is written on any of these fields. On each VFO field, to establish bit synchronization more easily by locking the PLL at a high speed, marks and spaces are preferably recorded repeatedly at a fixed channel bit length, for example.

Each PA field PA functions as a connection to the end of the previous data field. For example, where a well-known run-length-limited (RLL) code is used as a modulation code for the data fields, the PA field contributes not only to satisfying the run-length limitation even at the connection to the end of the previous data field but also to decoding the end of the previous data field properly during a read operation.

Each PS field PS contributes to detecting the beginning of the succeeding data field more accurately and establishing the byte synchronization more firmly. A pattern that is not easily detected erroneously as any other field (i.e., data field, VFO field or PA field), e.g., a unique pattern not existing in any other field, or a pattern having too steep auto-correlation characteristic to match that of any other field even if the bits thereof are shifted may be recorded as the PS field PS.

Figure 25:
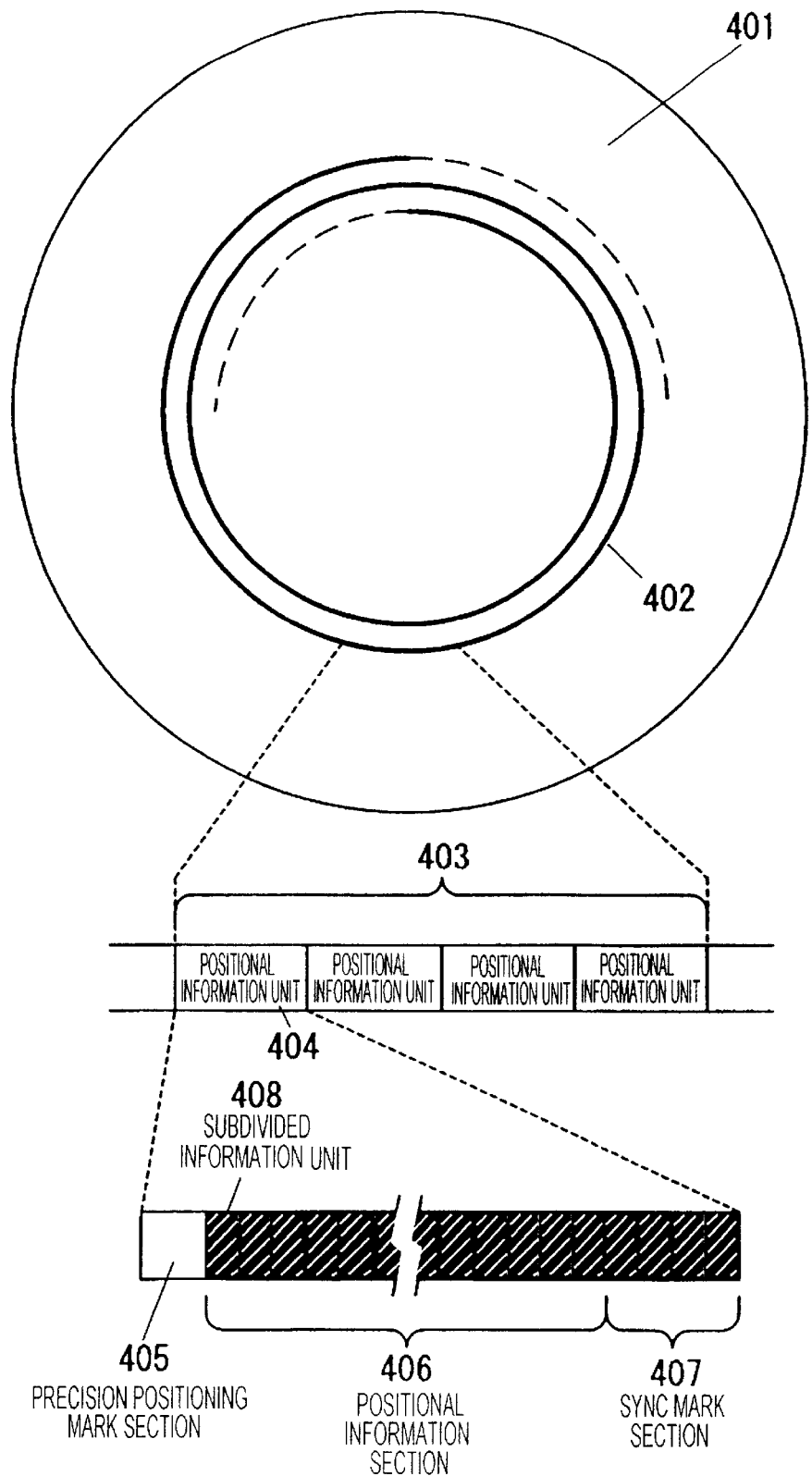
FIG. 25 illustrates a detailed format for the optical disk medium according to the sixteenth embodiment.

Each of the recording blocks shown in FIGS. 31A through 31C corresponds to the positional information segment 403 shown in FIG. 25. And the respective data fields are recorded so as to be associated with the positional information units 404. That is to say, each of the data fields Data field 1, Data field 2, Data field 3 and Data field 4 is recorded so as to have a length corresponding to the combined length of the positional information section and the sync mark section in associated one of the four positional information units 404 that make up one positional information segment 403. Also, the combined length of PA, VFO2 and PS is 93 bytes, and these fields are recorded so as to have a length equal to that of the precision positioning mark section 405.

Furthermore, as shown in FIG. 31A, VFO3, i.e., one of the VFO fields that is located at the end of the recording block at the writing start point, has a length of 41 bytes. Also, as shown in FIG. 31B, VFO1, which is located at the beginning of the recording block under the continuous write operation, has a length of 45 bytes. The combined length of these VFO fields is 86 bytes, which is equal to that of VFO2. In the same way, as shown in FIG. 31B, VFO3, which is located at the end of the recording block under the continuous write operation, has a length of 41 bytes. Also, as shown in FIG. 31C, VFO1, which is located at the beginning of the recording block at the writing end point, has a length of 45 bytes. The combined length of these VFO fields is 86 bytes, which is also equal to that of VFO2. Accordingly, at either connection between two recording blocks under the continuous write operation, the total length of PA, VFO3, VFO1 and PS is also 93 bytes, which is equal to the length of the precision positioning mark section 405.

In this manner, data can be written in association with the positional information that has been pre-cut on an optical disk medium, and the data written can also be located by reference to the positional information.

The length of 93 bytes of the precision positioning mark section 405 is equal to the length of each of the frame regions that make up one data field. Accordingly, the precision positioning mark section under the continuous write operation, i.e., a part where PA, VFO and PS are recorded, may be handled as one frame region. Thus, even in a connection between two adjacent data fields, frame synchronization can be established as in a data field, thereby simplifying the read operation of the reproducing apparatus.

Figure 32:
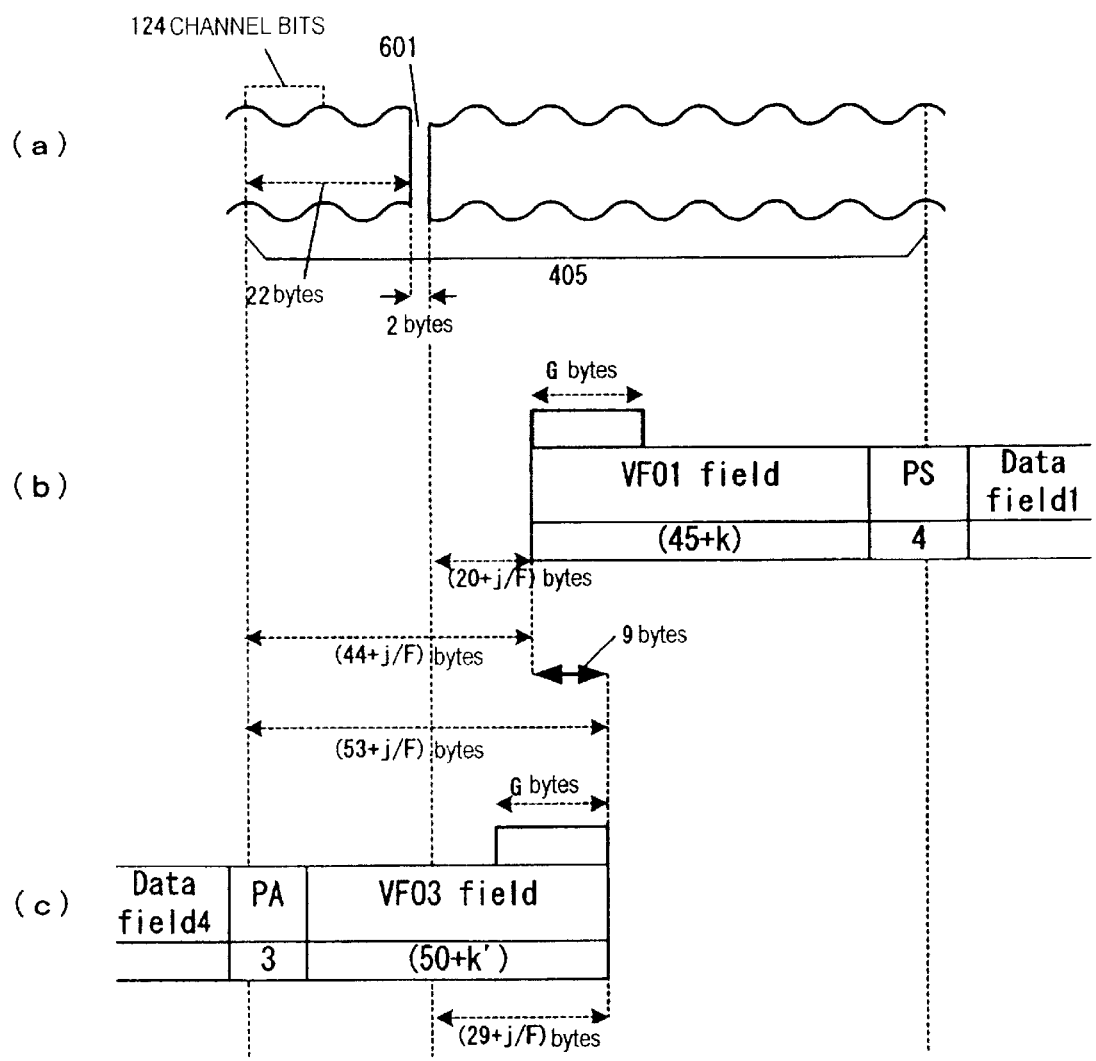
FIGS. 32(a) through 32(c) illustrate an exemplary method for writing data at writing start/end points in accordance with the eighteenth embodiment.

FIG. 32 illustrates an exemplary method for writing data at writing start and end points. FIG. 32($a$) illustrates a sine wave wobble and a mirror mark that have been pre-cut for a precision positioning mark section. In the example illustrated in FIG. 32, a known (1, 7) modulation code is supposed to be used as a modulation code, one byte is supposed to be 12 channel bits, one wobble period is supposed to have a length of 124 channel bits and the precision positioning mark section is supposed to have a length corresponding to 9 wobble periods. Also, the precision positioning mark section is supposed to start at a peak of the sine wave wobble and the mirror mark is supposed to start at the $22^{nd}$ byte as counted from the start point of the precision positioning mark section and have a width of 2 bytes.

In this case, the length between the start point of the precision positioning mark section and the center of the mirror mark 601 (at the $23^{rd}$ byte) is $(23 \times 12) \div 124 \approx 2.23$, which is approximately equal to 2.25 wobble periods. Accordingly, as shown in FIG. 32($a$), the center of the mirror mark 601 substantially matches a falling zero-crossing point of the third wave of the sine wave wobble.

FIG. 32($b$) illustrates a recording block at a writing start point. In this example, after a VFO field VFO1 has been recorded for (45+k) bytes, PS field and data field Data field 1 are recorded continuously, where k is an integer between 0 and 7. For example, if the integer k is newly set at random every time the recording apparatus writes data, then the recording film is less likely deteriorated because the same data will not be repeatedly written at the same position.

FIG. 32($c$) illustrates a writing end point of the recording block. In this example, the data field Data field 4 is followed by a PA field, and then a VFO field VFO3 is finally recorded for (50−k') bytes, where k' is also an integer between 0 and 7. Then, the recording film is also less likely deteriorated even at the writing end point. This k' value may be set equal to the k value at the writing start point. Or mutually different values may be used for the writing start and end points.

Where a modulation code for converting 8 bits into F channel bits is adopted, the length between the end of the mirror mark and the writing start point (i.e., the start point of VFO1) is preferably (20+j/F) bytes, where j is an integer from 0 to (F−1). For example, if the integer j is newly set at random every time the recording apparatus writes data, then the deterioration of the recording film at the writing start point is suppressible even when the same data is repeatedly written at the same position.

In this embodiment, if the repetitive writing is performed, the start/end point deterioration of the recording film is supposed to occur in an area of G bytes after the writing start point and in an area of G bytes before the writing end point.

The length as measured from the end of the mirror mark is determined so as to satisfy the conditions (A), (D) and (E). In other words, if the integer j is defined within the above-described range, then the length between the end of the mirror mark and the writing start point will be 20 bytes or more but less than 21 bytes. Thus, the length can be no shorter than 20 bytes. A length like this is sufficiently long even in view of the area where the writing start point deterioration may occur or the processing time delay it takes for the recording apparatus to actually start its write operation after having detected the mirror mark.

On the other hand, the length between the end of the mirror mark and the writing end point (i.e., the end point of VFO3) is 29 bytes. Where the write operation has been performed ideally at a writing positional accuracy of zero, the length of G bytes of the area where the writing end point deterioration may occur should preferably be smaller than 29. Then, the condition (D) that the mirror mark should be sufficiently separated from the writing end point deterioration area is satisfied. Obviously this arrangement also satisfies the condition (B).

Also, the length between the beginning of the precision positioning mark section and the writing start point is (44+j/F) bytes, while the length between the beginning of the precision positioning mark section and the writing end point is (53+j/F) bytes. The difference between these lengths is 9 bytes. That is to say, the condition (C) is satisfied. Where the write operation has been performed ideally at a writing positional accuracy of zero, the writing start and end points have an overlap of 9 bytes. In that case, even if the shifts of the writing points reach 9 bytes in total, no non-recorded areas will be left.

If the data writing start/end points are set in this manner, the resultant positional relationships satisfy all of the conditions (A) through (E) described above. Accordingly, the "improvement in positional accuracy of writing start/end points" is accomplished effectively.

It should be noted that the VFO field VFO1 is used in the reproducing apparatus to digitize the read data and to lock the PLL. However, an area having a length of (45−G) bytes is actually usable for these purposes.

Embodiment 18

Figure 29:
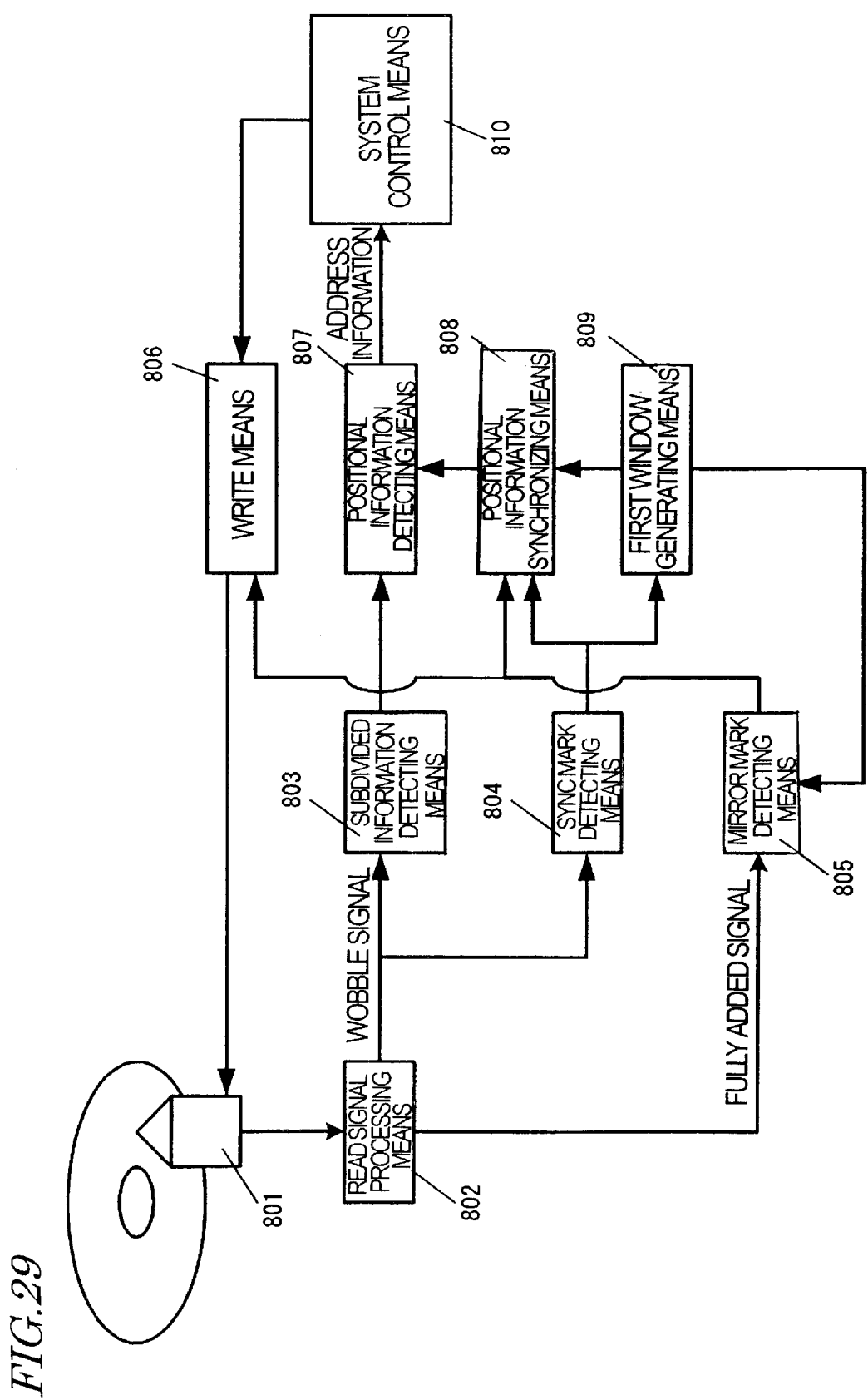
FIG. 29 illustrates a configuration for an optical disk read/write drive according to a seventeenth embodiment.
Figure 30A:
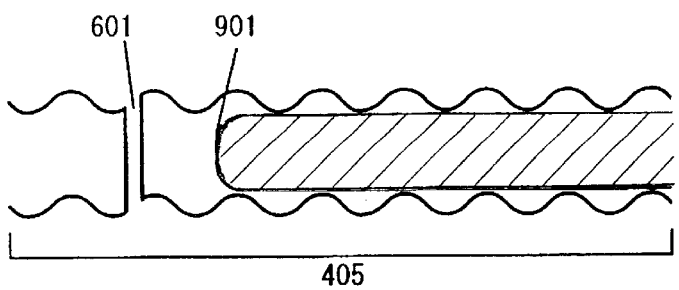
FIGS. 30A through 30E illustrate positional relationships between writing start/end points and mirror marks according to an eighteenth embodiment.
Figure 30B:
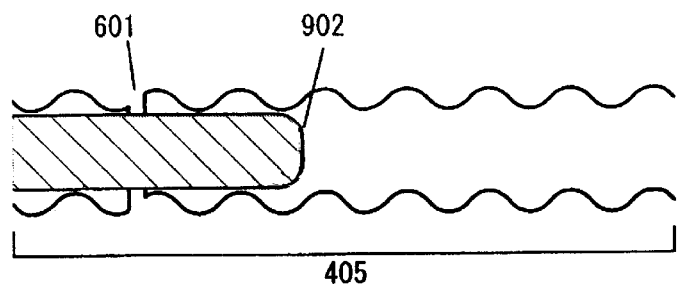
Figure 30C:
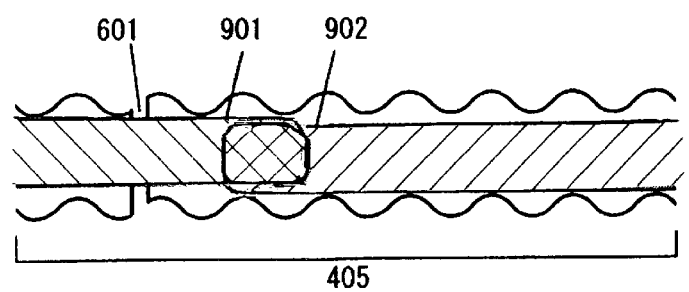
Figure 30D:
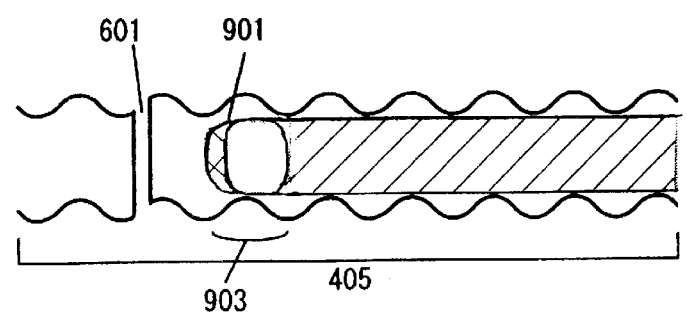
Figure 30E:
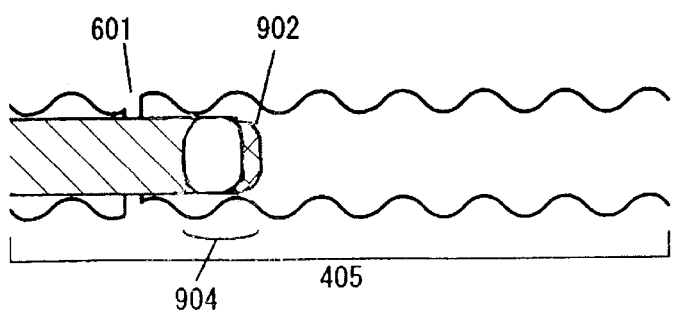

An optical disk read/write drive for reading an address on an optical disk medium according to a seventeenth embodiment will be described with reference to FIG. 29. In FIG. 29, an optical head for detecting a signal based on the brightness or darkness of an optical disk medium 1 by condensing a laser beam onto the disk 1 so that the light spot formed thereon can follow up the track groove of the optical disk 1 is identified by 801. A read signal processing section for generating a fully added signal and a wobble signal by performing operation processing on the detection signal of the optical head 801 is identified by 802. The wobble signal is supposed to appear as a positive signal as for the inner periphery and as a negative signal as for the outer periphery. A subdivided information detecting section outputs "1" on detecting a wobble signal in which only the rising displacements are steep and outputs "0" on detecting a wobble signal in which only the falling displacements are steep.

In this case, once a focus control section and a tracking control section (neither of which is shown in FIG. 29) have established such a control that the light spot follows up the track groove, the optical disk read/write drive of this embodiment needs to detect the positional information to locate its absolute position on the track groove. Hereinafter, it will be described how the read/write drive operates to detect the positional information.

Figure 33:
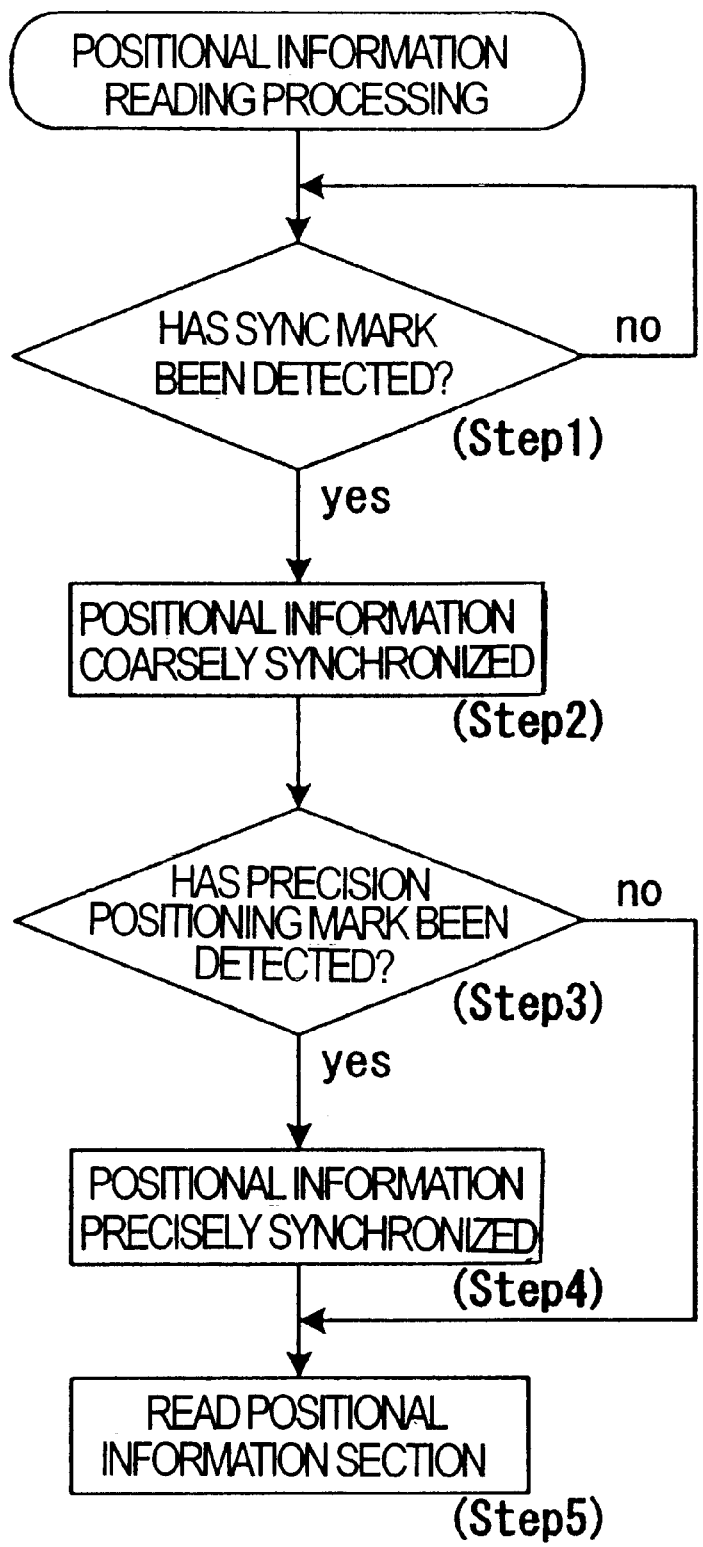
FIG. 33 is a flowchart illustrating the flow of exemplary positional information reading processing according to the eighteenth embodiment.

FIG. 33 is a flowchart illustrating exemplary positional information reading processing performed by the optical disk read/write drive of this embodiment. First, a sync mark is detected at a sync mark section (Step 1). Once the sync mark has been detected, positional information coarsely synchronized state is supposed to have been established to predict an interval, during which the succeeding precision positioning mark (i.e., mirror mark) should appear, based on the detection result of the sync mark (Step 2). If the precision positioning mark (mirror mark) is detected during the predicted interval (Step 3), then positional information precisely synchronized state is supposed to have been established to predict the division between subdivided information units (i.e., bit division of the positional information) based on the detection result of the precision positioning mark (Step 4). On the other hand, if no precision positioning mark is detected even after the predicted interval has passed, then the division between subdivided information units (i.e., bit division of the positional information) is predicted based on the detection result of the sync mark while the positional information is still coarsely synchronized. Then, the positional information is read out from the positional information section according to the divisions predicted (Step 5).

As can be seen, if the precision positioning mark (mirror mark) has been detected, the division of the subdivided information is predictable accurately enough. As a result, the number of detection errors of the positional information can be reduced. In addition, even if no precision positioning marks (mirror marks) have been detected, the division of the subdivided information is still predictable based on the detection result of the sync mark.

Figure 34:
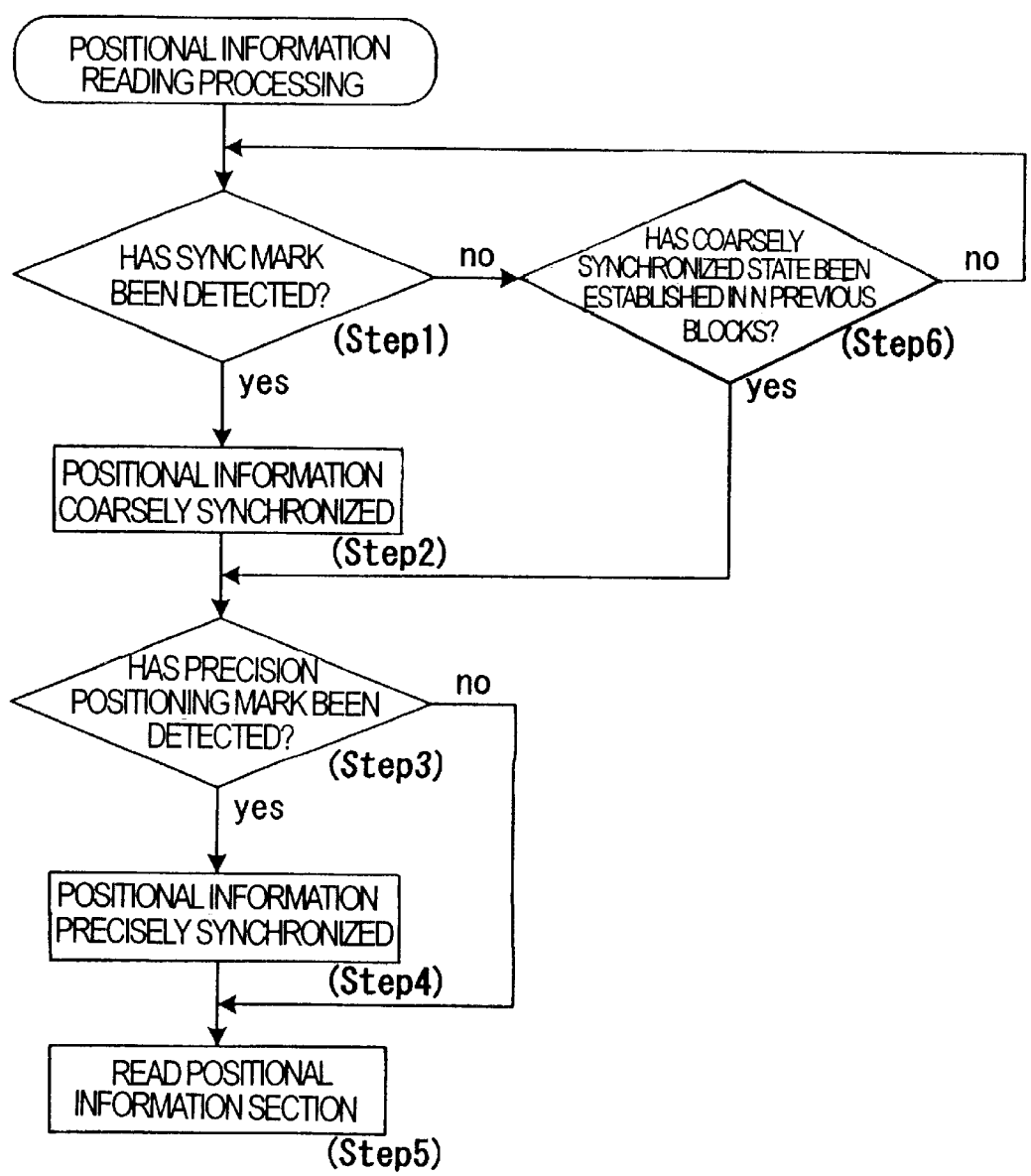
FIG. 34 is a flowchart illustrating the flow of another exemplary positional information reading processing according to the eighteenth embodiment.

In the processing flow illustrated in FIG. 33, if no sync marks are detected in Step 1, the detection of the precision positioning mark is not started until the sync mark is detected. Alternatively, this processing flow may be modified in such a manner as to use the sync mark that has been detected from a block preceding the current block. FIG. 34 is a flowchart illustrating exemplary positional information reading processing including this alternative processing step.

In FIG. 34, if no sync marks have been detected in Step 1, then it is determined whether or not any sync mark has been detected from a number N (which is a natural number) of preceding blocks (Step 6). If the answer is YES, then the processing jumps to the processing step of detecting the precision positioning mark (mirror mark). That is to say, even if no sync marks have been detected from the current block, the positional information coarsely synchronized state may be interpolated based on the detection results of the preceding N blocks. Accordingly, it is possible to avoid the unwanted situation where no positional information can be read out from the current block because no sync mark has been detected yet. It should be noted that the parameter N indicates the number of blocks on which the coarsely synchronized state should be interpolated. Thus, the greater the parameter N, the longer the coarsely synchronized state should be interpolated. However, if N is excessively large, then the positional information might be out of synchronization due to the effects of a number of variable factors. For that reason, N should be set to an optimum value in view of the performance of the drive and the properties of the optical disk medium.

Also, the positional information read out and/or the error detection result thereof may also be used as a condition for establishing the positional information coarsely or precisely synchronized state. For example, if errors have been detected from the positional information of several consecutive blocks (e.g., parity error detection) or if the positional information values (i.e., addresses) are discontinuous among a series of blocks, then the coarsely or precisely synchronized state may be once canceled to try to establish a synchronized state again.

This processing flow will be described through the operation of the drive shown in FIG. 29.

On detecting a wobble signal in which the rising and falling displacements are both steep, a sync mark detecting section 804 outputs a sync mark detection signal. In accordance with the timing of the sync mark that has been detected by the sync mark detecting section 804, a first window detecting section 809 generates a detection window that will have a predetermined time width after a prescribed amount of time has passed since a point in time at which the mirror mark should appear. When the fully added signal reaches a predetermined level or more during the interval of the detection window that has been generated by the first window detecting section 809, a mirror mark detecting section 805 outputs a mirror mark position signal. On the optical disk medium of the first embodiment, the mirror mark exists in the precision positioning mark section just behind the sync mark. Accordingly, the detection window can be narrowed and the erroneous detection can be prevented.

If the mirror mark detecting section 805 has detected the mirror mark during the detection window that has been generated by the first window detecting section 809, then a positional information synchronizing section 807 generates a subdivided information division timing for detecting the positional information in accordance with the timing. On the other hand, if the detecting section 805 has detected no mirror marks during that interval, then the synchronizing section 807 generates the subdivided information division timing for detecting the positional information based on the timing of the detection window. In that case, the detection accuracy and error rate are inferior compared to the situation where the mirror mark has been detected. However, it is still possible to locate the positional information. In accordance with the subdivided information division timing that has been generated by the positional information synchronizing section, a positional information detecting section 808 determines the subdivided information to be "1" or "0", thereby detecting address information.

In this case, once the mirror mark and the positional information have been detected (with no errors), then the position at which the mirror mark has been detected may be regarded as correct. Accordingly, by further narrowing the mirror mark detection window of the next positional information unit on the same track groove, the erroneous detection can be further suppressed.

In recording information, a system control section 810 issues a write instruction to a write section 806. The write section 806 specifies a writing start point and a writing end point in accordance with the absolute position that has been determined from the position at which the mirror mark has been detected. Then, the write section 806 makes the optical head 801 emit an intense laser beam to record the information.

Figure 35:
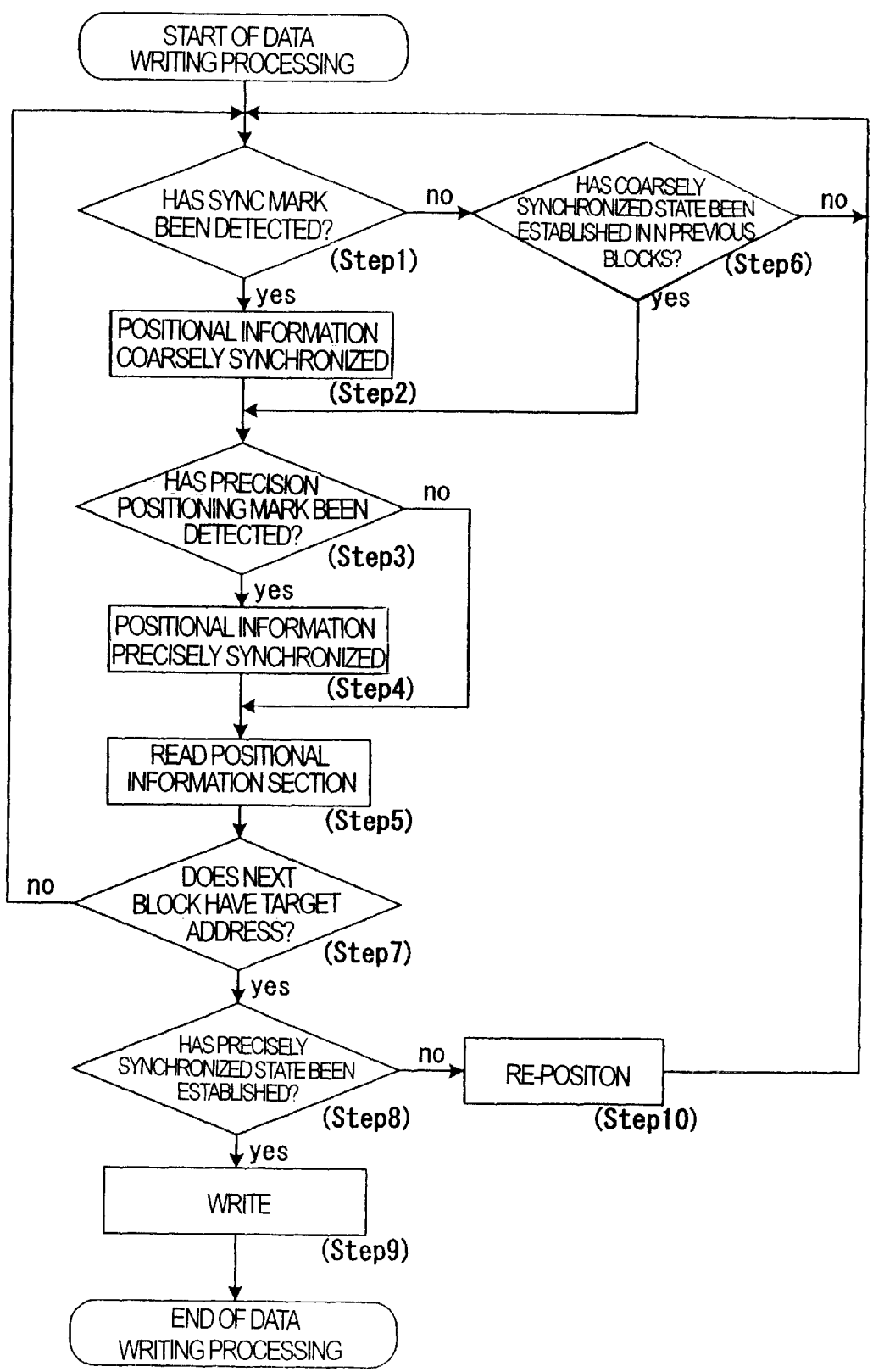
FIG. 35 is a flowchart illustrating the flow of exemplary data write process according to the eighteenth embodiment.

FIG. 35 is a flowchart illustrating exemplary data writing processing performed by the optical disk read/write drive of this embodiment.

In FIG. 35, Steps 1 through 6 are the same as the counterparts of the positional information reading processing as already described with reference to FIGS. 33 and 34. By performing these processing steps 1 through 6, the positional information (i.e., address) is read out and the position at which the positional information (address) read out should be recorded is indicated. That is to say, based on the address read out, it is determined whether or not the next block is the target, or the block to be written (Step 7). If it has been determined that the address of the next block is not that of the target, then the processing returns to Step 1 to restart the positional information reading processing (Steps 1 through 6). On the other hand, if it has been determined that the address is the target address, then the processing advances to Step 8 of determining whether or not a precisely synchronized state has been established. If it is determined, based on the state of the precision positioning mark detected, that the precisely synchronized state has already been established, then a timing to start the data write operation is determined based on the precision positioning mark detected and then the write operation is carried out (Step 9). However, if it is determined that the precisely synchronized state has not yet been established, then the processing returns to the previous part of the track to perform re-positioning processing (Step 10).

Also, if the mirror mark and positional information of the previous positional information segment have already been detected, the writing start and end points of the current segment may be set by interpolating the mirror mark of the previous segment even when no mirror mark is detected at the beginning of the current segment.

It should be noted that the positional information read out or the error detection result thereof may be used as a condition for determining whether the precisely synchronized state has been established before starting the write process. For example, if errors have been detected consecutively from the positional information of the current block or previous several blocks (e.g., parity error detection) or if the positional information (i.e., addresses) values are discontinuous among a series of blocks, then the write operation does not have to be started but the re-positioning process may be carried out even if the precision positioning mark has already been detected.

As described above, according to the address information reproducing apparatus of this embodiment, the precision positioning mark (i.e., mirror mark) for specifying the absolute position exists just behind the sync mark section that is placed at the end of the previous positional information unit. Accordingly, by detecting the sync mark, generating the detection window of the precision positioning mark (mirror mark) based on its timing, and immediately detecting the precision positioning mark (mirror mark), the precision positioning mark (mirror mark) can be detected much more accurately and the positional information can be read out far more reliably.

In the same way, according to the optical disk recording apparatus of this embodiment, the location of the precision positioning mark (mirror mark) to be detected in starting to write data can also be narrowed highly accurately based on the detection result of the sync mark. As a result, the data writing start and end points can also be set much more precisely.

Embodiment 19

Hereinafter, an embodiment of recording "control information", which is usually recorded on a lead-in area, for example, as a combination of various groove shapes will be described.

On a known DVD-RAM, control information is recorded as physically embossed, uneven pre-pits in a control information area within a lead-in area. The control information typically refers to physical format information, disk manufacturing information, copyright protection information and so on. The physical format information includes information required for determining the power of the laser radiation to be irradiated onto the optical disk medium during read and write operations and for compensating for the power. The disk manufacturing information includes information about the manufacturer of the optical disk medium, the manufacturing lot thereof and so on. The copyright protection information includes key information necessary for encryption and/or decoding. These types of control information have been recorded as pits.

In the preferred embodiments of the present invention described above, the positional information is recorded by wobbling the groove in the user area (i.e., data area) and by combining various groove (or wobble wave) shapes with each other. This embodiment is characterized by recording the control information as a combination of wobble patterns of the wobbling groove on the lead-in and/or lead-out area(s) during the manufacturing process of the optical disk medium.

Hereinafter, this embodiment will be described with reference to the accompanying drawings.

Figure 36:
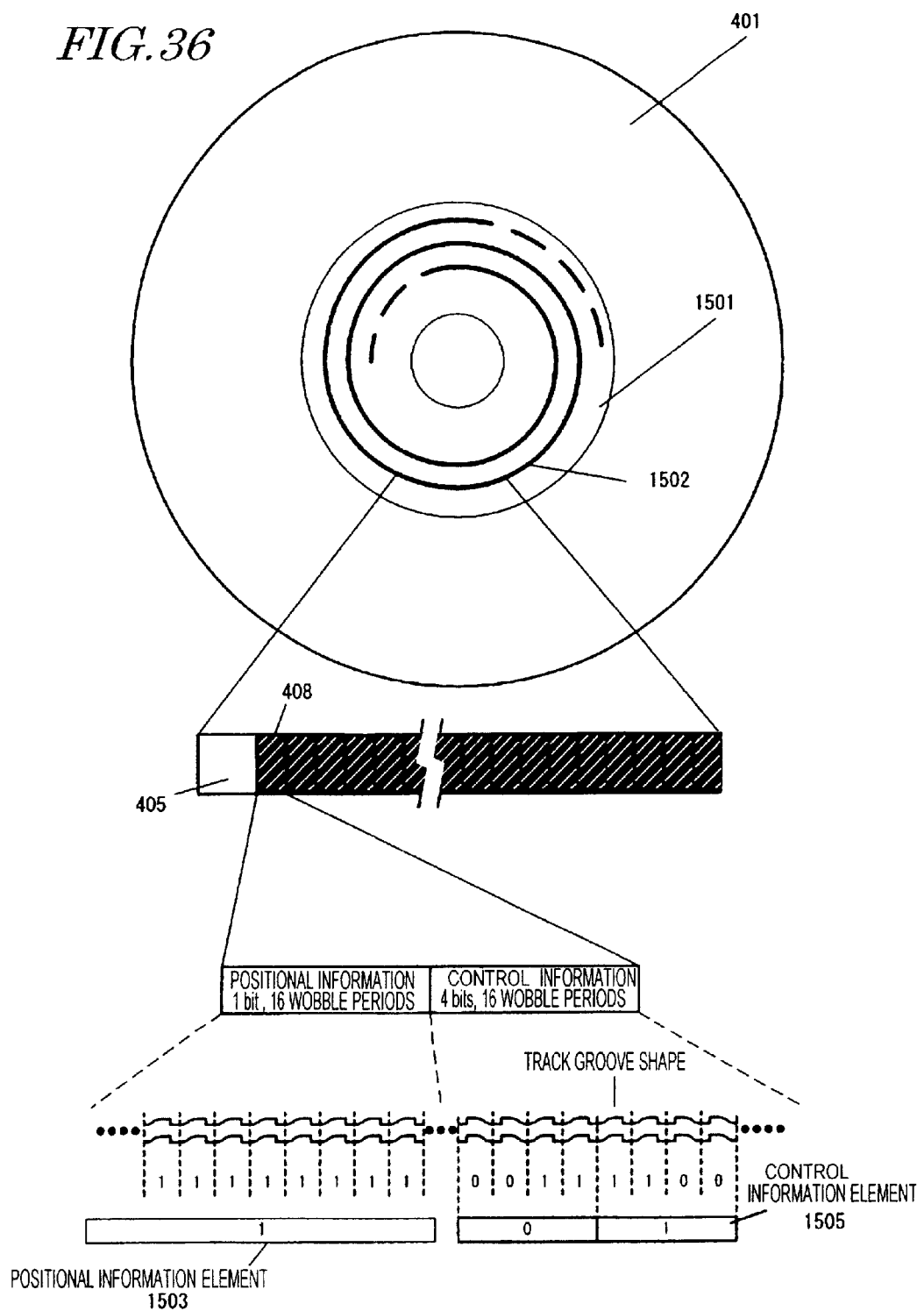
FIG. 36 illustrates a format for an optical disk medium according to the eighteenth embodiment.

First, referring to FIG. 36, illustrated is a configuration for an optical disk medium according to this embodiment. The recording surface 401 of the optical disk medium shown in FIG. 36 has been coated with a phase change material, and a spiral track groove 1502 has been formed thereon at a track pitch of 0.32 $\mu$m. A dielectric film is further deposited to a thickness of 0.1 mm on the recording surface and is irradiated with a laser beam having a wavelength of 405 nm through an objective lens with an NA of 0.85 during read and write operations.

In the lead-in area that is located closer to the inner periphery than the user data area is, a track groove 1502 for recording at least control information thereon has been formed. This track groove 1502 is continuous with the track groove 402 located in the user area as shown in FIG. 25. Like the track groove 402, the track groove 1502 located in the lead-in area also wobbles toward the inner and outer peripheries at a period of approximately 11.47 $\mu$m.

The track groove 1502 is made up of a series of positional information units or a plurality of positional information segments, each including multiple positional information units. Each positional information unit includes a plurality of subdivided information units 408 that are arranged along the groove. In these respects, the track grooves 1502 and 402 have similar configurations.

On each of the subdivided information units 408 on the track groove 1502, one-bit information constituting positional information (i.e., positional information element 1503) and control information elements 1505 constituting the control information of the optical disk medium have been recorded.

In this embodiment, the positional information element 1503 is represented by the wobble shape of the first half of the subdivided information unit 408, while the control information elements 1505 are represented by the wobble shapes of the second half of the subdivided information unit 408.

In the example illustrated in FIG. 36, the positional information element 1503 representing one-bit positional information of "1" or "0" has been recorded as a wobble having 16 periods. More specifically, "0" is represented by a wobble having rectangular inner-periphery-oriented displacements, while "1" is represented by a wobble having rectangular outer-periphery-oriented displacements. In this example, to read a signal more reliably, wobbles of the same shape have been formed over 16 wobble periods, thereby representing the one-bit positional information element 1503 collectively.

As for the control information on the other hand, by combining these two types of wobbles with each other, one-bit control information element is represented as "0" or "1" for 4 wobble periods. In the example illustrated in FIG. 36, a control information element of "0" is represented by 4 wobble periods of "0"→"0"→"1"→"1", while a control information element of "1" is represented by 4 wobble periods of "1"→"1"→"0"→"0". That is to say, each one-bit control information element is represented by a bi-phase code, which uses two wobble periods as a unit, on a four wobble period basis. In the example illustrated in FIG. 36, four-bit control information elements are recorded in each subdivided information unit 408. However, the bi-phase code unit is not limited to two wobble periods, but may be determined appropriately in view of the amount of control information needed and the degree of reliable detection. If the amount of information needed is relatively small, then the information may be read out even more reliably by adopting a bi-phase code that uses 8 wobble periods as a unit. Also, the positional information element and the control information elements that are included in each subdivided information unit do not have to have the wobble numbers used in this example. Instead, those wobble numbers may be appropriately determined depending on respective reliability weights of the positional and control information.

If this bi-phase coding method is adopted, the number of wobbles representing "0" is equal to the number of wobbles representing "1" in the second half of each subdivided information unit 408 on which the control information has been recorded. Accordingly, if a method of determining the one-bit positional information element by majority (specifically by determining each of the wobbles over 16 periods to be "0" or "1") is used to read out the positional information element, the decision of the positional information element (i.e., the decision by majority) is not affected at all by the contents of the control information.

The positional information of each positional information unit (i.e., block) is read as multi-bit positional information elements 1503 obtained from a plurality of subdivided information units, while the control information of the disk is read as multi-bit control information elements 1505.

In recording control information by the known embossing method, if the depth of the groove is shallower than 1/6 of the wavelength $\lambda$ of the read laser radiation, then the amplitude of the read signal, as represented by the presence or absence of the embossment, tends to decrease. On the other hand, to increase the amplitude of the read signal representing user information, the groove depth should be as shallow as about $\lambda/12$. Accordingly, if the groove depth is set at $\lambda/12$ to respect the accuracy of the user information read out, then it is very difficult to read the control information that has been recorded as embossed shapes.

In contrast, according to this embodiment, the control information is recorded as a combination of groove wobble shapes. Thus, even if the groove is shallow, the control information can be read with sufficiently high reliability.

Next, a configuration for an optical disk read/write drive will be described with reference to FIG. 39.

Figure 39:
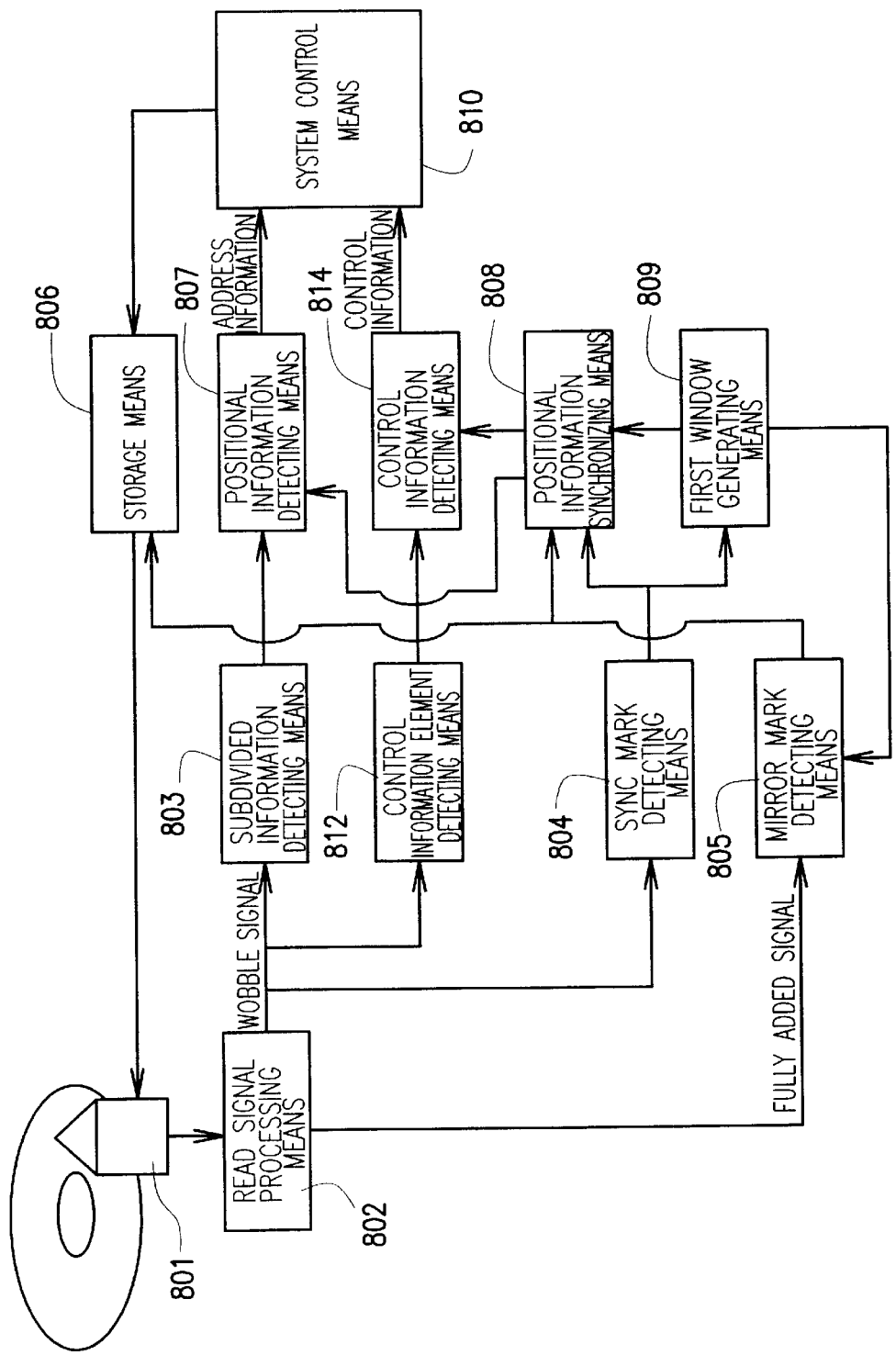
FIG. 39 illustrates a configuration for an optical disk read/write drive that can read the control information recorded by the wobble of a groove.

Unlike the drive shown in FIG. 29, the optical disk read/write drive shown in FIG. 39 further includes: a control information element detecting section 812 for detecting control information elements from the output of the read signal processing section 802; and a control information detecting section 814 for detecting control information from the control information elements obtained.

The control information element detecting section 812 is implemented as a circuit having the same configuration as the subdivided information detecting section 803. On detecting a wobble signal in which only rising displacements are steep, the control information element detecting section 812 outputs "1". On the other hand, on detecting a wobble signal in which only falling displacements are steep, the control information element detecting section 812 outputs "0". The control information detecting section 814 has the same configuration as the positional information detecting section 807. In accordance with the subdivided information division timing that has been generated by the positional information synchronizing section 808, the control information detecting section 814 determines the subdivided information to be "1" or "0", thereby detecting the control information. Then, the control information is sent out to the system control section 810.

As described above, according to this embodiment, not only a clock signal but also address information and control information can be generated or read out from the wobble shapes of the groove. Preferably, no user data should be written on the area where such control information is written. No user data is written on the lead-in or lead-out area of the optical disk. Accordingly, the control information is preferably written within the lead-in or lead-out area.

As for the groove on which no user data is written, no user data is superposed on the read signal. Accordingly, positional information or control information can be extracted from the read signal highly reliably. For that reason, one-bit information may be recorded on the non-user area at a smaller number of wobbles (or waves) compared to the user area. Thus, in this embodiment, the number of wobbles (or waves) needed for representing each one-bit positional information element 503 is 18, which is half as small as the number of wobbles needed for representing one-bit subdivided information "1" or "0" in the user area. However, the information still can be read reliably enough.

Also, in the non-user area, the magnitude of wobble (i.e., the amplitude of wobble in the radial direction) of the groove on which the control information should be written may be greater than (e.g., twice as large as) the magnitude of wobble in the user area. Stated otherwise, if the wobble signal can be read safely even if data has already been written thereon, then the control information and other types of information to be added may be recorded on the track groove 1502.

Next, other exemplary control information recording formats will be described with reference to FIGS. 37A through 37E.

Figure 37A:
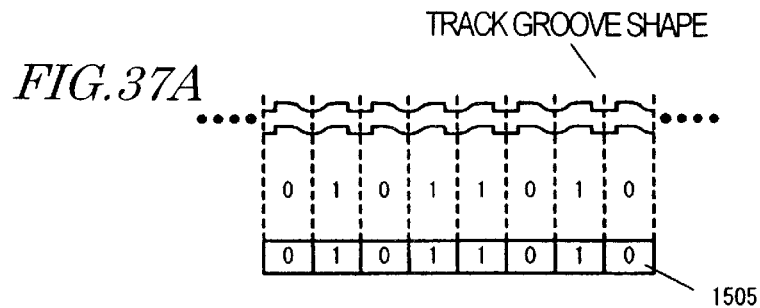
FIGS. 37A through 37E illustrate other exemplary recording formats for control information according to a nineteenth embodiment.

In the example illustrated in FIG. 37A, one-bit control information element is allocated to each single wobble period. The wobble shape for each single wobble period represents "1" or "0". Thus, compared to the example illustrated in FIG. 37, the amount of information increases fourfold.

Figure 37B:
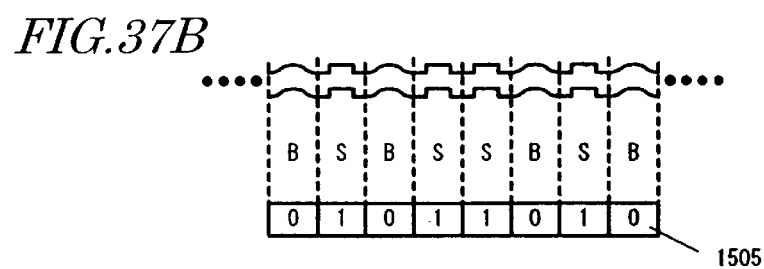

In the example illustrated in FIG. 37B, one-bit control information element is also allocated to each single wobble period. In this respect, the example shown in FIG. 37B is the same as the example shown in FIG. 37A. However, unlike the example shown in FIG. 37A, the wobble shape for each single wobble period represents "B" or "S". According to this example, the control information is easily distinguishable from the subdivided information to be represented as "1" or "0".

Figure 37C:
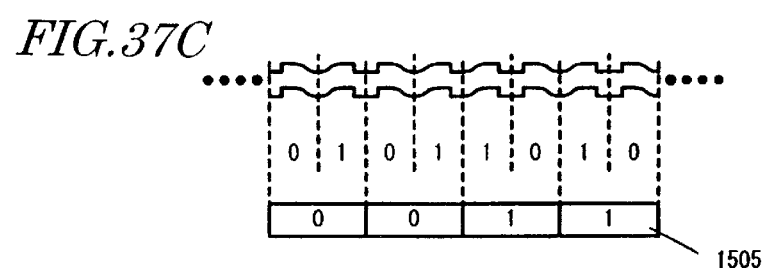

In the example illustrated in FIG. 37C, a bi-phase code for representing one bit for 2 wobble periods is adopted. Thus, compared to the example illustrated in FIG. 37, the amount of information can be doubled.

Figure 37D:
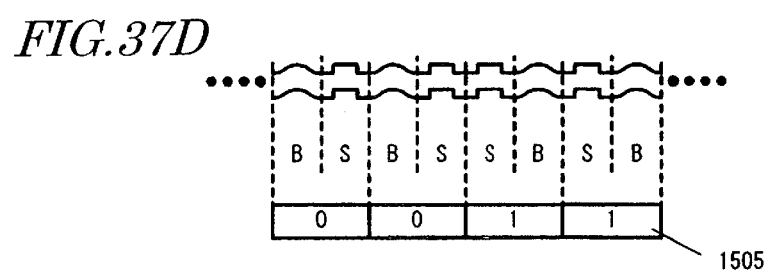

In the example illustrated in FIG. 37D, "1" and "0" of the example shown in FIG. 37C are replaced with "B" and "S", respectively.

Figure 37E:
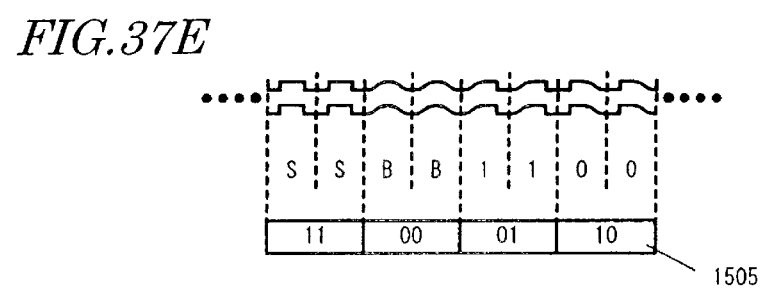

In the example illustrated in FIG. 37E, two-bit information items "11", "00", "01" and "10" are recorded by using four types of wobble shapes "S", "B" "1" and "0". To increase the reliability, each wobble shape is repeatedly recorded twice for two wobble periods.

Figure 38:
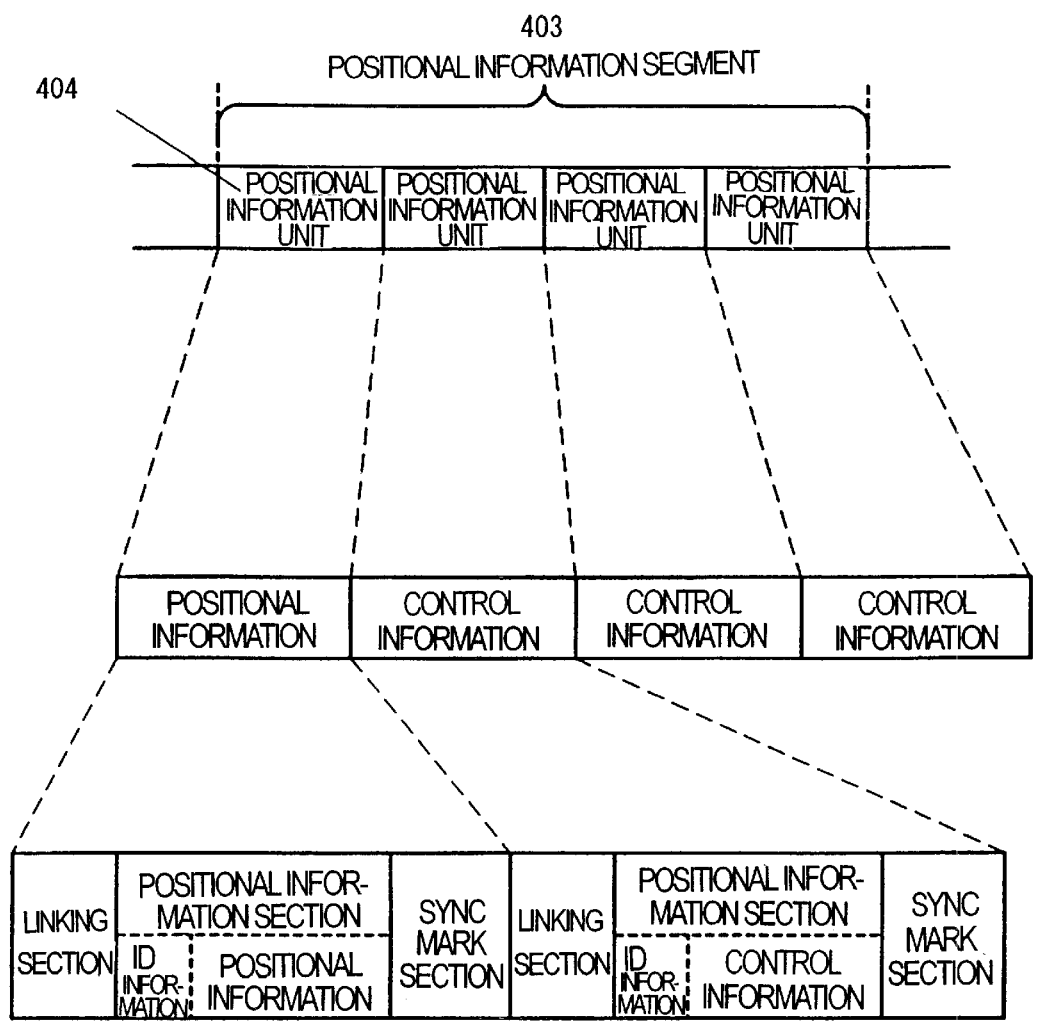
FIG. 38 illustrates an embodiment in which four positional information units, included in one positional information segment 403, include positional information and control information separately.

Next, FIG. 38 will be referred to. In the example illustrated in FIG. 38, one positional information segment 403 includes four positional information units. In one of these four positional information units that is located at the beginning of the segment 403, the "positional information" of this positional information segment 403 is recorded in the positional information section thereof. In the other three positional information units, the "control information" of the segment 403 is recorded in the positional information section thereof. Each of these positional information units includes identification information indicating whether the information recorded in the positional information section thereof represents the "positional information" or the "control information".

As described above, if the precision positioning mark section is placed just behind the sync mark section in a series of positional information units, then the division of the positional information can be detected accurately enough by using the sync mark detected and/or the precision positioning mark detected. Also, in this case, the location of the precision positioning mark to be detected can be narrowed accurately by using the sync mark detected. As a result, the writing start and end points can be set much more accurately and the positional information can be read far more reliably.

Also, in the optical disk medium of the present invention, the positional information and sync mark are recorded by changing the wobble pattern of the groove. On the other hand, the precision positioning mark is formed (e.g., as a mirror mark) so as to have a different groove shape from that representing the positional information recorded. Thus, the sync mark and the precision positioning mark are easily distinguishable from each other. As a result, by using the detection results of the sync and precision positioning marks in combination as disclosed for the inventive method and apparatus for reading positional information and the inventive method and apparatus for writing data, the positional information can be read out and the data can be written highly accurately.

On an optical disk medium according to the present invention, positional information and other types of information are recorded during the manufacturing process thereof by combining a plurality of wobble patterns of the track groove. Thus, there is no need to provide any overhead for recording the positional information for a particular area of the track groove. In addition, according to the present invention, the wobble as represented by the track groove is displaced at a single frequency. Thus, a stabilized clock signal can be easily generated.

Thus the present invention provides an optical disk medium on which information is can be stored at a high density.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disk which comprises a track groove and on which information is recorded along the track groove,
   wherein the track groove includes a plurality of unit sections that are arranged along the track groove and that have side faces displaced periodically along the track groove, and
   wherein the side faces of the unit sections are displaced in a single fundamental period, and
   wherein subdivided information allocated to each said unit section is represented by a combination of wobble patterns selected from multiple types of wobble patterns that have been defined so as to correspond to respective signal waveforms that rise and fall mutually differently.

2. The optical disk of claim 1, wherein the subdivided information allocated to each said unit section is represented by either a first displacement shape or a second displacement shape, the first displacement shape having been defined so as to correspond to a signal waveform that rises relatively steeply and falls relatively gently, the second displacement shape having been defined so as to correspond to a signal waveform that rises relatively gently and falls relatively steeply.

3. The optical disk of claim 1, wherein the side faces of the track groove are displaced either toward disk inner periphery or disk outer periphery with respect to a centerline of the track groove.

4. The optical disk of claim 1, wherein the information is recorded on a block-by-block basis, each said block having a predetermined length, and
   wherein each said block comprises a number N of unit sections that are arranged along the track groove.

5. The optical disk of claim 4, wherein part of the side faces that is shared by at least two of the unit sections has a constant displacement period within at least one of the blocks.

6. The optical disk of claim 1, wherein one-bit subdivided information is allocated to each said unit section, and
   wherein a group of subdivided information representing N bits is recorded on the N unit sections that are included in each said block.

7. The optical disk of claim 6, wherein each said N-bit subdivided information group includes address information of its associated block to which the unit sections, where the subdivided information group is recorded, belong.

8. The optical disk of claim 7, wherein each said N-bit subdivided information group includes an error correction code and/or an error detection code.

9. The optical disk of claim 8, wherein the error correction code or the error detection code has its ability to correct an error of the address information weighted in such a manner that low-order bits of the error correction or detection code have a relatively large weight.

10. A method for reading the address information of each said block from the optical disk as recited in claim 7, the method comprising the steps of:
    irradiating the optical disk with light and generating an electric signal responsive to part of the light that been reflected from the optical disk;
    generating a wobble signal, which has amplitude changing with the wobble pattern, from the electric signal; and
    determining subdivided information, which has been allocated to each of the unit sections included in the block, in accordance with the wobble signal and determining the address information based on the subdivided information.

11. An apparatus for reading subdivided information from the optical disk as recited in claim 1, the apparatus comprising:
    an optical head, which irradiates the optical disk with light and generates an electric signal responsive to part of the light that been reflected from the optical disk;
    read signal processing means for generating a wobble signal, which has amplitude changing with the wobble pattern, from the electric signal; and
    subdivided information detecting means for determining the subdivided information in accordance with the wobble signal.

12. A method for reading subdivided information from the optical disk as recited in claim 1, the method comprising the steps of:
    irradiating the optical disk with light and generating an electric signal responsive to part of the light that been reflected from the optical disk;
    generating a wobble signal, which has amplitude changing with the wobble pattern, from the electric signal; and
    determining the subdivided information in accordance with the wobble signal.

* * * * *

UNITED STATES PATENT AND TRADEMARK OFFICE
CERTIFICATE OF CORRECTION

| | |
|---|---|
| PATENT NO. | : 6,577,590 B2 |
| APPLICATION NO. | : 10/108917 |
| DATED | : June 10, 2003 |
| INVENTOR(S) | : Junichi Minamino et al. |

It is certified that error appears in the above-identified patent and that said Letters Patent is hereby corrected as shown below:

<u>Column 47</u>

Line 46, "The optical disk of claim 1", should read -- The optical disk of claim 4 --.

Signed and Sealed this

Twenty-ninth Day of August, 2006

JON W. DUDAS
*Director of the United States Patent and Trademark Office*